(12) United States Patent
Okuda et al.

(10) Patent No.: US 12,434,953 B2
(45) Date of Patent: Oct. 7, 2025

(54) FORKLIFT, CARGO HANDLING SYSTEM, LOADING METHOD, AND FORKLIFT CONTROL DEVICE

(71) Applicant: MITSUBISHI HEAVY INDUSTRIES, LTD., Tokyo (JP)

(72) Inventors: Tomoya Okuda, Tokyo (JP); Megumu Tsuruta, Tokyo (JP); Tatsuya Sato, Tokyo (JP); Naoto Kawauchi, Tokyo (JP); Mitsuhisa Kawabe, Tokyo (JP); Masayuki Ishikawa, Tokyo (JP); Noriyuki Hasegawa, Tokyo (JP); Keitaro Kamata, Tokyo (JP); Yusuke Otaki, Tokyo (JP); Yu Shibata, Tokyo (JP); Sho Onodera, Tokyo (JP); Kensuke Nishiura, Tokyo (JP); Ei Onogawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 272 days.

(21) Appl. No.: 18/170,092

(22) Filed: Feb. 16, 2023

(65) Prior Publication Data
US 2023/0264934 A1   Aug. 24, 2023

(30) Foreign Application Priority Data

Feb. 21, 2022  (JP) ................................. 2022-024559
Nov. 10, 2022  (JP) ................................. 2022-180571

(51) Int. Cl.
*B66F 9/10* (2006.01)
*B66F 9/06* (2006.01)

(52) U.S. Cl.
CPC ............. *B66F 9/10* (2013.01); *B66F 9/063* (2013.01)

(58) Field of Classification Search
CPC .. B66F 9/10; B66F 9/122; B66F 9/185; B62B 2203/28; B62B 2203/29
See application file for complete search history.

(56) References Cited

U.S. PATENT DOCUMENTS 9,643,827 B2 *  5/2017  Madron ................... B66C 1/56
10,392,160 B2 *  8/2019  Coq ...................... B65D 19/38
(Continued)

FOREIGN PATENT DOCUMENTS

DE       1205841 B    11/1965
FR       2508885 A1    1/1983
(Continued)

OTHER PUBLICATIONS

Search Report Issued in Corresponding EP Application No. 23156982.3, dated Aug. 7, 2023. (16 Pages).

*Primary Examiner* — Mark C Hageman
(74) *Attorney, Agent, or Firm* — Osha Bergman Watanabe & Burton LLP

(57) ABSTRACT

A forklift includes a vehicle and a cargo handling device. The cargo handling device includes a mast, a lift bracket, and a pair of forks that includes claw portions, the forks being separated from each other in a vehicle width direction. The vehicle includes a vehicle main body, and a pair of straddle legs that is provided such that the straddle legs extend to the front side from a lower portion of the vehicle main body and the cargo handling device is interposed between the straddle legs in the vehicle width direction and that supports the mast such that the cargo handling device is movable forward and backward between an advance position and a retreat position, and front ends of the claw portions are positioned behind front ends of the straddle legs when the cargo handling device is at the retreat position.

5 Claims, 29 Drawing Sheets

(56) References Cited

U.S. PATENT DOCUMENTS

| | | | |
|---|---|---|---|
| 10,647,559 B2* | 5/2020 | Schwarz | B66F 9/185 |
| 2003/0099533 A1* | 5/2003 | Marrero | B66F 9/07545 |
| | | | 414/631 |
| 2004/0154871 A1 | 8/2004 | Allerding et al. | |
| 2016/0297655 A1* | 10/2016 | Weiss | B62B 3/0618 |

FOREIGN PATENT DOCUMENTS

| | | |
|---|---|---|
| GB | 839000 A | 6/1960 |
| JP | H04042472 U | 4/1992 |
| JP | 3215158 U | 3/2018 |
| JP | 2021-024413 A | 2/2021 |
| JP | 2021-191702 A | 12/2021 |

\* cited by examiner

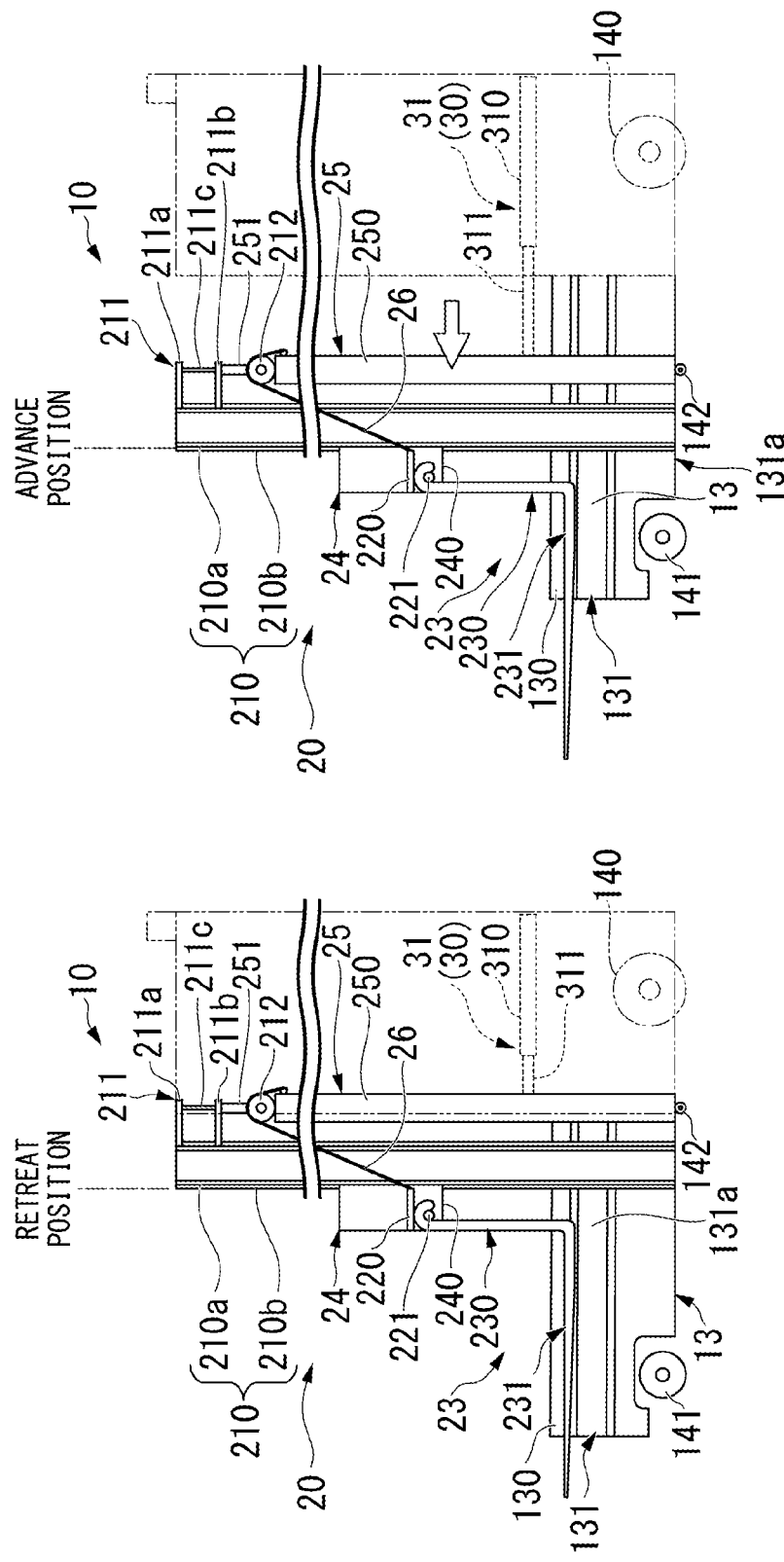

FIG. 8
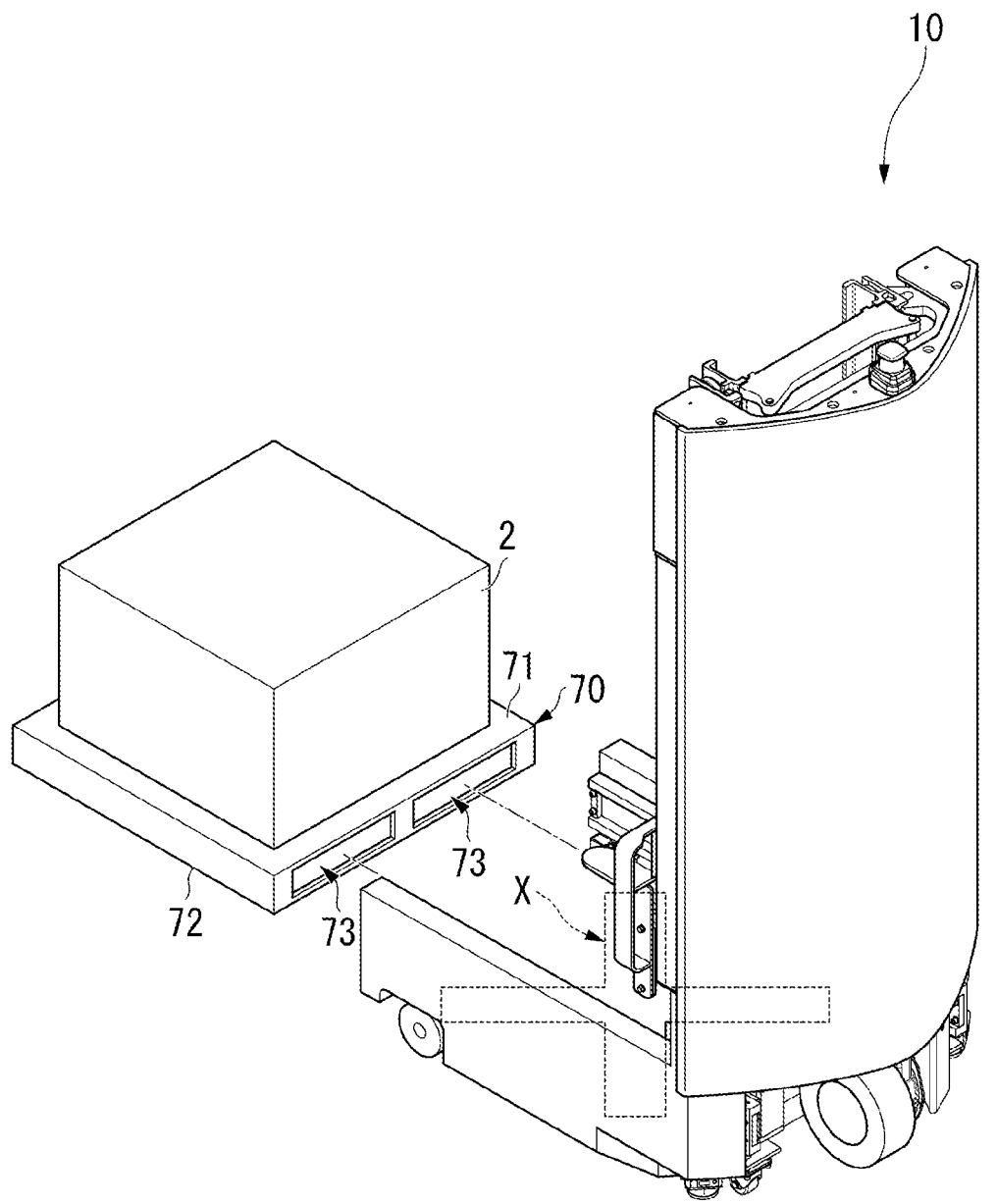
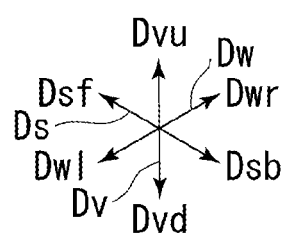

FIG. 19A
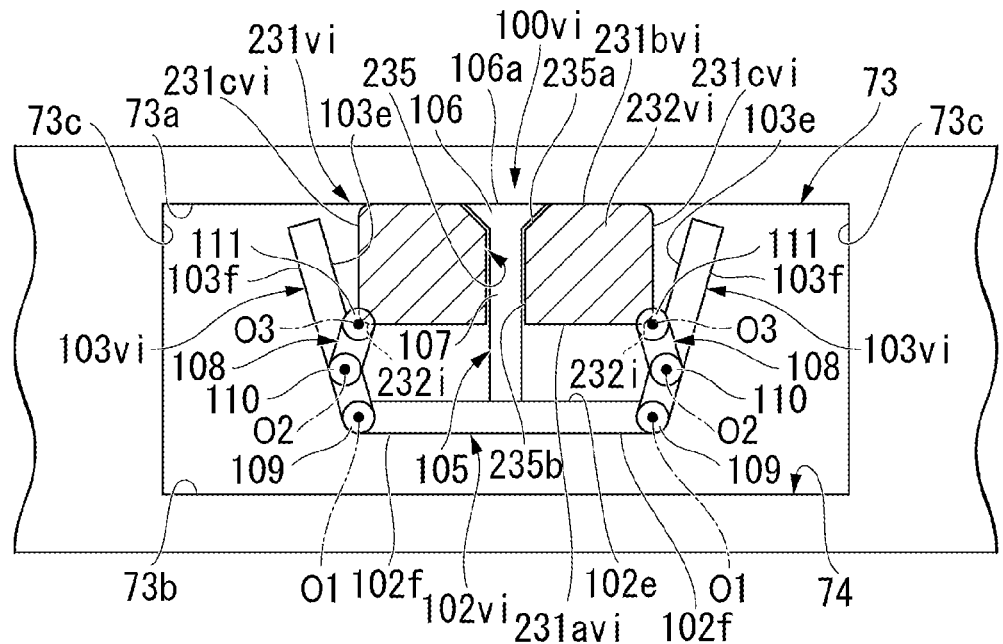
FIG. 19B
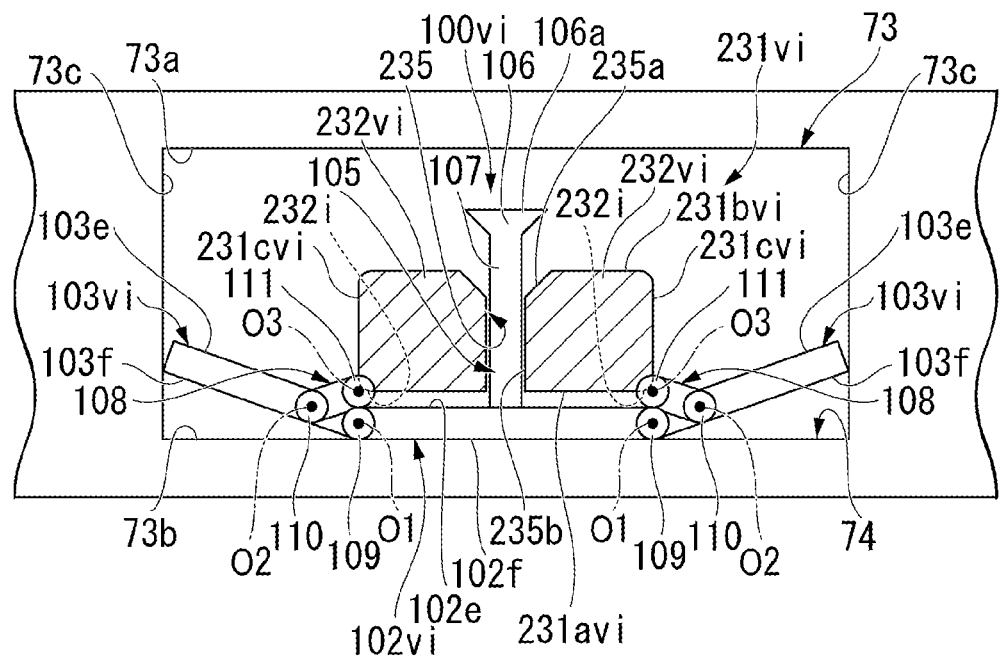
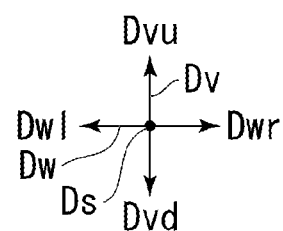

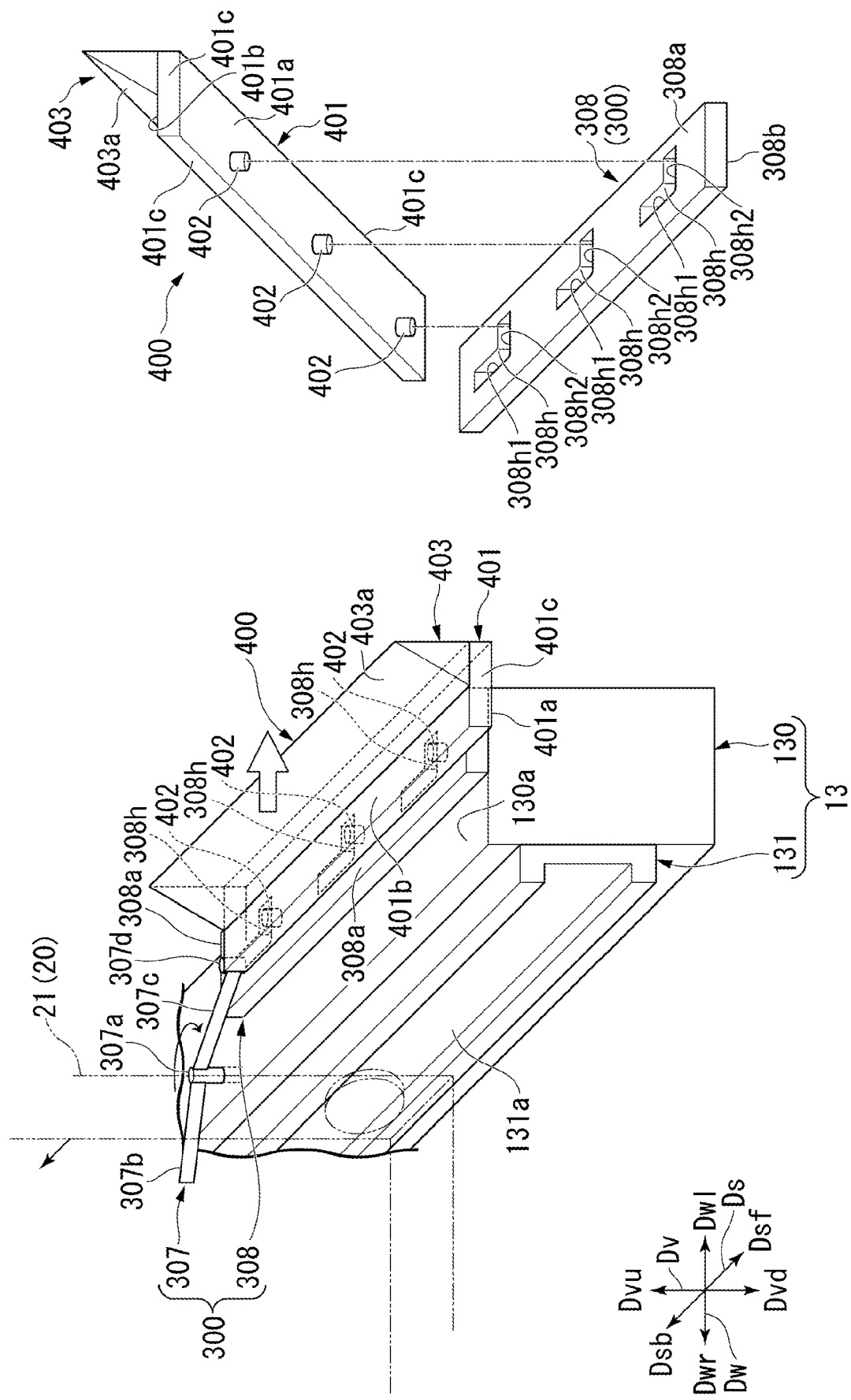

FIG. 27A
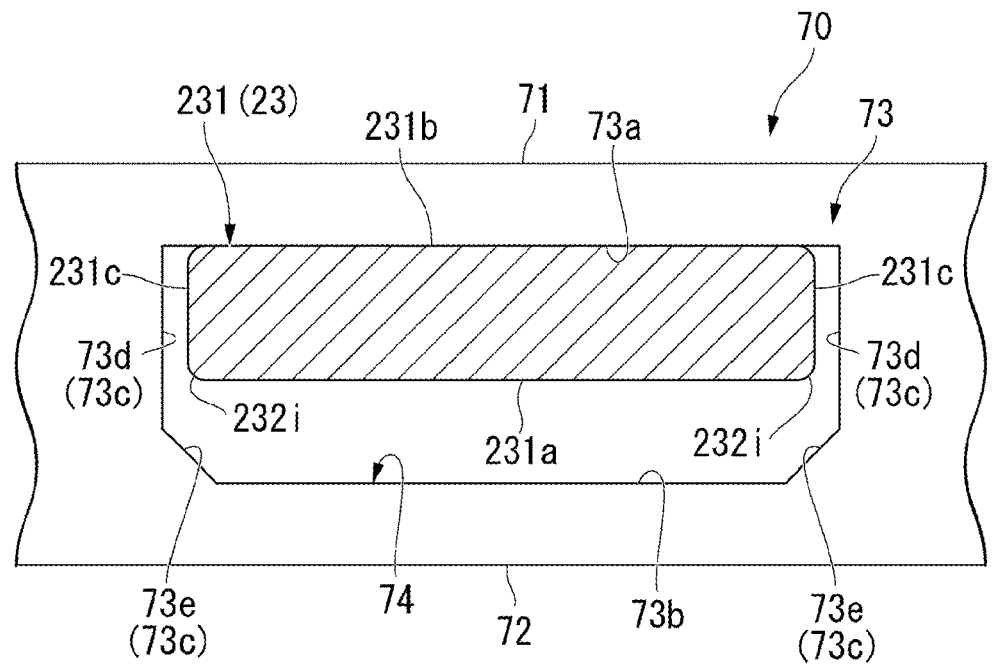
FIG. 27B
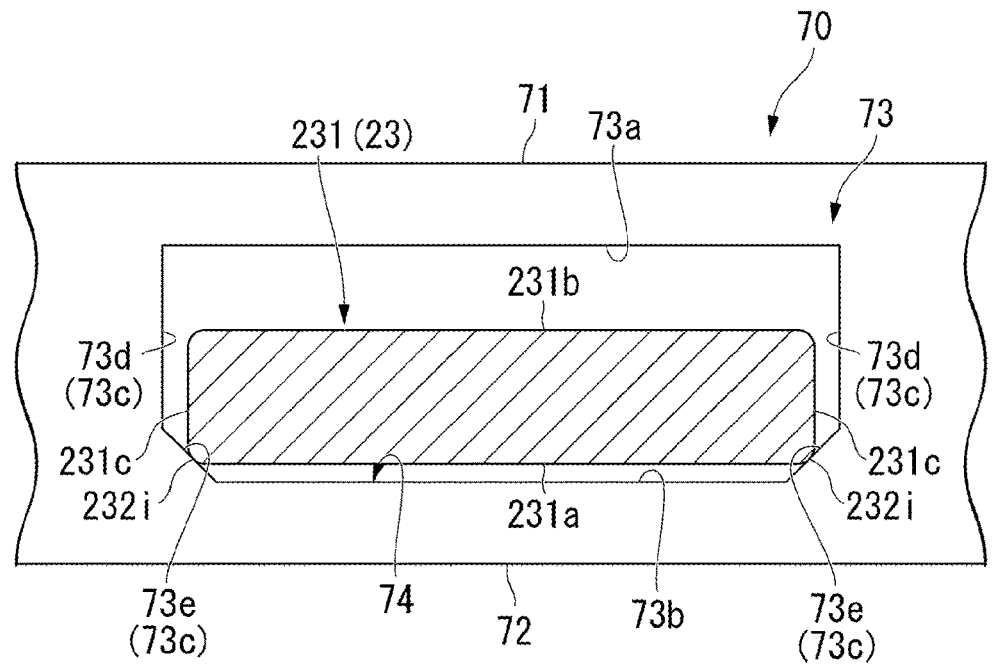
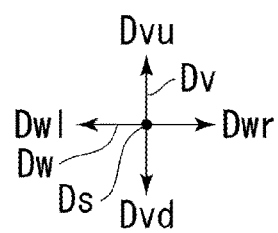

FORKLIFT, CARGO HANDLING SYSTEM, LOADING METHOD, AND FORKLIFT CONTROL DEVICE

CROSS-REFERENCE TO RELATED APPLICATION

Priority is claimed on Japanese Patent Application No. 2022-24559, filed on Feb. 21, 2022, and Japanese Patent Application No. 2022-180571, filed on Nov. 10, 2022, the contents of which are incorporated herein by reference.

BACKGROUND OF THE INVENTION

Field of the Invention

The present disclosure relates to a forklift, a cargo handling system, a loading method, and a forklift control device.

Description of Related Art

For example, disclosed in Japanese Unexamined Patent Application Publication, First Publication No. 2021-191702 is a reach-type forklift that includes a vehicle body including a pair of straddle legs and a cargo handling device provided between the pair of straddle legs. This cargo handling device includes a carriage that moves in a front-rear direction along the straddle legs, a pair of masts erected on the carriage, and a pair of forks that are attached to the masts to be movable upward and downward.

SUMMARY OF THE INVENTION

Meanwhile, in the case of a reach-type forklift, the center of gravity of the entire forklift may become instable when a cargo loaded on forks is transported, although depending on the shape of the cargo.

The present disclosure has been made to solve the above-described problem, and an object thereof is to provide a forklift, a cargo handling system, a loading method, and a forklift control device with which it is possible to make the center of gravity more stable.

According to an aspect of the present disclosure, there is provided a forklift including a vehicle that is travelable on a road surface and a cargo handling device that is provided on the vehicle. The cargo handling device includes a mast that extends in a vertical direction at a front portion of the vehicle, a lift bracket that is provided on the mast to be movable upward and downward, and a pair of forks that includes claw portions extending to a front side from the lift bracket, the forks being separated from each other in a vehicle width direction, the vehicle includes a vehicle main body, and a pair of straddle legs that is provided such that the straddle legs extend to the front side from a lower portion of the vehicle main body and the cargo handling device is interposed between the straddle legs in the vehicle width direction and that supports the mast such that the cargo handling device is movable forward and backward between an advance position and a retreat position, and front ends of the claw portions are positioned behind front ends of the straddle legs when the cargo handling device is at the retreat position.

In addition, according to an aspect of the present disclosure, there is provided a cargo handling system including the above-described forklift and a pallet that includes a placement surface on which a cargo is placed from an upper side, a non-placement surface that faces a side opposite to the placement surface, and a fork pocket that is disposed between the placement surface and the non-placement surface and into which the pair of forks is insertable. The claw portion includes a retaining surface that faces a lower side and that faces an inner surface of the fork pocket when the pair of forks is inserted into the fork pocket, the straddle leg includes a receiving surface that faces the upper side, and the receiving surface faces the non-placement surface at a position closest to the non-placement surface when the pair of forks supports the pallet and the cargo handling device is at the retreat position.

In addition, according to an aspect of the present disclosure, there is provided a loading method of loading the pallet on the forklift in the above-described cargo handling system, the method including a step of drawing the pallet rearward when the pair of forks is inserted into the fork pocket and the pair of forks lifts the pallet, a step of placing the pallet on the receiving surface by moving the pair of forks to the lower side, and a step of moving the pair of forks to further move to the lower side when the pallet is placed on the receiving surface so that the retaining surface fixes the pallet on the receiving surface.

In addition, according to an aspect of the present disclosure, there is provided a forklift control device which causes the pallet to be loaded on the forklift in the above-described cargo handling system, the device including a reach-in instruction unit that causes the pair of forks to draw the pallet rearward when the pair of forks is inserted into the fork pocket and the pair of forks lifts the pallet and a lift-down instruction unit that causes the pair of forks to move downward. The lift-down instruction unit includes a first descent instruction unit that causes the pair of forks to move downward when the pallet is drawn rearward, and a second descent instruction unit that causes the pair of forks to further move downward when the pallet is placed on the receiving surface.

According to the aspects of the present disclosure, it is possible to provide a forklift, a cargo handling system, a loading method, and a forklift control device with which it is possible to make the center of gravity more stable.

BRIEF DESCRIPTION OF THE DRAWINGS

FIG. 6 is a view for description about a forward and backward movement operation of the cargo handling device according to the first embodiment of the present disclosure.

FIG. 8 is a view showing the way in which the forklift according to the first embodiment of the present disclosure performs a cargo handling operation such as loading and unloading at a target position in a logistics facility.

FIG. 19 is a view showing centering mechanisms according to a sixth embodiment of the present disclosure as seen from the rear side.

FIG. 25 is a view showing the operations of the synchronization mechanisms and the pallet guides according to the ninth embodiment of the present disclosure.

FIG. 27 is a view showing a fork pocket of a pallet according to another embodiment of the present disclosure as seen from the rear side.

DETAILED DESCRIPTION OF THE INVENTION

Hereinafter, a cargo handling system according to an embodiment of the present disclosure will be described with reference to the drawings.

First Embodiment

Cargo Handling System

Figure 1:
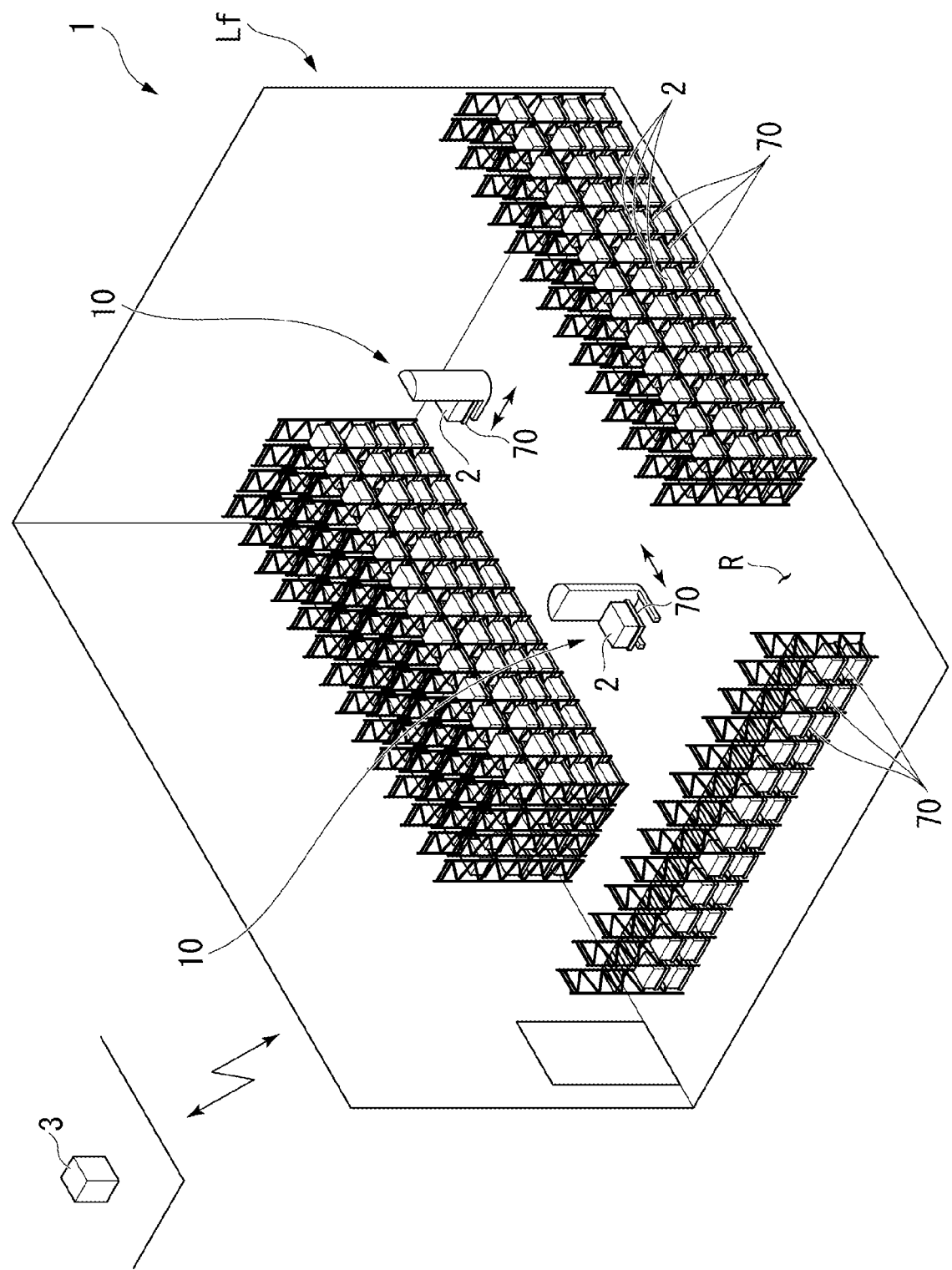
FIG. 1 is a perspective view showing the overall configuration of a cargo handling system according to a first embodiment of the present disclosure.

A cargo handling system according to the present embodiment is a system for a cargo handling operation such as loading, unloading, and transportation of a cargo in a logistics facility such as a logistics center and a warehouse. As shown in FIG. 1, a cargo handling system 1 includes a forklift 10, a pallet 70, and a host device 3.

Forklift

The forklift 10 is an industrial vehicle that moves a cargo 2 placed on the pallet 70 within a logistics facility Lf. The forklift 10 in the present embodiment is a vehicle that autonomously travels in accordance with a command received from the host device 3, and is, for example, a reach-type unmanned forklift.

Figure 2A:
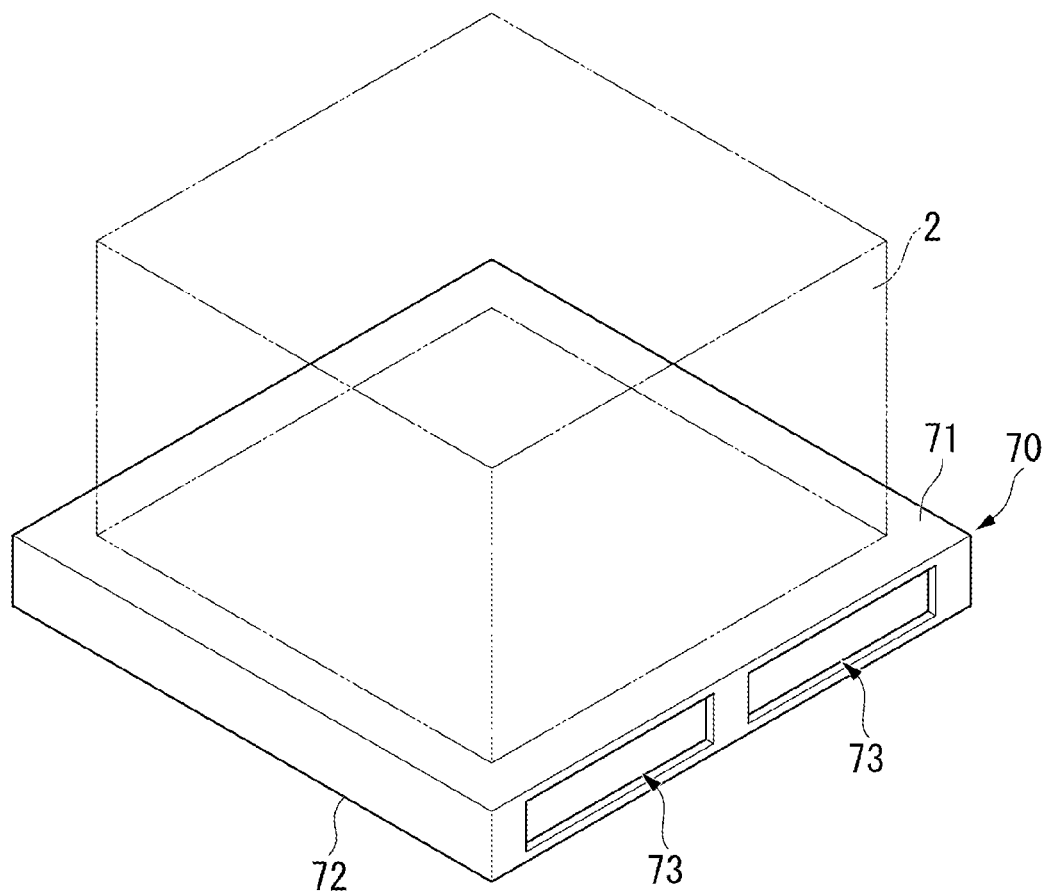
FIG. 2 is a view showing the configuration of a pallet according to the first embodiment of the present disclosure.
Figure 2B:
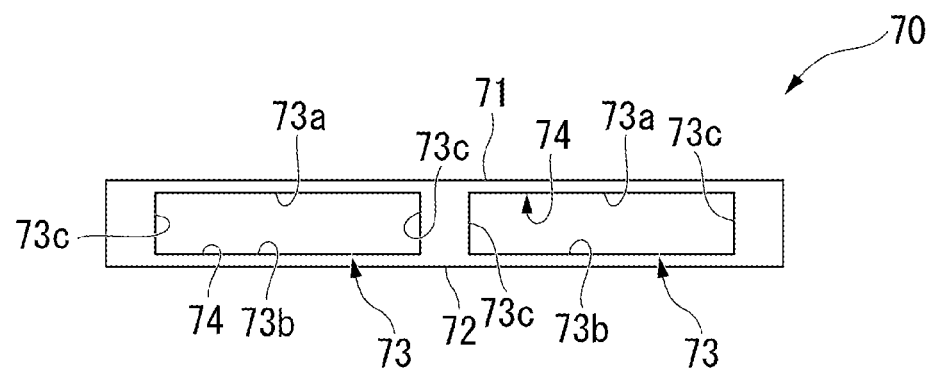

As shown in FIGS. 2A and 2B, the pallet 70 is a cargo handling table on which the cargo 2 is placed. The pallet 70 in the present embodiment is a flat pallet that has a rectangular parallelepiped shape and is formed of plastic or the like.

The pallet 70 includes a placement surface 71 on which the cargo 2 is placed from above, a non-placement surface 72 that faces a side opposite to the placement surface 71, and a pair of fork pockets 73 disposed between the placement surface 71 and the non-placement surface 72.

The placement surface 71 and the non-placement surface 72 are square surfaces that are separated from each other in a vertical direction and extend in horizontal directions. The fork pockets 73 are insertion ports into which forks of the forklift 10 can be inserted. The fork pockets 73 are hole extending in the horizontal directions between the placement surface 71 and the non-placement surface 72.

An inner surface 74 of each fork pocket 73 is composed of an upper surface 73a that faces a lower side a lower surface 73b that faces an upper side and faces the upper surface 73a, and side surfaces 73c connecting the upper surface 73a and the lower surface 73b to each other.

Here, the host device 3 shown in FIG. 1 outputs a command for traveling, cargo handling, or the like to the forklift 10. The host device 3 sequentially receives various kinds of information from the forklift 10 and collects the disposition positions of the cargos 2 and the positions of the forklifts 10 in the logistics facility Lf.

Figure 3:
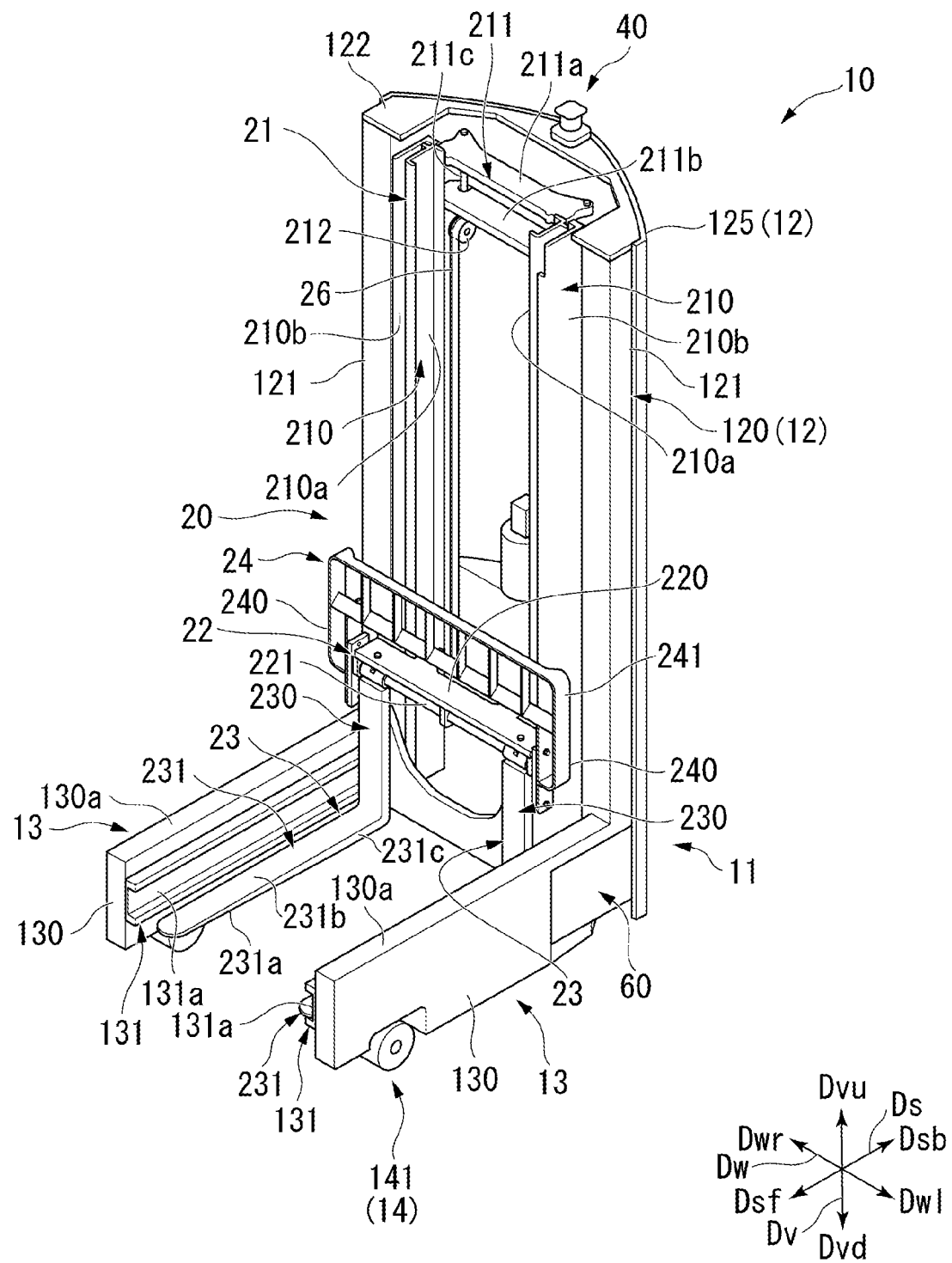
FIG. 3 is a first perspective view showing the configuration of a forklift according to the first embodiment of the present disclosure.
Figure 4:
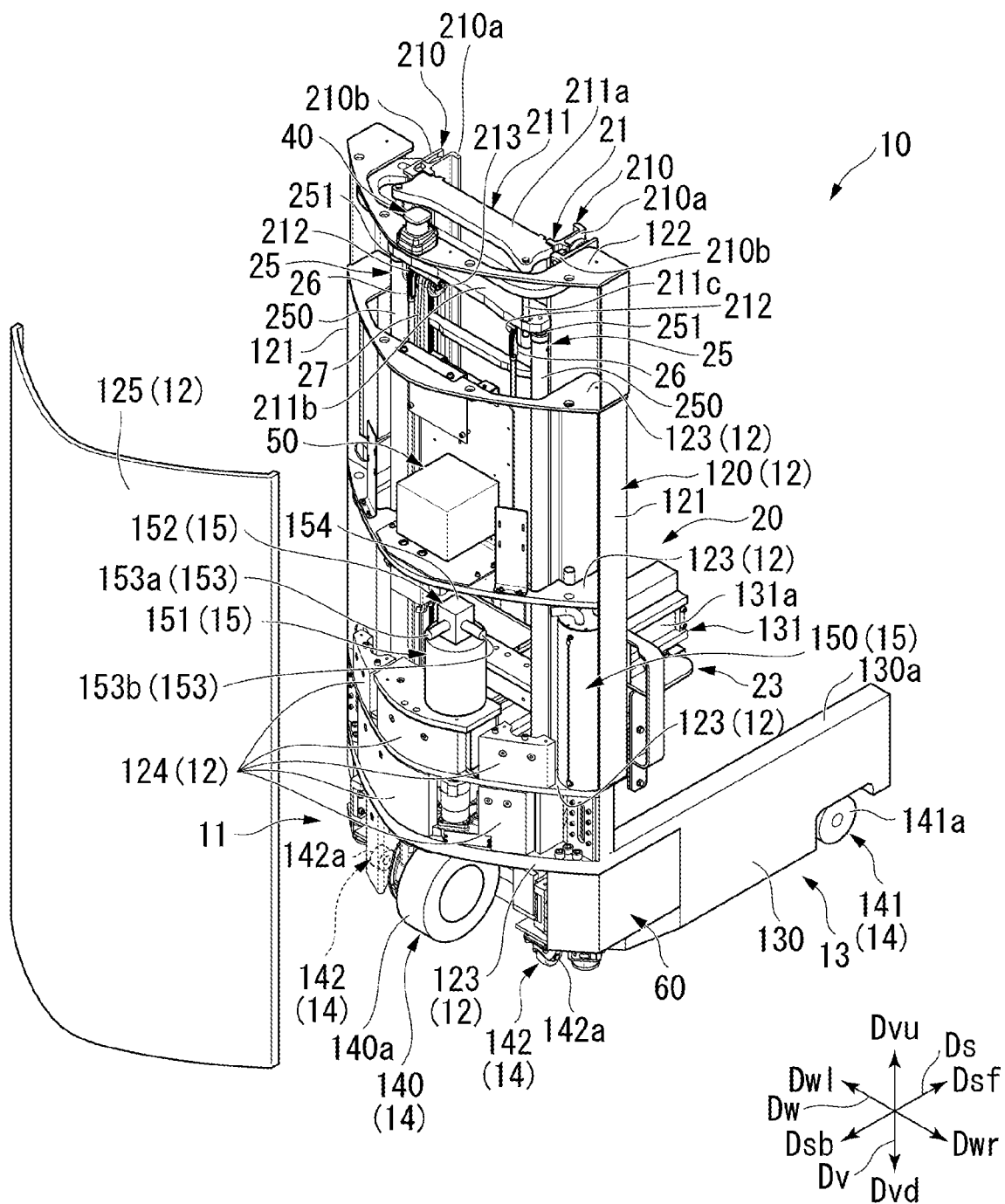
FIG. 4 is a second perspective view showing the configuration of the forklift according to the first embodiment of the present disclosure.

As shown in FIGS. 3 and 4, the forklift 10 includes a vehicle 11, a cargo handling device 20, a self-position sensor 40, a control device 50, and batteries 60. In addition, the forklift 10 further includes a forward and backward movement device 30 shown in FIGS. 5A, 5B and 6A, 6B.

Vehicle

The vehicle 11 is a main body portion of the forklift 10 and can travel on a road surface R within the logistics facility Lf. The vehicle 11 has a vehicle main body 12, straddle legs 13, a traveling mechanism 14, and a hydraulic device 15.

In the present embodiment, for the sake of convenience of description, of directions in which the vehicle 11 can proceed, a direction in which the vehicle 11 moves straight (a direction in which the vehicle 11 moves forward and backward) will be simply referred to as a "straight movement direction Ds". Furthermore, of two sides in the straight movement direction Ds, a side to which the vehicle 11 moves forward will be referred to as a "front side Dsf" and the opposite side thereto, to which the vehicle 11 moves backward, will be referred to as a "rear side Dsb".

Vehicle Main Body

The vehicle main body 12 includes an outer mast 120, beam portions 123, counterweights 124, and a cover 125.

The outer mast 120 includes a pair of columnar outer guides 121 of which the longitudinal direction is the vertical direction which is a perpendicular direction and a connection portion 122 that connects the pair of the outer guides 121 to each other in a vehicle width direction on the upper side.

In the present embodiment, for the sake of convenience of description, the vertical direction will be referred to as a "vertical direction Dv". Furthermore, of two sides in the vertical direction Dv, an upper side will be referred to as an "upper side Dvu" and a lower side opposite to the upper side will be referred to as a "lower side Dvd".

The pair of the outer guides 121 are separated from each other in a horizontal direction. The connection portion 122 is a plate-like member that fixes the relative positions of the pair of the outer guides 121. The connection portion 122 has a U-shape that is recessed toward the rear side Dsb as seen from the upper side Dvu. The outer guides 121 and the connection portion 122 are formed of metal or the like, for example.

In the present embodiment, for the sake of convenience of description, a direction in which the pair of the outer guides 121 are adjacent to each other will be referred to as a "vehicle width direction Dw". Furthermore, of two sides in the vehicle width direction Dw, a right side related to a case where the front side Dsf in the straight movement direction Ds is the front side will be referred to as a "first side Dwr" and the opposite side thereto will be referred to as a "second side Dwl". Note that, in the present embodiment, the horizontal directions are defined by the vehicle width direction Dw and the straight movement direction Ds.

The beam portions 123 are provided on the outer guides 121 to fix the relative positions of the pair of the outer guides 121 so that the mechanical strength of the entire outer mast 120 against an external force is enhanced. The beam portions 123 are plate-like members.

A plurality of the beam portions 123 are provided on the outer guides 121 to connect the pair of the outer guides 121 to each other in the vehicle width direction Dw. The plurality of beam portions 123 are disposed at intervals in the vertical direction Dv. In the present embodiment, four beam portions 123 are disposed at intervals in the vertical direction Dv.

The beam portions 123 are formed of metal or the like, for example. Each of the beam portions 123 has a U-shape that is recessed toward the rear side Dsb as seen from the upper side Dvu. The beam portions 123 in the present embodiment have the same shape as the connection portion 122.

End portions of the beam portions 123 that are on the first side Dwr are integrally fixed, by means of welding or a fastening member such as a bolt, to one of the pair of outer guides 121 that is positioned on the first side Dwr. End portions of the beam portions 123 that are on the second side Dwl are integrally fixed, by means of welding or a fastening member such as a bolt, to the other of the pair of outer guides 121 that is positioned on the second side Dwl.

The counterweights 124 are counterweights (weights) provided to balance the center of gravity of the entire forklift 10. In the present embodiment, a plurality of the counterweights 124 are placed on each of a surface of one of the plurality of beam portions 123 that is disposed closest to the lower side Dvd and a surface of the second beam portion 123 counting from the lower side Dvd, the surfaces facing the upper side Dvu. The counterweights 124 are formed of metal such as iron.

The cover 125 is a member that comes into contact with the pair of outer guides 121, each of the beam portions 123, and the counterweights 124 from the rear side Dsb so as to cover and hide the beam portions 123 and the counterweight 124 from the rear side Dsb. The cover 125 in the present embodiment is detachably fixed to the outer mast 120 by means of a fastening member such as a bolt. The cover 125 is formed of metal or the like, for example.

Straddle Leg

The straddle legs 13 support the vehicle main body 12 and support the cargo handling device 20 to be movable forward and backward in the straight movement direction Ds. The straddle legs 13 include main body portions 130 extending toward the front side Dsf from end portions of the outer guides 121 of the outer mast 120 of the vehicle main body 12 that are on the lower side Dvd and guide rails 131 that are fixed to the main body portions 130 in the vehicle width direction Dw.

Therefore, the pair of straddle legs 13 is disposed with an interval provided between the straddle legs 13 in the vehicle width direction Dw. Each of the main body portions 130 has a columnar shape. Regarding the pair of main body portions 130, the guide rail 131 is fixed, from the second side Dwl, to the main body portion 130 on the first side Dwr and the guide rail 131 is fixed, from the first side Dwr, to the main body portion 130 on the second side Dwl.

The main body portions 130 include receiving surfaces 130a that face the upper side Dvu and extend in the horizontal directions. The receiving surfaces 130a are portions of the straddle legs 13 that are positioned closest to the upper side Dvu. The dimension of the receiving surfaces 130a in the straight movement direction Ds is larger than the dimension of the pallet 70 in the straight movement direction Ds.

In addition, in the present embodiment, a separation distance between the pair of the receiving surfaces 130a adjacent to each other in the vehicle width direction Dw is equal to or smaller than the dimension of the pallet 70 in the vehicle width direction Dw. The separation distance here means a distance between an edge on the first side Dwr of the receiving surface 130a on the first side Dwr and an edge on the second side Dwl of the receiving surface 130a on the second side Dwl.

Note that the separation distance may be larger than the dimension of the pallet 70 in the vehicle width direction Dw. In this case, a distance between an edge on the second side Dwl of the receiving surface 130a on the first side Dwr and an edge on the first side Dwr of the receiving surface 130a on the second side Dwl is smaller than the dimension of the pallet 70.

The guide rails 131 of the pair of straddle legs 13 face each other in the vehicle width direction Dw. The guide rails 131 include guide grooves 131a that are recessed in the vehicle width direction Dw and that extend in the straight movement direction Ds along the main body portions 130.

The guide groove 131a formed on one of the pair of guide rails 131 that is on the first side Dwr is recessed toward the first side Dwr and extends along the main body portion 130 on the first side Dwr and a groove formed on the guide rail 131 on the second side Dwl is recessed toward the second side Dwl and extends along the main body portion 130 on the second side Dwl. The main body portions 130 and the guide rails 131 are formed of metal or the like, for example.

Traveling Mechanism

The traveling mechanism 14 is a mechanism that supports the vehicle main body 12 and the straddle legs 13 from the lower side Dvd and that makes the vehicle main body 12 and the straddle legs 13 movable on the road surface R. The traveling mechanism 14 in the present embodiment includes a first drive wheel 140, second drive wheels 141, and caster wheels 142.

The first drive wheel 140 is provided at the vehicle main body 12 while being on the lower side Dvd of the vehicle main body 12. Although detailed description is omitted, the first drive wheel 140 is composed of, for example, a first drive wheel main body 140a that can rotate in a state of being in contact with the road surface R and a first wheel holding mechanism (not shown) including a bearing or the like that holds the first drive wheel main body 140a with respect to the vehicle main body 12 such that rotation can be performed within a predetermined range.

The first drive wheel main body 140a corresponds to a tire portion of the first drive wheel 140. The first wheel holding mechanism can adjust the steering angle and the like of the first drive wheel main body 140a based on an instruction indicated by a signal received from the control device 50. Note that, the first drive wheel 140 is an in-wheel motor type wheel in which a motor is built into the first drive wheel main body 140a, for example.

The second drive wheels 141 are provided at the main body portions 130 while being on the lower side Dvd of the main body portions 130 of the straddle legs 13. Although detailed description is omitted, the second drive wheels 141 are composed of second drive wheel main bodies 141a that can rotate in a state of being in contact with the road surface R and second wheel holding mechanisms (not shown) including bearings or the like that hold the second drive wheel main bodies 141a with respect to the straddle legs 13 such that rotation can be performed within a predetermined range.

The second drive wheel main bodies 141a correspond to tire portions of the second drive wheels 141. The second wheel holding mechanisms adjust the steering angle and the like of the second drive wheel main bodies 141a based on an instruction indicated by a signal received from the control device 50. Note that, as with the first drive wheel 140, the second drive wheels 141 are in-wheel motor type wheels in which motors are built into the second drive wheel main bodies 141a, for example.

The caster wheels 142 are provided at the vehicle main body 12 such that the first drive wheel 140 is interposed between the caster wheels 142 in the vehicle width direction Dw on the lower side Dvd of the vehicle main body 12. The caster wheels 142 in the present embodiment are auxiliary wheels for the first drive wheel 140 and the second drive wheels 141.

Although detailed description is omitted, the caster wheels 142 are composed of caster wheel main bodies 142a that can rotate in a state of being in contact with the road surface R and caster wheel holding mechanisms (not shown) including bearings or the like that hold the caster wheel main bodies 142a with respect to the vehicle main body 12 such that rotation can be performed.

Hydraulic Device

The hydraulic device 15 is a device that supplies hydraulic oil to various devices such as the cargo handling device 20 and the forward and backward movement device 30. The hydraulic device 15 includes an oil tank 150, a hydraulic pump 151, and a hydraulic control valve 152.

The oil tank 150 stores hydraulic oil therein. The oil tank 150 is provided in the vehicle main body 12. The oil tank 150 in the present embodiment is placed, for example, on the surface of the second beam portion 123 counting from the lower side Dvd of the vehicle main body 12, the surface facing the upper side Dvu.

The hydraulic pump 151 compresses the hydraulic oil stored in the oil tank 150. The hydraulic pump 151 is provided at the vehicle main body 12. The hydraulic pump 151 in the present embodiment is placed, from the upper side Dvu, on the counterweight 124 placed on the second beam portion 123 counting from the lower side Dvd of the vehicle main body 12, for example. A motor (not shown) as a driving source of the hydraulic pump 151 is connected to the hydraulic pump 151, for example.

The hydraulic control valve 152 adjusts the hydraulic pressure (the discharge pressure) of the hydraulic oil compressed by the hydraulic pump 151 and supplies the hydraulic-pressure-adjusted hydraulic oil to various devices outside the hydraulic device 15.

The hydraulic control valve 152 is provided at the vehicle main body 12. The hydraulic control valve 152 in the present embodiment is placed on the hydraulic pump 151 from the upper side Dvu. The oil tank 150, the hydraulic pump 151, and the hydraulic control valve 152 are connected to each other by a pipe (not shown) through which hydraulic oil can flow.

The hydraulic control valve 152 includes discharge ports 153 through which the hydraulic oil compressed by the hydraulic pump 151 is discharged to the outside and a valve control unit 154 that adjusts the flow rate of hydraulic oil passing through the discharge port 153 based on an instruction indicated by a signal received from the control device 50.

The hydraulic pressure of hydraulic oil discharged from the discharge port 153 is controlled by the valve control unit 154. The discharge port 153 is composed of a first discharge port 153a through which hydraulic oil is discharged to the cargo handling device 20 and a second discharge port 153b through which hydraulic oil is discharged to the forward and backward movement device 30. The valve control unit 154 can control the first discharge port 153a and the second discharge port 153b independently of each other.

Cargo Handling Device

The cargo handling device 20 is a device that performs loading and unloading of the cargo 2 on the vehicle 11. The cargo handling device 20 includes an inner mast 21 (a mast), a lift bracket 22, forks 23, a backrest 24, lift cylinders 25, lift chains 26, and a first hydraulic hose 27.

Inner Mast

The inner mast 21 is a device that can move forward and backward in the straight movement direction Ds while being supported and guided by the straddle legs 13. The inner mast 21 extends from a front portion of the vehicle 11 in the vertical direction Dv. That is, the inner mast 21 extends to the upper side Dvu from the straddle legs 13 that are part of the vehicle 11 positioned on the front side Dsf.

The inner mast 21 is disposed between the pair of outer guides 121 of the outer mast 120 as seen in the straight movement direction Ds. The inner mast 21 includes inner guides 210, a chain support 211, chain wheels 212, and a pulley 213.

Each of the inner guides 210 has a columnar shape of which the longitudinal direction is the vertical direction Dv. The inner guides 210 can be expanded and contracted in the vertical direction. The inner guides 210 include inner side guides 210a and outer side guides 210b.

The inner side guides 210a and the outer side guides 210b are disposed to overlap with each other in the vehicle width direction Dw. Although the configurations thereof are not shown in detail, the inner side guides 210a can be slid with respect to the outer side guides 210b in the vertical direction Dv, so that only the inner side guides 210a can move forward and backward in the vertical direction Dv.

The outer side guides 210b extend from the straddle legs 13 to the upper side Dvu, along each of the pair of outer mast 120 of the vehicle main body 12, in a state of being supported by the straddle legs 13. That is, a pair of the inner guides 210 is disposed such that the inner guides are separated from each other in the vehicle width direction Dw.

A pair of outer side guides is provided on the straddle legs 13 to be slidable on the straddle legs 13 in the straight movement direction Ds in a state where the outer side guides are separated from each other in the vehicle width direction Dw. Specifically, for example, the outer side guides 210b further include guide wheels (not shown) provided on the lower side Dvd and the guide wheels are rotatably provided in the guide grooves 131a formed in the guide rails 131 of the straddle legs 13.

The chain support 211 transmits to the pair of inner guides 210, power toward the upper side Dvu that is received from the lift cylinders 25 positioned closer to the lower side Dvd than the chain support 211.

The chain support 211 includes a first plate 211a that connects end portions of the inner side guides 210a of the pair of inner guides 210 that are on the upper side Dvu to each other, a second plate 211b that is positioned closer to the lower side Dvd than the first plate 211a, and a pair of connection posts 211c that connects the first plate 211a and the second plate 211b to each other in the vertical direction Dv.

Each of the first plate 211a and the second plate 211b has a plate-like shape extending in the horizontal directions. The pair of connection posts 211c is disposed with an interval provided between the connection posts 211c in the vehicle width direction Dw. The first plate 211a, the second plate 211b, and the connection posts 211c are formed of metal, for example.

The chain wheels 212 are members that can support and guide the lift chains 26 formed of metal or the like. A pair of the chain wheels 212 is provided on the second plate 211b of the chain support 211 from the lower side Dvd. The pair of chain wheels 212 is disposed with an interval provided between the chain wheels 212 in the vehicle width direction Dw.

The pulley 213 is a pulley around which the first hydraulic hose 27 is wound. The pulley 213 is provided on the second plate 211b of the chain support 211 from the lower side Dvd. The pulley 213 in the present embodiment is disposed adjacent to, from the first side Dwr, one of the pair of chain wheels 212 that is positioned on the second side Dwl.

Lift Bracket

The lift bracket 22 is provided on the inner mast 21 to be movable upward and downward. The lift bracket 22 is formed of metal or the like. The lift bracket 22 includes a fork fixation portion 220 and a fork rail 221.

The fork fixation portion 220 is a plate-like member of which the longitudinal direction is the vehicle width direction Dw. The fork fixation portion 220 comes into contact with the pair of inner guides 210 of the inner mast 21 from the front side Dsf. One end of each of the pair of the lift chains 26 wound around the pair of the chain wheels 212 is fixed to the fork fixation portion 220.

The fork rail 221 is a columnar member extending in the vehicle width direction Dw. The fork rail 221 is integrally fixed to the lift bracket 22 from the lower side Dvd by means of a fastening member such as a bolt.

Fork

The forks 23 are members used to move the cargo 2 placed on the pallet 70 together with the pallet 70 by being inserted into the fork pockets 73 of the pallet 70. A pair of the forks 23 is provided at the lift bracket 22. The pair of forks 23 is disposed with an interval provided between the forks 23 in the vehicle width direction Dw. The forks 23 are formed of metal or the like, for example. The forks 23 include base end portions 230 and claw portions 231.

The base end portions 230 are provided on the fork rail 221 of the lift bracket 22. Specifically, the base end portions 230 are fixed to be integrated with the fork fixation portion 220 and the fork rail 221 by means of the fastening member in a state where end portions of the base end portions 230 that are on the upper side Dvu are interposed between the fork rail 221 and the fork fixation portion 220. The base end portions 230 extend to a position that is closer to the lower side Dvd than the fork rail 221.

The claw portions 231 extend from lower ends of the base end portions 230 toward the front side Dsf integrally with the base end portions 230. The dimension of the claw portions 231 in the straight movement direction Ds is larger than the dimension of the base end portions 230 in the vertical direction Dv. The claw portions 231 include retaining surfaces 231a that face the lower side Dvd and that extend in the horizontal directions, pallet supporting surfaces 231b that face the upper side Dvu and that extend in the horizontal directions, and claw portion side surfaces 231c that connect the retaining surfaces 231a and the pallet supporting surfaces 231b to each other in the vertical direction Dv.

Backrest

The backrest 24 is a cargo-receiving frame that prevents the cargo 2 from falling to a space between the pair of inner guides 210 of the inner mast 21 when the forks 23 lift the pallet 70 on which the cargo 2 is placed. The backrest 24 includes a pair of fixation portions 240 that is fixed to the fork rail 221 of the lift bracket 22 in the vehicle width direction Dw and a fence portion 241 that is integrally formed with the fixation portions 240, is disposed closer to the upper side Dvu than the lift bracket 22 is, and has a fence-like shape.

Lift Cylinder

The lift cylinders 25 are hydraulic mechanisms provided at the straddle legs 13. The lift cylinders 25 include first cylinder portions 250 and first rod portions 251.

Each of the first cylinder portions 250 has a cylindrical shape. The first cylinder portions 250 extend in the vertical direction Dv along the outer guides 121 and the inner guides 210. The caster wheels 142 are provided at lower ends of the first cylinder portions 250. The other ends of the lift chains 26 are fixed to the first cylinder portions 250. That is, the first cylinder portions 250 and the lift bracket 22 are connected to each other by the lift chains 26.

A pair of the first cylinder portions 250 is provided on the straddle legs 13 to be slidable on the straddle legs 13 in the straight movement direction Ds in a state where the first cylinder portions 250 are separated from each other in the vehicle width direction Dw. Specifically, for example, the lift cylinders 25 further include guide wheels (not shown) provided on the lower side Dvd of the first cylinder portions 250 and the guide wheels are rotatably provided in the guide grooves 131a formed in the guide rails 131 of the straddle legs 13.

When the guide wheels rotate in the guide grooves 131a, the caster wheels 142 also rotate in a state of being in contact with the road surface R. Accordingly, the entire lift cylinders 25 are movable in the straight movement direction Ds on the straddle legs 13 together with the inner mast 21.

The first rod portions 251 can proceed to the upper side Dvu from the inside of the first cylinder portions 250 in accordance with the degree to which the hydraulic pressure of hydraulic oil supplied from the outside is applied. Each of the first rod portions 251 has a cylindrical shape extending in the vertical direction Dv. The outer diameters of the first rod portions 251 are smaller than the inner diameters of the first cylinder portions 250. That is, the first rod portions 251 and the first cylinder portions 250 are in a relationship of fitting compactly within each other.

End portions of the first rod portions 251 that are on the upper side Dvu are fixed to the second plate 211b of the chain support 211 from the lower side Dvd. Accordingly, when the first rod portions 251 proceed toward the upper side Dvu from the first cylinder portions 250, the inner side guides 210a of the inner mast 21 connected to the chain support 211 proceed toward the upper side Dvu (are pressed toward the upper side Dvu).

Through the first hydraulic hose 27, hydraulic oil is supplied into the lift cylinders 25. One end of the first hydraulic hose 27 is connected to the first discharge port 153a of the hydraulic control valve 152 of the hydraulic device 15.

The other end of the first hydraulic hose 27 is connected to the first cylinder portions 250 of the lift cylinders 25. Accordingly, hydraulic oil discharged from the first discharge port 153a of the hydraulic control valve 152 is supplied into the first cylinder portions 250 through the first hydraulic hose 27.

Figure 5B:
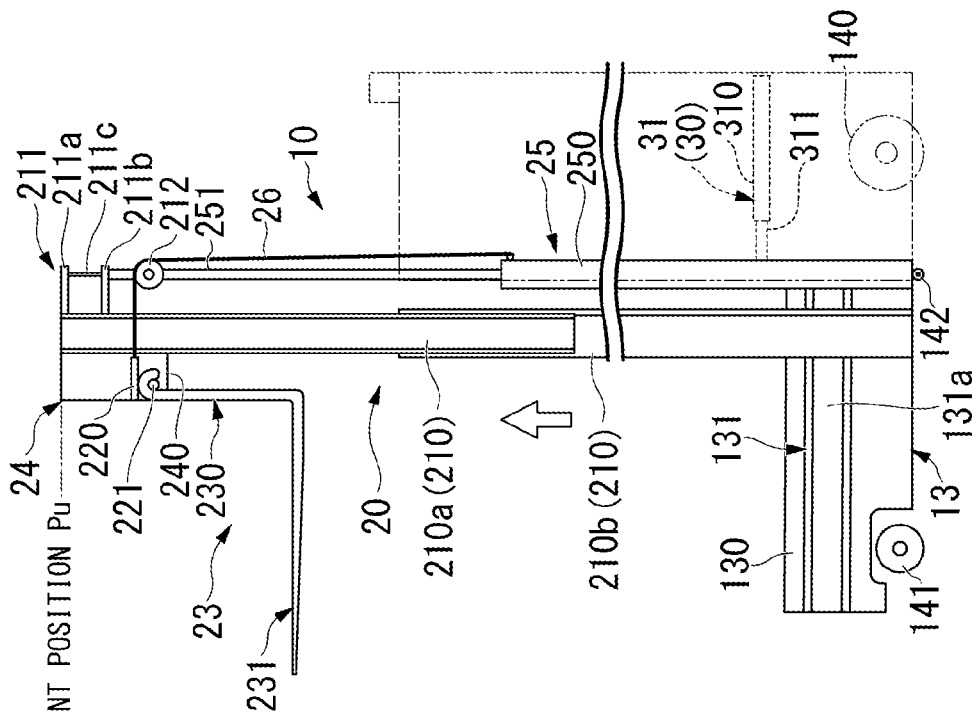
FIG. 5 is a view for description about an upward and downward movement operation of a cargo handling device according to the first embodiment of the present disclosure.
Figure 5A:
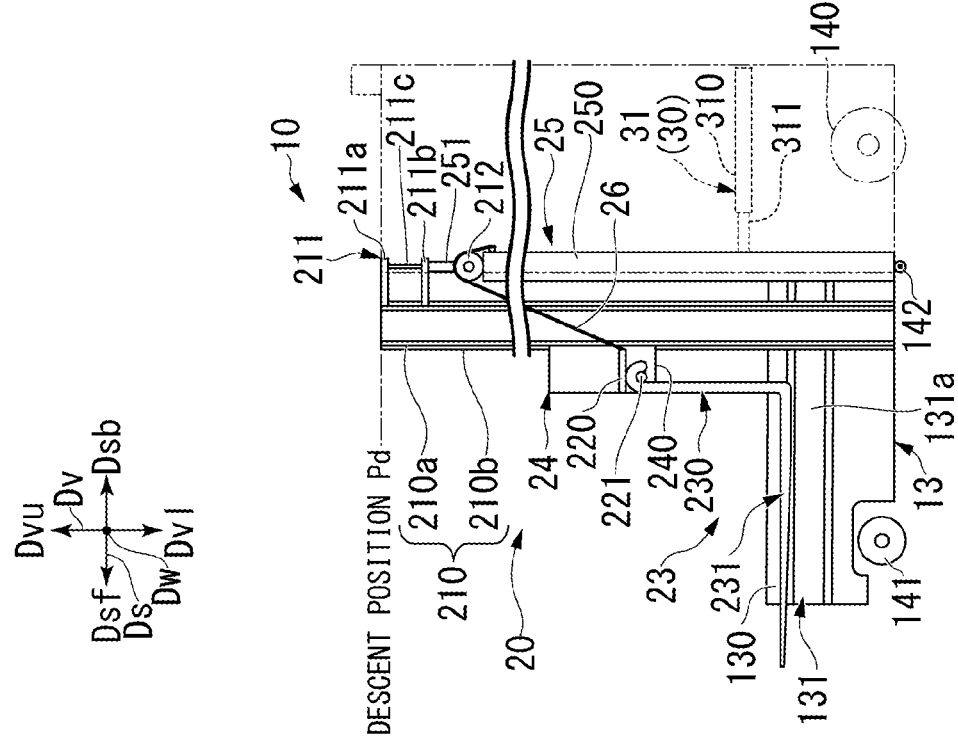

Here, an upward and downward movement operation of the cargo handling device 20 will be described with reference to FIGS. 5A and 5B. In an initial state, the major parts of the first rod portions 251 of the lift cylinders 25 are accommodated in the first cylinder portions 250. Accordingly, the inner mast 21 is in a state of being positioned closest to the lower side Dvd.

That is, the cargo handling device 20 is in a state of being positioned closest to the lower side Dvd while being on the vehicle 11. In the present embodiment, for the sake of convenience of description, the position of the cargo handling device 20 in the vertical direction Dv in such a state will be referred to as a "descent position Pd".

When hydraulic oil is supplied to the first cylinder portions 250 in a state where the cargo handling device 20 is at the descent position Pd, the first rod portions 251 proceed toward the upper side Dvu. Accordingly, the chain support 211 is lifted and the inner side guides 210a of the inner mast 21 connected to the chain support 211 proceed to the upper side Dvu (move upward).

When the first rod portions 251 are completely pressed to the upper side Dvu because of the hydraulic oil, the cargo handling device 20 is in a state of being positioned closest to the upper side Dvu while being on the vehicle 11. In the present embodiment, for the sake of convenience of description, the position of the cargo handling device 20 in the vertical direction Dv in such a state will be referred to as an "ascent position Pu", and an operation in which the position of the cargo handling device 20 is shifted toward the upper side Dvu will be referred to as "a lift-up operation". In the present embodiment, the ascent position Pu is a position where the claw portions 231 of the pair of forks 23 can be inserted into the fork pockets 73 of the pallet 70.

When the hydraulic pressure of the hydraulic oil supplied from the hydraulic control valve 152 is lowered in a state where the cargo handling device 20 is at the ascent position Pu, the first rod portions 251 move toward the lower side Dvd and are embedded into the first cylinder portions 250.

That is, the cargo handling device 20 is shifted (moved downward) from the ascent position Pu to the descent position Pd. In the present embodiment, for the sake of convenience of description, an operation in which the position of the cargo handling device 20 is shifted toward the lower side Dvd will be referred to as "a lift-down operation".

When the inner mast 21 moves from the descent position Pd to the ascent position Pu, a direction from the one end of each of the lift chains 26 to the other end thereof changes from a direction to the upper side Dvu to a direction to the lower side Dvd. At this time, the lift bracket 22 and the first cylinder portions 250 are connected to each other by the lift chains 26 each having a constant length.

Accordingly, the one end of each of the lift chains 26 is pulled toward the upper side Dvu as the inner mast 21 moves upward. Since the lift chains 26 are pulled, the chain wheels 212 of the inner mast 21 rotate. That is, the chain wheels 212 function as movable pulleys.

Forward and Backward Movement Device

The forward and backward movement device 30 is a device that causes the inner mast 21 of the cargo handling device 20 to move forward and backward in the straight movement direction Ds on the straddle legs 13. The forward and backward movement device 30 is a hydraulic mechanism provided in the vehicle main body 12. In the present embodiment, because of space limitations, the forward and backward movement device 30 is shown by dashed lines only in FIGS. 5A, 5B and 6A and 6B, and is not shown in detail.

The forward and backward movement device 30 in the present embodiment includes a pair of reach cylinders 31 that expands and contracts in the straight movement direction Ds to cause the inner mast 21 to move forward and backward in the straight movement direction Ds and a second hydraulic hose (not shown) through which hydraulic oil is supplied to the pair of reach cylinders 31.

The pair of reach cylinders 31 is disposed with an interval in the vehicle width direction Dw. The reach cylinders 31 include second cylinder portions 310 provided at the beam portion 123 positioned closest to the lower side Dvd and second rod portions 311 that can proceed to the front side Dsf from the second cylinder portions 310 in accordance with the degree to which the hydraulic pressure of hydraulic oil supplied from the outside is applied.

Each of the second cylinder portions 310 and the second rod portions 311 has a cylindrical shape extending in the straight movement direction Ds. The outer diameters of the second rod portions 311 are smaller than the inner diameters of the second cylinder portions 310. That is, the second rod portions 311 and the second cylinder portions 310 are in a relationship of fitting compactly within each other.

End portions of the second rod portions 311 that are on the front side Dsf are connected to the first cylinder portions 250 of the lift cylinders 25 of the cargo handling device 20 from the rear side Dsb. Accordingly, when the second rod portions 311 proceed toward the front side Dsf, the inner mast 21 which is connected to the first cylinder portions 250 via the first rod portions 251 also proceeds toward the front side Dsf (moves forward).

The second hydraulic hose (not shown) is a hose for supply of hydraulic oil to the inside of the reach cylinders 31. One end of the second hydraulic hose is connected to the second discharge port 153b of the hydraulic control valve 152 of the hydraulic device 15. The other end of the second hydraulic hose is connected to the second cylinder portions 310.

Here, a forward and backward movement operation of the cargo handling device which is performed by the forward and backward movement device 30 will be described with reference to FIGS. 6A and 6B. In an initial state, the second rod portions 311 of the reach cylinders 31 are accommodated in the second cylinder portions 310.

Accordingly, the inner mast 21 is in a state of being positioned closest to the rear side Dsb. That is, the cargo handling device 20 is in a state of being positioned closest to the rear side Dsb while being on the vehicle 11. In the present embodiment, for the sake of convenience of description, the position of the cargo handling device 20 in the straight movement direction Ds in such a state will be referred to as a "retreat position Pb".

Here, front ends of the claw portions 231 of the forks 23 of the cargo handling device 20 are positioned behind front ends of the straddle legs 13 of the vehicle 11 when the cargo handling device 20 is positioned closest to the rear side Dsb (that is, when the cargo handling device 20 is at the retreat position Pb).

When hydraulic oil is supplied to the second cylinder portions 310 in a state where the cargo handling device 20 is at the retreat position Pb, the second rod portions 311 proceed toward the front side Dsf. Accordingly, the first cylinder portions 250 are pressed toward the front side Dsf and thus the inner mast 21 which is connected to the first cylinder portions 250 via the first rod portions 251 proceeds toward the front side Dsf (moves forward).

When the second rod portions 311 are completely pressed to the front side Dsf because of the hydraulic oil, the cargo handling device 20 is in a state of being positioned closest to the front side Dsf while being on the vehicle 11. In the present embodiment, for the sake of convenience of description, the position of the cargo handling device 20 in the straight movement direction Ds in such a state will be referred to as an "advance position Pf", and an operation in which the position of the cargo handling device 20 is shifted toward the front side Dsf will be referred to as a "reach-out operation". In the present embodiment, the advance position Pf is a position where the claw portions 231 of the pair of forks 23 are supportably inserted in the fork pockets 73 of the pallet 70.

When the hydraulic pressure of the hydraulic oil supplied from the hydraulic control valve 152 is lowered in a state where the cargo handling device 20 is at the advance position Pf, the second rod portions 311 move toward the rear side Dsb and are embedded into the second cylinder portions 310.

That is, the cargo handling device 20 is shifted (retreats) from the advance position Pf to the retreat position Pb. In the present embodiment, for the sake of convenience of description, an operation in which the position of the cargo handling device 20 is shifted toward the rear side Dsb will be referred to as "a reach-in operation".

Self-Position Sensor

As shown in FIGS. 3 and 4, the self-position sensor 40 acquires data that is input at the time of calculation for acquisition of the self-position of the forklift 10. Examples of the self-position sensor 40 include a laser scanner such as a 2D-LiDAR, a camera, and the like. The self-position sensor 40 in the present embodiment is provided at the connection portion 122 of the outer mast 120 from the upper side Dvu.

Control Device

Figure 7:
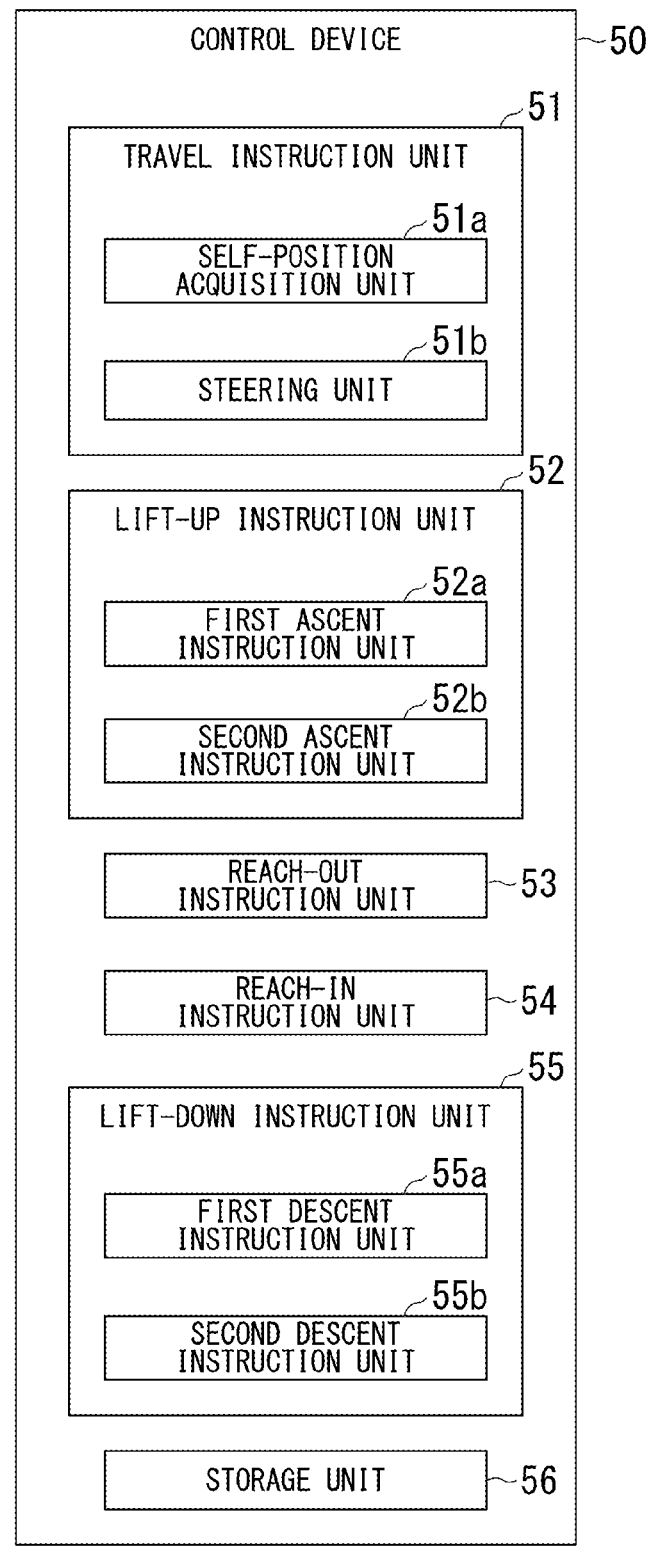
FIG. 7 is a functional block diagram showing the configuration of a control device according to the first embodiment of the present disclosure.

The control device 50 is a device that controls the vehicle 11, the cargo handling device 20, and the forward and backward movement device 30. As shown in FIG. 7, the control device 50 includes a travel instruction unit 51, a lift-up instruction unit 52, a reach-out instruction unit 53, a reach-in instruction unit 54, a lift-down instruction unit 55, and a storage unit 56.

Travel Instruction Unit

The travel instruction unit 51 causes the vehicle 11 to travel along a predetermined route so as to move to a target position. For example, as shown in FIG. 8, a target position X means a position where the forklift 10 can perform a cargo handling operation such as loading and unloading in the logistics facility Lf.

The target position X in the present embodiment means a position to which the forklift 10 needs to move and at which a cargo handling operation can be performed. In other words, the target position X means a position where the claw portions 231 of the pair of forks 23 can be inserted into the fork pockets 73 of the pallet 70 at the time of a lift-up operation and a reach-out operation of a cargo handling mechanism.

The coordinates and the like of the target position X within the logistics facility Lf are stored in the storage unit 56 in advance, and can be referred to by the travel instruction unit 51. Note that the target position X may be stored in, for example, the host device 3 in advance and the travel instruction unit 51 may acquire data indicating the target position X from the host device 3 by means of wireless communication.

The travel instruction unit 51 includes a self-position acquisition unit 51a that acquires sensor data from the self-position sensor 40 included in the vehicle main body and that acquires a self-position based on the sensor data and a steering unit 51b that causes the traveling mechanism 14 to travel to the target position X based on the acquired self-position.

In a case where the self-position sensor 40 is, for example, a laser scanner as described above, point cloud data can be an exemplary example of the sensor data. In addition, in a case where the self-position sensor 40 is, for example, a camera as described above, image data can be an exemplary example of the sensor data.

Although the detailed description is omitted, the self-position acquisition unit 51a acquires the self-position by performing predetermined self-position calculation based on the acquired sensor data. The steering unit 51b causes the vehicle body to travel to the target position X along a predetermined route based on the self-position acquired by the self-position acquisition unit 51a. The steering unit 51b causes the vehicle body to travel to the target position X by transmitting a signal indicating a steering instruction to the first drive wheel 140 and the second drive wheels 141 of the traveling mechanism 14.

Lift-Up Instruction Unit

After the forklift 10 is moved to the target position X, the lift-up instruction unit 52 causes the cargo handling device 20 to perform the lift-up operation. Specifically, the lift-up instruction unit 52 transmits, to the valve control unit 154 of the hydraulic control valve 152, a signal indicating an instruction to increase the hydraulic pressure of hydraulic oil discharged from the first discharge port 153a. The lift-up instruction unit 52 includes a first ascent instruction unit 52a and a second ascent instruction unit 52b.

The first ascent instruction unit 52a causes the cargo handling device 20 to perform the lift-up operation by transmitting the above-described signal to the hydraulic control valve 152. In other words, the first ascent instruction unit 52a causes the pair of claw portions 231 to move upward to a height at which the pair of claw portions 231 can be inserted into the fork pockets 73 of the pallet 70.

When the pair of claw portions 231 is inserted into the fork pockets 73, the second ascent instruction unit 52b transmits the above-described signal to the hydraulic control valve 152 so as to cause the cargo handling device 20 to perform the lift-up operation. That is, the second ascent instruction unit 52b causes the pallet supporting surfaces 231b of the claw portions 231 to support the pallet 70.

Reach-Out Instruction Unit

The reach-out instruction unit 53 causes the cargo handling device 20 to perform the reach-out operation after the cargo handling device 20 is caused to perform the lift-up operation by the first ascent instruction unit 52a. That is, the reach-out instruction unit 53 causes the cargo handling device 20 to perform the reach-out operation after the pair of claw portions 231 is moved upward to the height at which the pair of claw portions 231 can be inserted into the fork pockets 73.

Specifically, the reach-out instruction unit 53 transmits, to the valve control unit 154 of the hydraulic control valve 152, a signal indicating an instruction to increase the hydraulic pressure of hydraulic oil discharged from the second discharge port 153b.

Reach-In Instruction Unit

The reach-in instruction unit 54 causes the cargo handling device 20 to perform the reach-in operation after the cargo handling device 20 is caused to perform the lift-up operation by the second ascent instruction unit 52b. That is, the reach-in instruction unit 54 causes the cargo handling device 20 to perform the reach-in operation after the pair of claw portions 231 lifts the pallet 70.

Specifically, the reach-in instruction unit 54 transmits, to the valve control unit 154 of the hydraulic control valve 152, a signal indicating an instruction to decrease the hydraulic pressure of hydraulic oil discharged from the second discharge port 153b.

Lift-Down Instruction Unit

The lift-down instruction unit 55 causes the cargo handling device 20 to perform the reach-in operation by means of the reach-in instruction unit 54. In other words, the lift-down instruction unit 55 causes the cargo handling device 20 to perform the lift-down operation.

Specifically, the lift-down instruction unit 55 transmits, to the valve control unit 154 of the hydraulic control valve 152, a signal indicating an instruction to decrease the hydraulic pressure of hydraulic oil discharged from the first discharge port 153a. The lift-down instruction unit 55 includes a first descent instruction unit 55a and a second descent instruction unit 55b.

The first descent instruction unit 55a causes the cargo handling device 20 to perform the lift-down operation by transmitting the above-described signal to the hydraulic control valve 152. That is, the first descent instruction unit 55a causes the pallet 70 to be placed on the straddle legs 13. That is, the first descent instruction unit 55a brings the placement surface 71 of the pallet 70 into contact with the receiving surfaces 130a of the main body portions 130 of the straddle legs 13.

After the operation of the first descent instruction unit 55a, the second descent instruction unit 55b transmits the above-described signal to the hydraulic control valve 152 so as to cause the cargo handling device 20 to further perform the lift-down operation. That is, the second descent instruction unit 55b causes the pallet 70 to be pressed against the straddle legs 13. In other words, the first descent instruction unit 55a causes the retaining surfaces 231a of the pair of claw portions 231 to be pressed against the inner surfaces 74 of the fork pockets 73 from the upper side Dvu.

Battery

As shown in FIGS. 3 and 4, the batteries 60 supply power to the first drive wheel 140 and the second drive wheels 141 of the traveling mechanism 14, the motor (not shown) connected to the hydraulic pump 151 of the hydraulic device 15, the control device 50, and the like. The batteries 60 in the present embodiment are detachably provided at end portions of the main body portions 130 of the straddle legs 13 that are on the rear side Dsb.

Lithium ion batteries can be exemplary examples of the batteries 60, for example. The batteries 60, the first drive wheel 140 and the second drive wheels 141 of the traveling mechanism 14, the motor, and the control device 50 are electrically connected to each other by cables or the like (not shown).

Operation of Control Device

Figure 9:
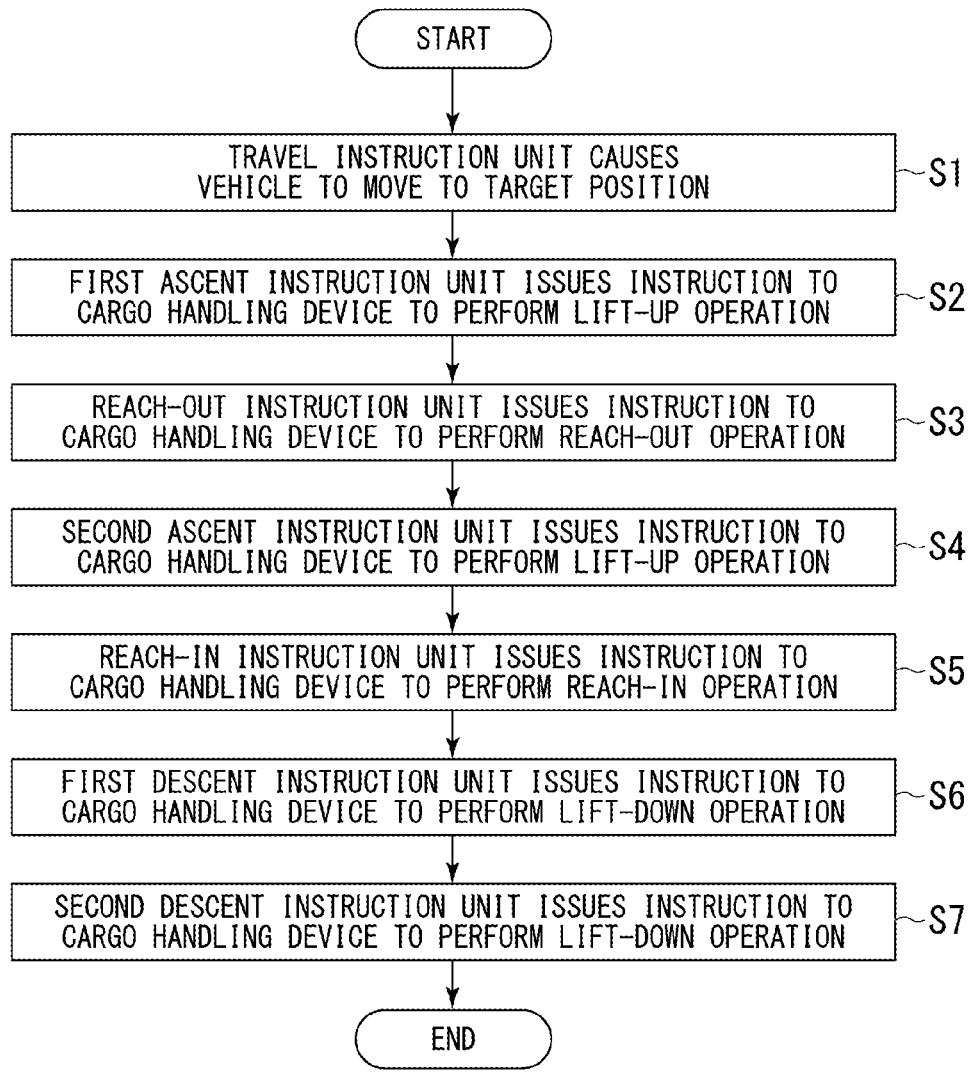
FIG. 9 is a flow chart showing the operation of the control device according to the first embodiment of the present disclosure.

Next, the operation of the control device 50 will be described with reference to FIG. 9. Processes as shown in a flowchart in FIG. 9 that is related to the control device 50 are repeated with a traveling operation, an unloading operation, or the like during activation of the forklift 10 performed therebetween.

The travel instruction unit 51 acquires sensor data from the self-position sensor 40, acquires a self-position based on the sensor data, and causes the vehicle 11 to move to the target position X based on the acquired self-position (step S1).

After the forklift 10 moves to the target position X, the first ascent instruction unit 52a of the lift-up instruction unit 52 transmits, to the valve control unit 154 of the hydraulic control valve 152, a signal indicating an instruction to increase the hydraulic pressure of hydraulic oil discharged from the first discharge port 153a (step S2).

After the pair of claw portions 231 is moved upward to a height at which the pair of claw portions 231 can be inserted into the fork pockets 73, the reach-out instruction unit 53 transmits, to the valve control unit 154 of the hydraulic control valve 152, a signal indicating an instruction to increase the hydraulic pressure of hydraulic oil discharged from the second discharge port 153b (step S3).

When the pair of claw portions 231 is inserted into the fork pockets 73, the second ascent instruction unit 52b of the lift-up instruction unit 52 transmits, to the valve control unit 154 of the hydraulic control valve 152, a signal indicating an instruction to increase the hydraulic pressure of hydraulic oil discharged from the first discharge port 153a (step S4).

After the pair of claw portions 231 lifts the pallet 70, the reach-in instruction unit 54 transmits, to the valve control unit 154 of the hydraulic control valve 152, a signal indicating an instruction to increase the hydraulic pressure of hydraulic oil discharged from the second discharge port 153b (step S5).

The first descent instruction unit 55a of the lift-down instruction unit 55 transmits, to the valve control unit 154 of the hydraulic control valve 152, a signal indicating an instruction to decrease the hydraulic pressure of hydraulic oil discharged from the first discharge port 153a (step S6).

When the pallet 70 is placed on the straddle legs 13, the second descent instruction unit 55b of the lift-down instruction unit 55 transmits, to the valve control unit 154 of the hydraulic control valve 152, a signal indicating an instruction to further decrease the hydraulic pressure of hydraulic oil discharged from the first discharge port 153a (step S7).

Loading Method

Figure 10:
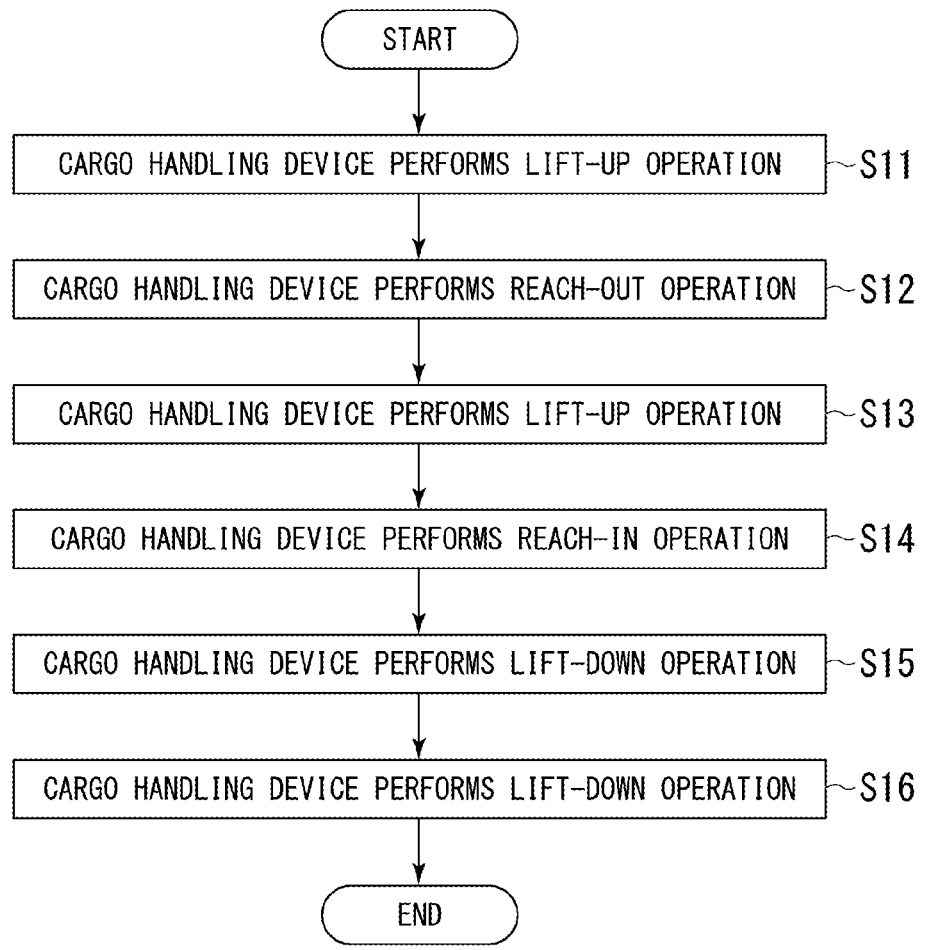
FIG. 10 is a flow chart showing a loading method according to the first embodiment of the present disclosure.

Next, a loading method of loading the cargo 2 onto the forklift 10 will be described with reference to FIGS. 10 to 13. As shown in FIG. 10, the loading method includes a first step S11, a second step S12, a third step S13, a fourth step S14, a fifth step S15, and a sixth step S16.

First Step

The first step S11 is a step in which the cargo handling device 20 performs the lift-up operation. In the first step S1, the cargo handling device 20 is shifted (moved upward) from the descent position Pd to the ascent position Pu. That is, in the first step S11, the claw portions 231 of the pair of forks 23 of the cargo handling device 20 are moved upward to a height at which the claw portions 231 can be inserted into the fork pockets 73 of the pallet 70.

Second Step

The second step S12 is a step in which the cargo handling device 20 performs the reach-out operation after the first step S11. In the second step S12, the cargo handling device 20 is shifted (moved forward) from the retreat position Pb to the advance position Pf. That is, in the second step S12, the claw portions 231 of the pair of forks 23 of the cargo handling device 20 are inserted into the fork pockets 73 of the pallet 70 to a depth at which the claw portions 231 can support the pallet 70.

Third Step

The third step S13 is a step in which the cargo handling device 20 performs the lift-up operation after the second step S12. In the third step S13, the position of the cargo handling device 20 is shifted (moved upward) to the upper side Dvu.

Figure 11:
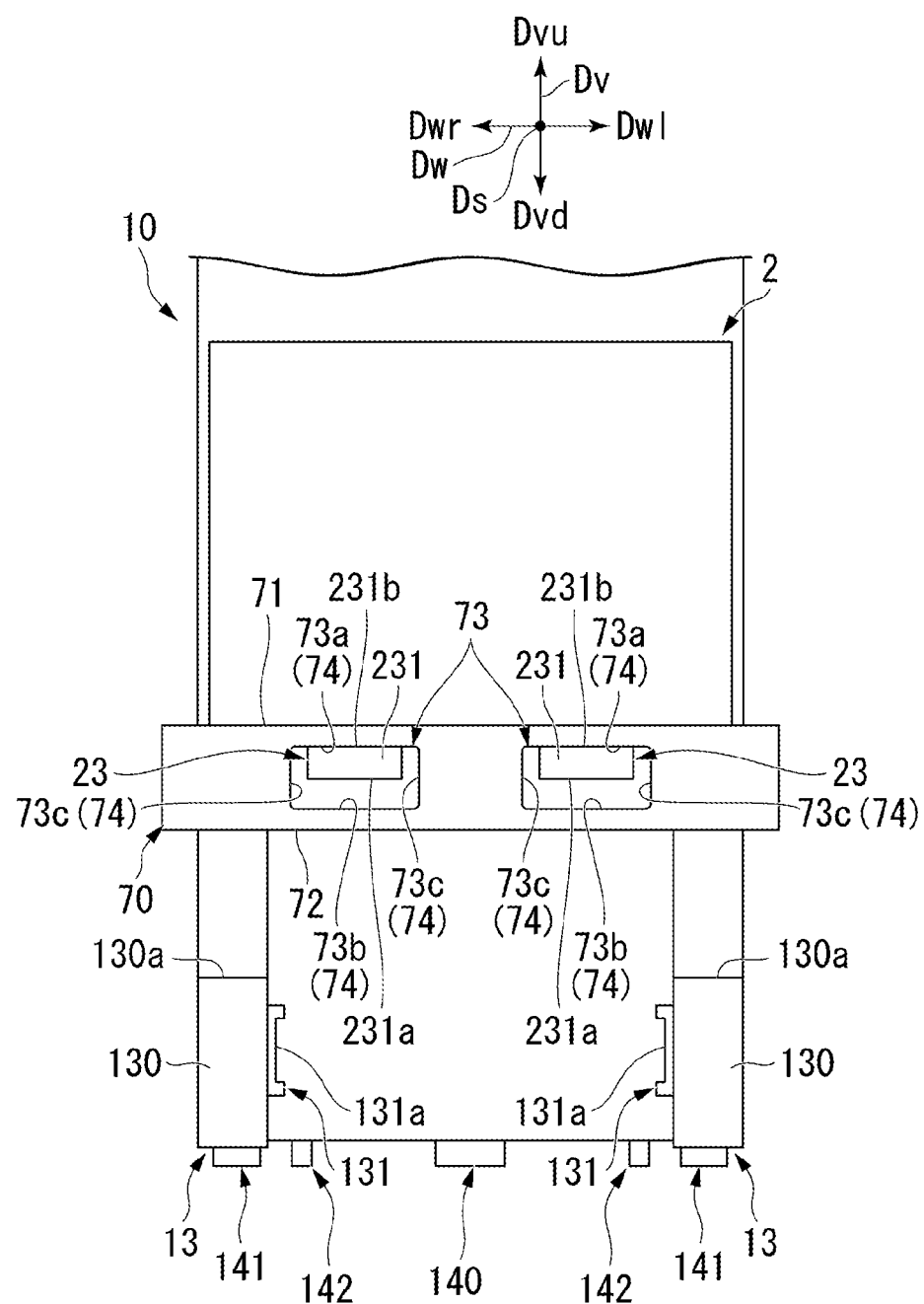
FIG. 11 is a view showing a state where the cargo handling device performs a lift-up operation in a third step in the loading method according to the first embodiment of the present disclosure.

That is, as shown in FIG. 11, in the third step S13, after the pallet supporting surfaces 231b of the claw portions 231 of the pair of forks 23 of the cargo handling device 20 come into contact with the upper surfaces 73a of the inner surfaces 74 of the fork pockets 73, the pair of forks 23 lifts the pallet 70 to the upper side Dvu from a place (a shelf or the like) where the pallet 70 is placed.

Fourth Step

The fourth step S14 is a step in which the cargo handling device 20 performs the reach-in operation after the third step S13. In the fourth step S14, the cargo handling device 20 is shifted (retreats) from the advance position Pf to the retreat position Pb. That is, in the fourth step S14, the claw portions 231 of the pair of forks 23 of the cargo handling device 20 move to the retreat position Pb in a state of supporting the pallet 70.

Fifth Step

The fifth step S15 is a step in which the cargo handling device 20 performs the lift-down operation after the fourth step S14. In the fifth step S15, the cargo handling device 20 is shifted (moved downward) from the ascent position Pu to the descent position Pd.

Figure 12:
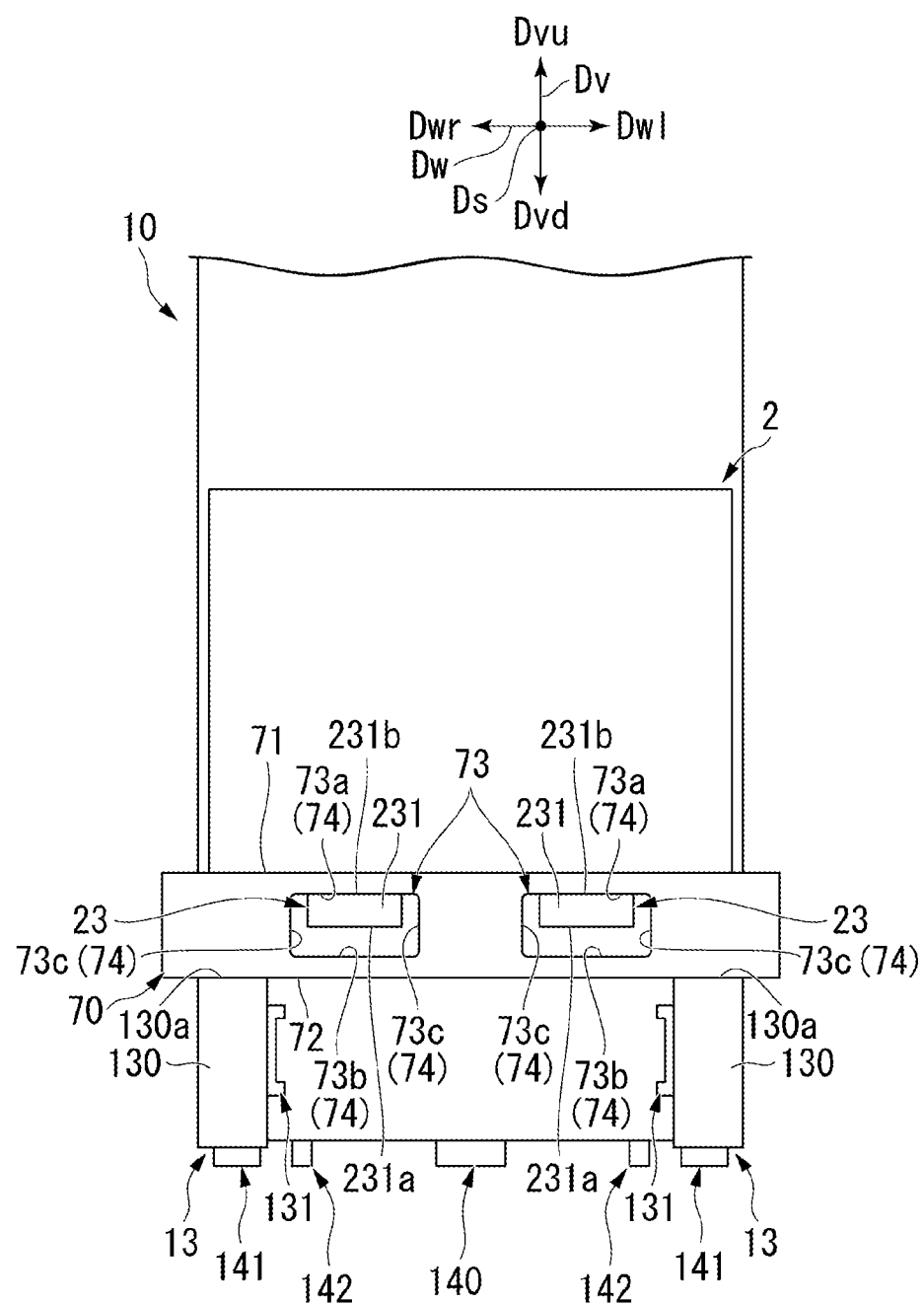
FIG. 12 is a view showing a state where the cargo handling device performs a lift-down operation in a fifth step in the loading method according to the first embodiment of the present disclosure.

That is, as shown in FIG. 12, in the fifth step S15, the placement surface 71 of the pallet 70 is brought into contact with the receiving surfaces 130a of the main body portions 130 of the straddle legs 13 in a state where the pallet 70 is supported by the claw portions 231 of the pair of forks 23 of the cargo handling device 20. That is, the pallet 70 is placed on the receiving surfaces 130a of the straddle legs 13.

Sixth Step

The sixth step S16 is a step in which the cargo handling device 20 further performs the lift-down operation after the fifth step S15. In the sixth step S16, the position of the cargo handling device 20 is shifted (moved downward) to the lower side Dvd.

Figure 13:
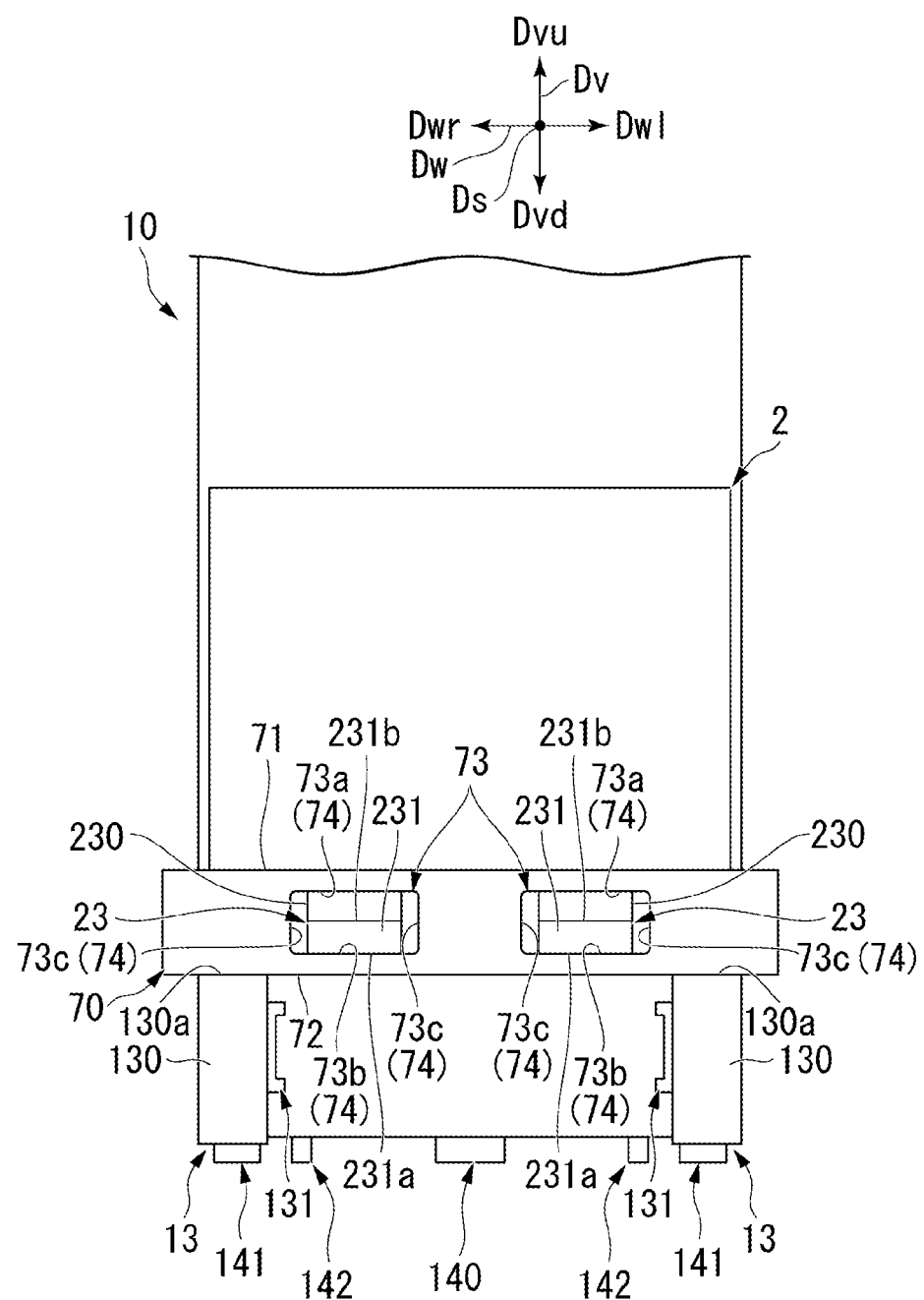
FIG. 13 is a view showing a state where the cargo handling device performs the lift-down operation in a sixth step in the loading method according to the first embodiment of the present disclosure.

That is, as shown in FIG. 13, in the sixth step S16, the retaining surfaces 231a of the claw portions 231 of the pair of forks 23 of the cargo handling device 20 are pressed against the inner surfaces 74 of the fork pockets 73 from the upper side Dvu and thus the pallet 70 is pressed against the main body portions 130 of the straddle legs 13. Accordingly, the pallet 70 is fixed to the receiving surfaces 130a of the straddle legs 13.

The cargo 2 is loaded onto the forklift 10 through the series of steps described above.

Effect

According to the forklift 10 of the above-described embodiment, the front ends of the claw portions 231 are positioned closer to the rear side Dsb than the front ends of the straddle legs 13 when the cargo handling device 20 is at the retreat position Pb. Accordingly, when the cargo handling device 20 is at the retreat position Pb, the center of gravity of the entire forklift 10 is positioned closer to the rear side Dsb in comparison with a configuration in which the front ends of the claw portions 231 are positioned closer to the front side Dsf than the front ends of the straddle legs 13. Therefore, the center of gravity of the entire forklift 10 can be made more stable when the cargo handling device 20 is at the retreat position Pb in a state where the forks 23 support the pallet 70.

In addition, according to the cargo handling system 1 of the above-described embodiment, the receiving surfaces 130a of the straddle legs 13 face the upper side Dvu. Furthermore, when the cargo handling device 20 is at the retreat position Pb in a state where the pair of forks 23 supports the pallet 70, the receiving surfaces 130a face the non-placement surface 72 while being at positions closest to the non-placement surface 72. Accordingly, the pair of forks 23 can move the pallet 70 downward so that the pallet 70 is placed on the receiving surfaces 130a of the straddle legs 13. In other words, in comparison with the configuration of the forklift 10 in which the pallet 70 is not placed on the straddle legs 13, the center of gravity of the entire forklift 10 can be brought closer to the lower side Dvd.

In addition, when the pair of forks 23 further moves downward, the forks 23 can retain the pallet 70 on the receiving surfaces 130a from the upper side Dvu. Accordingly, the pallet 70 can be fixed onto the receiving surfaces 130a. That is, the center of gravity of the pallet 70 placed on the receiving surfaces 130a and the center of gravity of the cargo 2 placed on the pallet 70 can be stabilized. As a result, the center of gravity of the entire forklift 10 can be made more stable.

Second Embodiment

Figure 14:
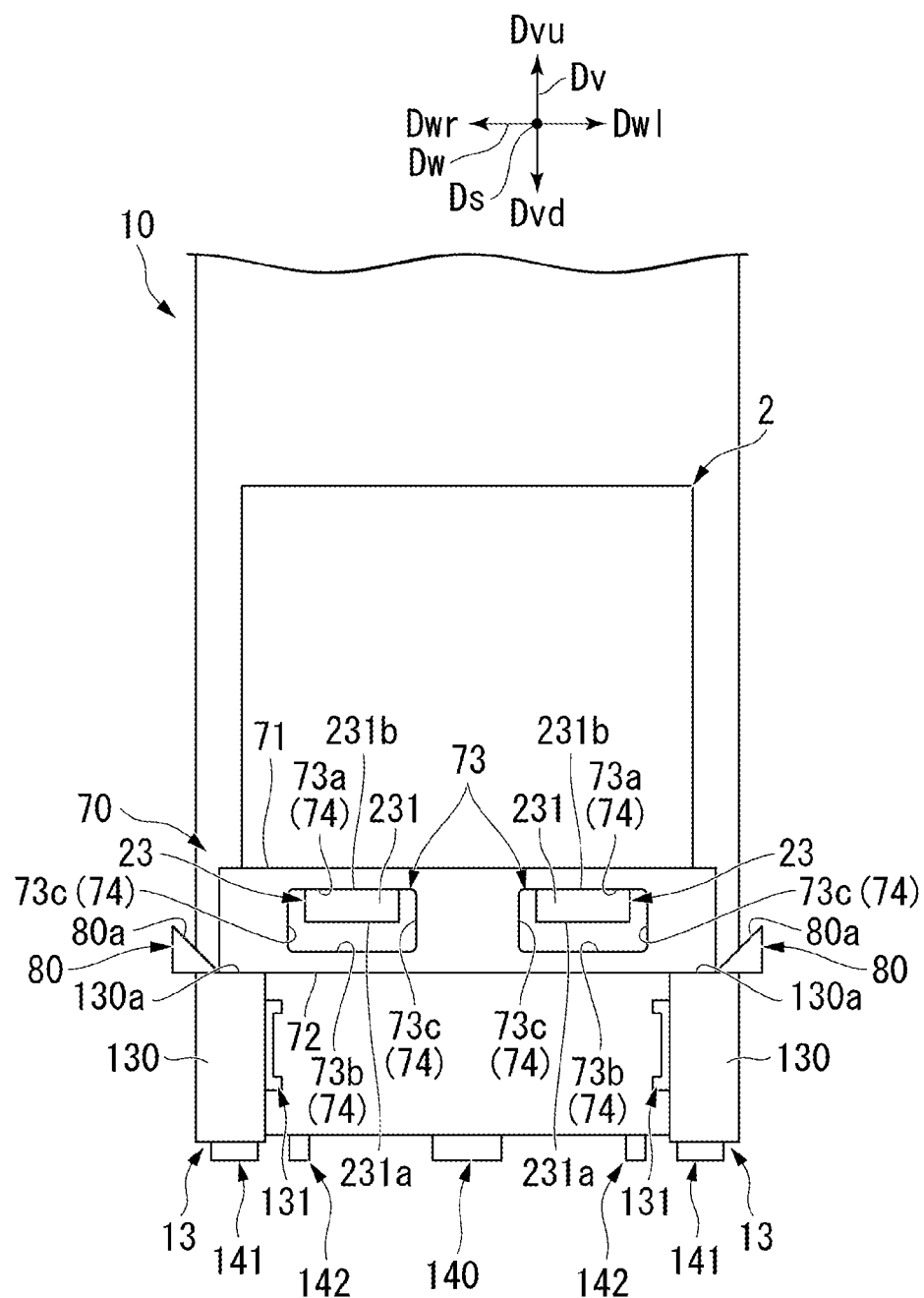
FIG. 14 is a view showing the configuration of a guide portion according to a second embodiment of the present disclosure.

The forklift 10 according to a second embodiment of the present disclosure will be described below with reference to FIG. 14. The forklift 10 described in the second embodiment further includes guide portions 80 that the forklift 10 of the first embodiment does not include. Components similar to those in the first embodiment are given the same reference numerals, and detailed description thereof will be omitted.

Guide Portion

The guide portions 80 are members that cause the pallet 70 to be placed on the receiving surfaces 130a while correcting the positions thereof offset from the receiving surfaces 130a in a case where the pallet 70 is moved downward from the upper side Dvu to the receiving surfaces 130a in a state of being offset from the receiving surfaces 130a of the straddle legs 13 in the vehicle width direction Dw.

Each of the guide portions 80 has a triangular prism-like shape extending in the straight movement direction Ds. The guide portions 80 are fixed to the main body portions 130 of the straddle legs 13. Each of the guide portions 80 in the present embodiment has a shape of an isosceles right triangle as seen in the straight movement direction Ds and each of surfaces corresponding to hypotenuses of the isosceles right triangles as seen in the straight movement direction Ds has a rectangular shape. The surfaces corresponding to the hypotenuses face diagonally upper sides. The guide portions 80 are formed of metal, wood, or the like, for example.

The rectangular surfaces are guide surfaces 80a guiding the pallet 70. Accordingly, the guide portions 80 include the guide surfaces 80a. The guide surfaces 80a extend in directions intersecting the receiving surfaces 130a while being positioned closer to the upper side Dvu than the receiving surfaces 130a.

Regarding the pair of straddle legs 13, the guide surface 80a of the guide portion 80 provided on the first side Dwr and the guide surface 80a of the guide portion 80 provided on the second side Dwl are inclined with respect to the horizontal plane such that the guide surfaces 80a face each other in the vehicle width direction Dw.

Effect

When the pair of forks 23 of the forklift 10 moves the pallet 70 downward to the receiving surfaces 130a of the straddle legs 13, the pallet 70 may be offset from a proper position with respect to the receiving surfaces 130a in the vehicle width direction Dw.

According to the cargo handling system 1 of the above-described embodiment, even in a case where the pallet 70 is offset from the receiving surfaces 130a in the vehicle width direction Dw, the guide surfaces 80a cause the pallet 70 to be placed on the receiving surfaces 130a while correcting the positions thereof offset from the receiving surfaces 130a. Accordingly, the center of gravity of the pallet 70 placed on the receiving surfaces 130a and the center of gravity of the cargo 2 placed on the pallet 70 can be made stable. As a result, the center of gravity of the entire forklift 10 can be made more stable.

Third Embodiment

Figure 15:
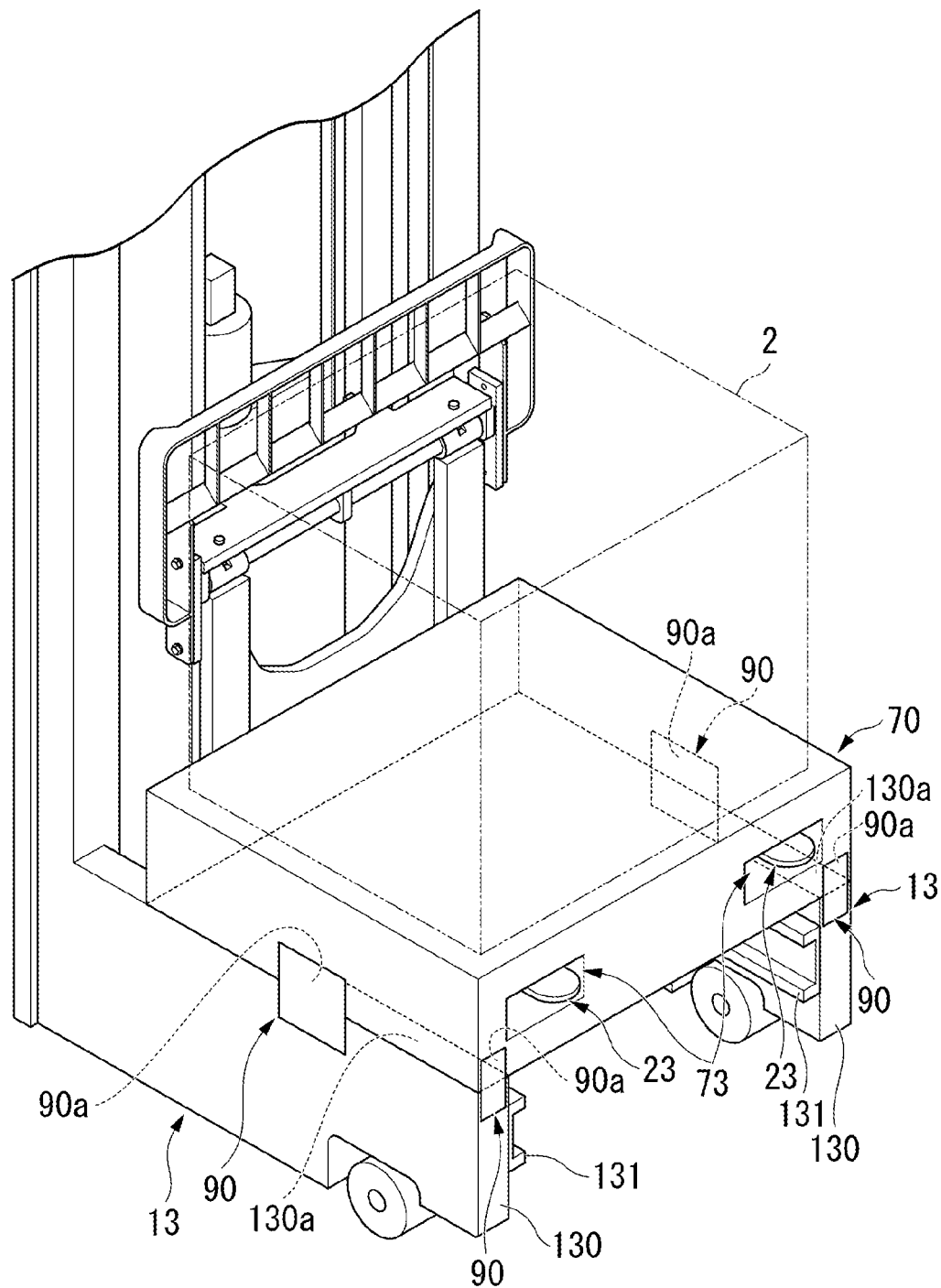
FIG. 15 is a view showing the configuration of a stopper portion according to a third embodiment of the present disclosure.

The forklift 10 according to a third embodiment of the present disclosure will be described below with reference to FIG. 15. The forklift 10 described in the third embodiment further includes stopper portions 90 that the forklift 10 of the first embodiment does not include. Components similar to those in the first embodiment are given the same reference numerals, and a detailed description thereof will be omitted.

Stopper Portion

The stopper portions 90 are members that prevent the pallet 70 from being shifted (displaced) on the receiving surfaces 130a in the straight movement direction Ds and the vehicle width direction Dw in a state where the pallet 70 is placed on the receiving surfaces 130a of the straddle legs 13.

Each of the stopper portions 90 has a flat plate-like shape. In the present embodiment, a plurality of the stopper portions 90 are fixed to the main body portions 130 of the straddle legs 13. One stopper portion 90 is fixed, from the first side Dwr, to the main body portion 130 of one of the pair of straddle legs 13 that is positioned on the first side Dwr and one stopper portion 90 is fixed, from the front side Dsf, to a front end of the main body portion 130.

One stopper portion 90 is fixed, from the second side Dwl, to the main body portion 130 of one of the pair of straddle legs 13 that is positioned on the second side Dwl and one stopper portion 90 is fixed, from the front side Dsf, to a front end of the main body portion 130.

Each of the stopper portions 90 includes a restriction surface 90a that extends in directions perpendicular to the receiving surfaces 130a while being positioned closer to the upper side Dvu than the receiving surfaces 130a. When the pallet 70 is placed on the receiving surfaces 130a, the restriction surfaces 90a is restricted by coming into contact with the pallet 70 from outer sides so that the pallet 70 is restricted from being displaced to the front side Dsf and the vehicle width direction Dw. The stopper portions 90 are formed of metal, wood, or the like, for example.

Effect

During operation of the forklift 10, the pallet 70 placed on the receiving surfaces 130a may be shifted (displaced) from a proper position with respect to the receiving surfaces 130a in the straight movement direction Ds and the vehicle width direction Dw.

According to the cargo handling system 1 of the above-described embodiment, the pallet 70 placed on the receiving surfaces 130a comes into contact with the restriction surfaces 90a of the stopper portions 90 and thus the pallet 70 can be restrained from being displaced outward beyond the stopper portions 90. Accordingly, the center of gravity of the pallet 70 placed on the receiving surfaces 130a and the center of gravity of the cargo 2 placed on the pallet 70 can be made stable. As a result, the center of gravity of the entire forklift 10 can be made more stable.

Fourth Embodiment

Figure 16:
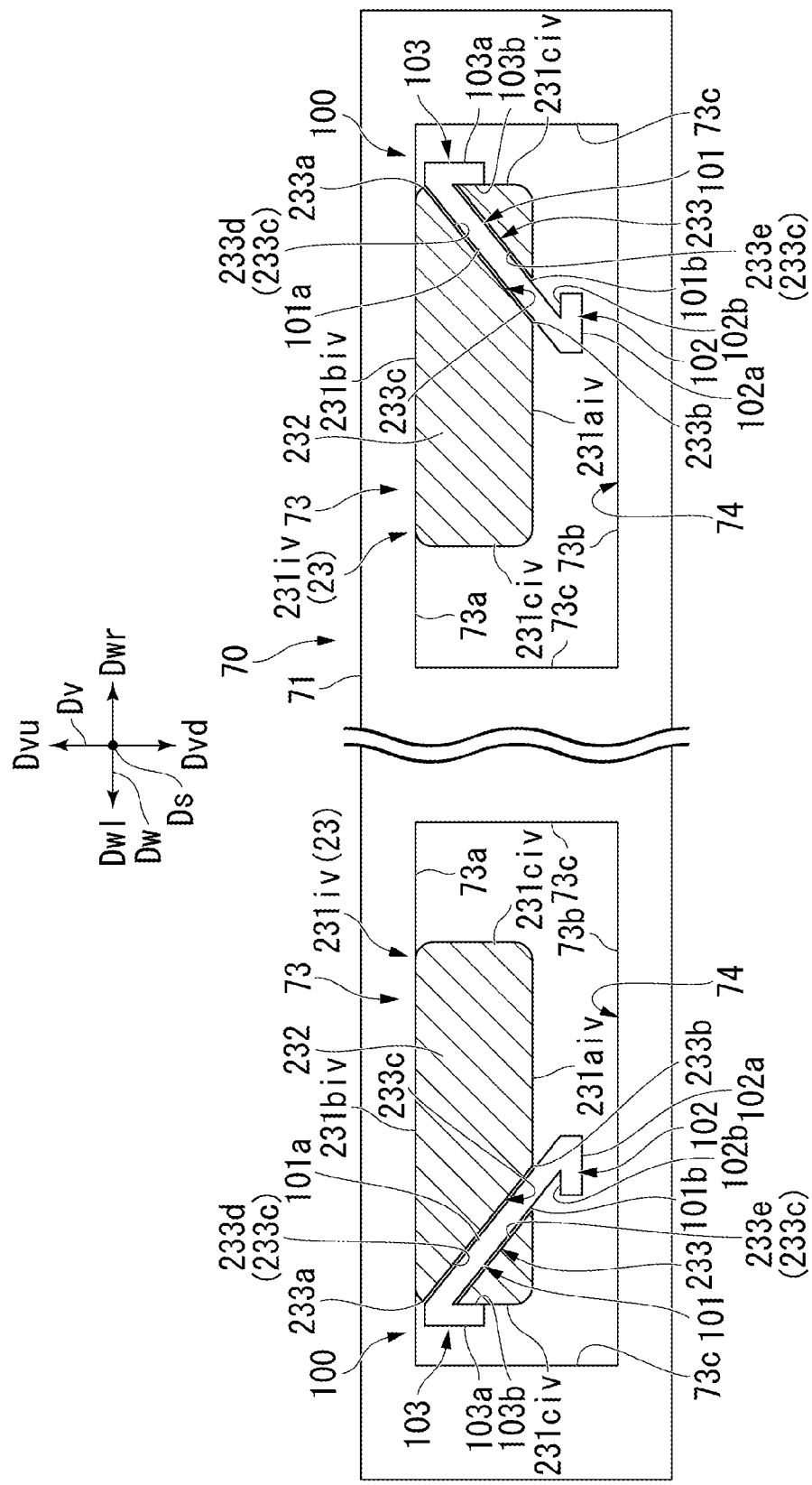
FIG. 16 is a first view showing centering mechanisms according to a fourth embodiment of the present disclosure as seen from a rear side.
Figure 17:
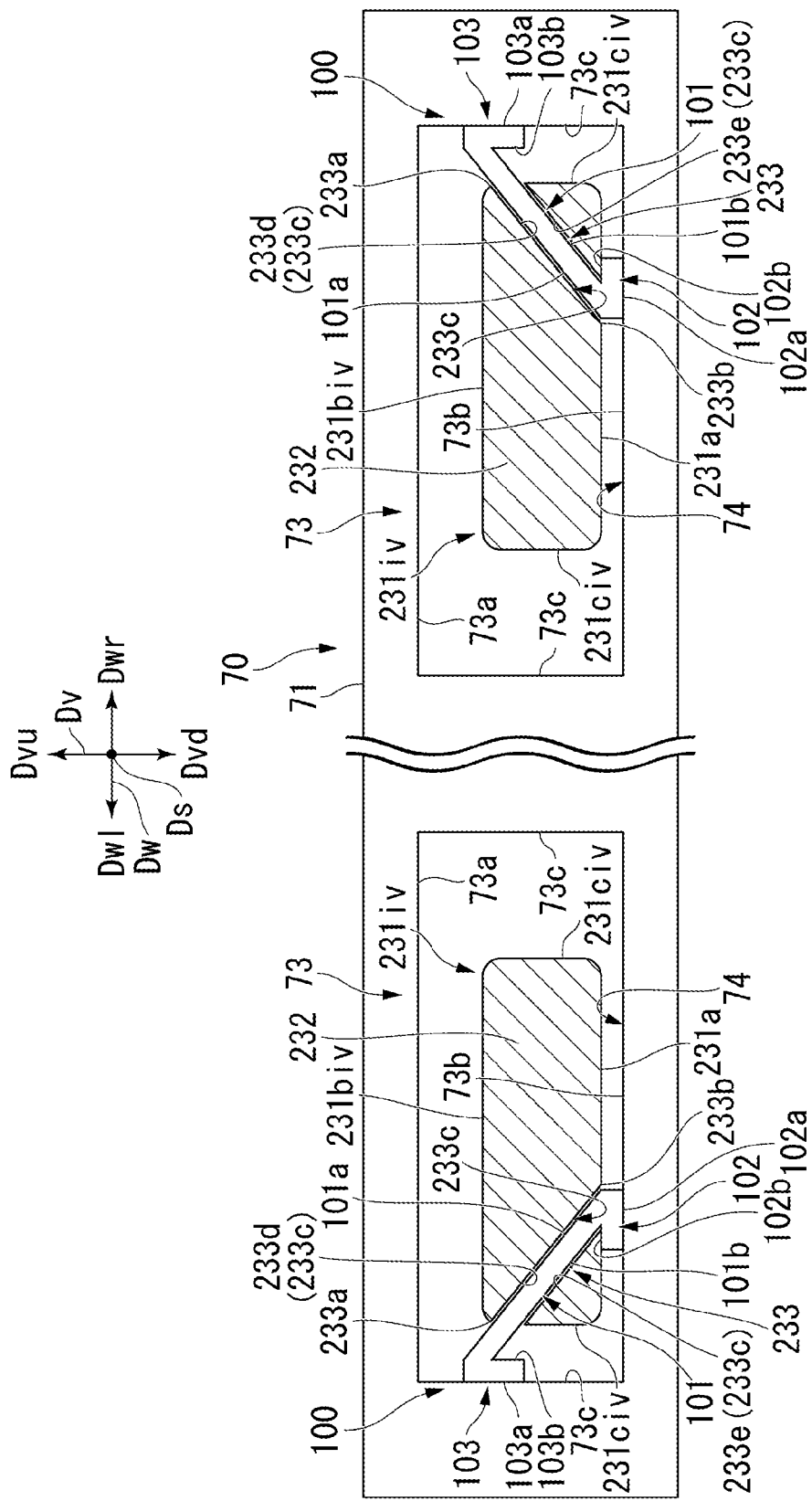
FIG. 17 is a second view showing the centering mechanisms according to the fourth embodiment of the present disclosure as seen from the rear side.

The forklift 10 according to a fourth embodiment of the present disclosure will be described below with reference to FIGS. 16 and 17. The forklift 10 described in the fourth embodiment further includes centering mechanisms 100 that the forklift 10 of the first embodiment does not include. In addition, the configurations of claw portions of the forks 23 are partially different from the configurations of the claw portions 231 of the first embodiment. Components similar to those in the first embodiment are given the same reference numerals, and detailed description thereof will be omitted.

Fork

The forks 23 include the base end portions 230 and claw portions 231$iv$. The base end portions 230 have the same configurations as those in the above-described embodiment. The claw portions 231$iv$ include claw main bodies 232 and guide holes 233.

The claw main bodies 232 in the present embodiment include retaining surfaces 231$aiv$ that face the lower side Dvd and that extend in the horizontal directions, pallet supporting surfaces 231$biv$ that face the upper side Dvu and that extend in the horizontal directions, and claw side surfaces 231$civ$ that connect the retaining surfaces 231$aiv$ and the pallet supporting surfaces 231$biv$ to each other in the vertical direction Dv and that face the vehicle width direction Dw.

The guide holes 233 are holes formed in the claw main bodies 232. The guide holes 233 extend from the claw side surfaces 231$civ$ of the claw main bodies 232 to the retaining surfaces 231$aiv$ and are open at the claw side surfaces 231$civ$ and the retaining surfaces 231$aiv$.

The guide holes 233 include upper opening portions 233a open at the claw side surfaces 231civ, lower opening portions 233b open at the retaining surfaces 231aiv, and in-hole surfaces 233c connecting the upper opening portions 233a and the lower opening portions 233b to each other.

Hereinafter, for the sake of convenience of description, one (on the right side in FIGS. 16 and 17) of the claw portions 231iv of the pair of forks 23 that is on the first side Dwr will be described.

The upper opening portion 233a has a rectangular shape as seen from the first side Dwr. The lower opening portion 233b has a rectangular shape as seen from the lower side Dvd. The in-hole surface 233c includes a first guide surface 233d and a second guide surface 233e.

The first guide surface 233d connects a side of the upper opening portion 233a that is positioned on the upper side Dvu and a side of the lower opening portion 233b that is positioned on the second side Dwl to each other and extends in a state of being inclined with respect to the horizontal plane.

The second guide surface 233e connects a side of the upper opening portion 233a that is positioned on the lower side Dvd and a side of the lower opening portion 233b that is positioned on the first side Dwr to each other and extends in a state of being inclined with respect to the horizontal plane. The first guide surface 233d and the second guide surface 233e face each other and are parallel to each other.

Centering Mechanism

The centering mechanism 100 positions the claw portion 231iv within the fork pocket 73. The centering mechanism 100 is provided at the claw main body 232. The centering mechanism 100 includes a fork insertion portion 101, a lower surface retaining portion 102, and a side surface retaining portion 103.

The fork insertion portion 101 is a plate-shaped member that is inserted into the guide hole 233 formed in the claw main body 232. The fork insertion portion 101 includes a first surface 101a facing the first guide surface 233d and a second surface 101b facing the second guide surface 233e.

The lower surface retaining portion 102 is fixed to an end portion of the fork insertion portion 101 and is integrated with the fork insertion portion 101, the end portion being on the lower side Dvd. The lower surface retaining portion 102 has a plate-like shape that extends along the retaining surface 231aiv of the claw main body 232.

The dimension of the lower surface retaining portion 102 in the vehicle width direction Dw is larger than the dimension of the lower opening portion 233b in the vehicle width direction Dw. The lower surface retaining portion 102 includes a lower surface retaining surface 102a that faces the lower side Dvd and that faces the lower surface 73b of the inner surfaces 74 of the pallet 70 and a lower engagement surface 102b that faces the upper side Dvu and that is connected to the second surface 101b of the fork insertion portion 101 from the first side Dwr.

The side surface retaining portion 103 is fixed to an end portion of the upper side Dvu of the fork insertion portion 101 and is integrated with the fork insertion portion 101. The side surface retaining portion 103 has a plate-like shape that extends along the claw side surface 231civ of the claw main body 232.

The dimension of the side surface retaining portion 103 in the vertical direction Dv is larger than the dimension of the upper opening portion 233a in the vertical direction Dv. The side surface retaining portion 103 includes a side surface retaining surface 103a that faces the first side Dwr and that faces the side surface 73c of the inner surfaces 74 of the fork pocket 73 and an upper engagement surface 103b that faces the second side Dwl and that is connected to the second surface 101b of the fork insertion portion 101 from the lower side Dvd.

In a state where the pallet supporting surface 231biv of the claw main body 232 is in contact with the upper surface 73a of the inner surfaces 74 of the fork pocket 73, the fork insertion portion 101 protrudes to be closer to the lower side Dvd than the claw main body 232. At this time, the second surface 101b is in contact with the second guide surface 233e.

In addition, an upper end of the side surface retaining portion 103 is positioned closer to the lower side Dvd than the pallet supporting surface 231biv of the claw main body 232. Accordingly, the side surface retaining portion 103 does not interfere when the pallet supporting surface 231biv comes into contact with the upper surface 73a.

Here, an aspect of the centering mechanism 100 when the claw portion 231iv moves downward to the lower surface 73b of the inner surfaces 74 of the fork pocket 73 will be described. When the claw portion 231iv moves downward to the lower surface 73b, first, the lower surface retaining surface 102a of the lower surface retaining portion 102 comes into contact with the lower surface 73b.

When the claw portion 231iv further moves downward, the first surface 101a of the fork insertion portion 101 connected to the lower surface retaining portion 102 comes into contact with the first guide surface 233d in a state where the lower surface retaining surface 102a is in contact with the lower surface 73b.

When the claw portion 231iv further moves downward, the first surface 101a is pressed to the lower side Dvd by the first guide surface 233d. At this time, the first surface 101a slides in the vehicle width direction Dw in a state of being in contact with the first guide surface 233d.

That is, the entire centering mechanism 100 slides in the vehicle width direction Dw. When the claw portion 231iv moves downward until the retaining surface 231aiv of the claw main body 232 comes into contact with the lower engagement surface 102b of the lower surface retaining portion 102, the side surface retaining surface 103a of the side surface retaining portion 103 comes into contact with the side surface 73c and presses the side surface 73c.

That is, when the claw portion 231iv moves downward, the side surface retaining portion 103 of the centering mechanism 100 presses the side surface 73c and the pallet 70 is displaced in the vehicle width direction Dw. In other words, the centering mechanisms 100 provided at the pair of claw main bodies 232 position the claw portions 231iv within the fork pockets 73.

Hereinabove, the claw main body 232 on the first side Dwr of the claw portions 231iv of the pair of forks 23 and the centering mechanism 100 provided at the claw main body 232 on the first side Dwr have been described. Description about the claw main body 232 (on the left side in FIGS. 16 and 17) on the second side Dwl of the claw portions 231iv of the pair of forks 23 and the centering mechanism 100 provided at the claw main body 232 on the second side Dwl will be omitted since the claw main body 232 on the second side Dwl and the centering mechanism 100 provided at the claw main body 232 on the second side Dwl and the claw main body 232 on the first side Dwr and the centering mechanism 100 provided at the claw main body 232 on the first side Dwr form a configuration bilaterally symmetrical in the vehicle width direction Dw.

Effect

According to the cargo handling system 1 of the above-described embodiment, the centering mechanisms 100 provided at the pair of claw main bodies 232 position the claw portions 231*iv* within the fork pockets 73 to be immovable when the claw portions 231*iv* move downward in the fork pockets 73. That is, the centering mechanisms 100 position the pallet 70 at a predetermined position with respect to the claw portions 231*iv* when the pair of claw portions 231*iv* moves downward.

Accordingly, the center of gravity of the pallet 70 placed on the receiving surfaces 130*a* and the center of gravity of the cargo 2 placed on the pallet 70 can be made more stable. As a result, the center of gravity of the entire forklift 10 can be made more stable.

Fifth Embodiment

Figure 18A:
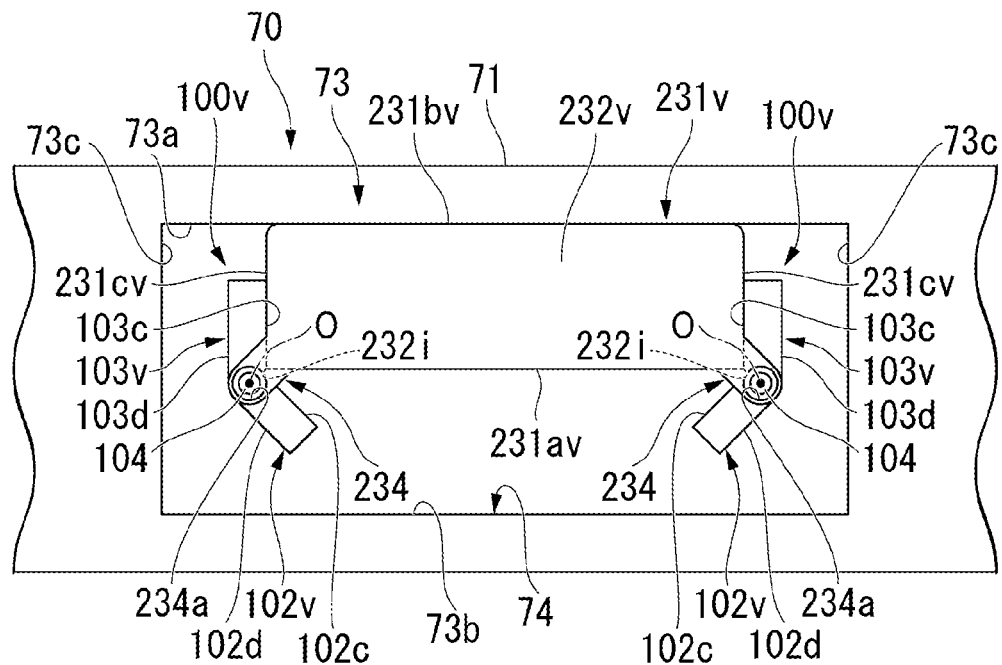
FIG. 18 is a view showing centering mechanisms according to a fifth embodiment of the present disclosure as seen from a front side.
Figure 18B:
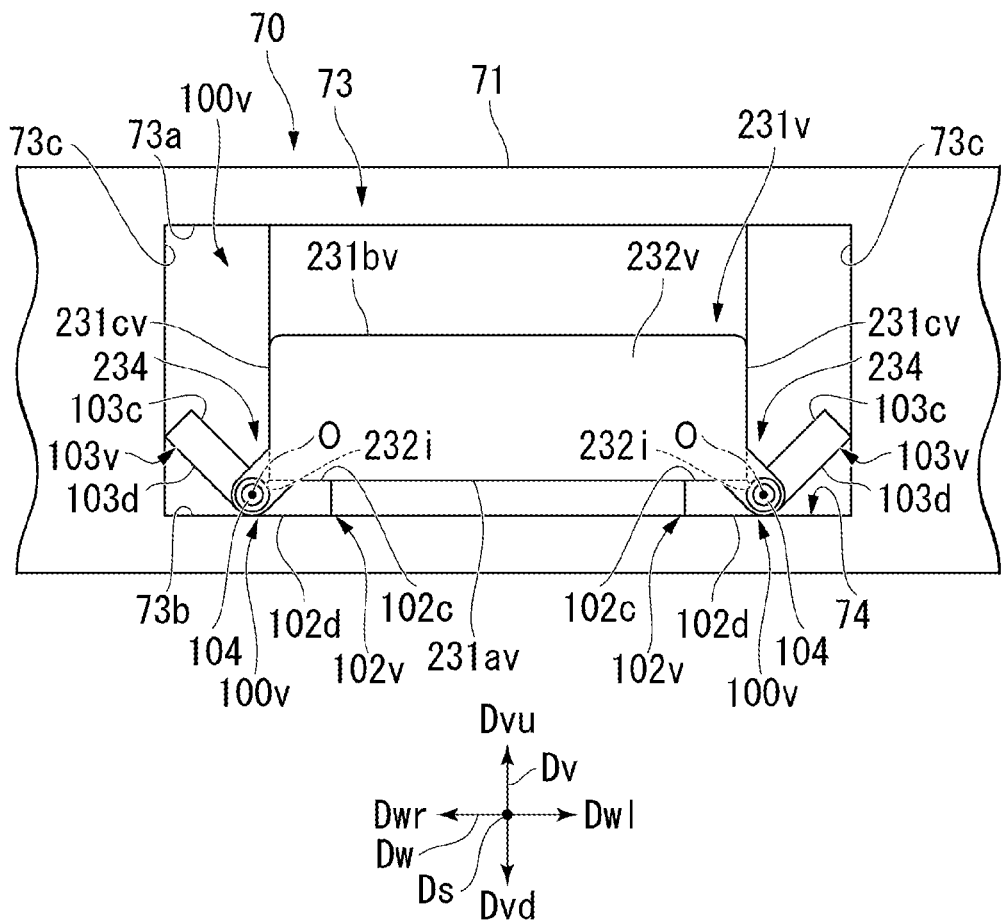

The forklift 10 according to a fifth embodiment of the present disclosure will be described below with reference to FIG. 18. The forklift 10 described in the fifth embodiment further includes centering mechanisms 100*v* that the forklift 10 of the first embodiment does not include.

The configurations of the centering mechanisms 100*v* are partially different from the configurations of the centering mechanisms 100 of the fourth embodiment. In addition, the configurations of claw portions 231*v* of the forks 23 are partially different from the configurations of the claw portions 231 of the first embodiment. Components similar to those in the first embodiment are given the same reference numerals, and detailed description thereof will be omitted.

Fork

The claw portions 231*v* include claw main bodies 232*v* and shaft supporting portions 234. The claw main bodies 232*v* in the present embodiment include retaining surfaces 231*av* that face the lower side Dvd and that extend in the horizontal directions, pallet supporting surfaces 231*bv* that face the upper side Dvu and that extend in the horizontal directions, and claw side surfaces 231*cv* that connect the retaining surfaces 231*av* and the pallet supporting surfaces 231*bv* to each other in the vertical direction Dv and that face the vehicle width direction Dw.

The shaft supporting portions 234 are integrally provided to the claw main bodies 232*v* such that the shaft supporting portions 234 protrude from intersection portions 232*i* at which the retaining surfaces 231*av* and the claw side surfaces 231*cv* of the claw main bodies 232*v* intersect each other. Each of the shaft supporting portions 234 has a cylindrical shape extending in the straight movement direction Ds. In the shaft supporting portions 234, bearing holes 234*a* extending in the straight movement direction Ds are formed.

In the present embodiment, a plurality of the shaft supporting portions 234 is provided to the claw main bodies 232*v*. In the present embodiment, the details thereof are not shown. In the present embodiment, description will be made by using a case where four shaft supporting portions 234 as an example is provided to each claw main body 232*v*.

Specifically, two bearing portions are disposed at an interval in the straight movement direction Ds for one of two intersection portions 232*i* of the claw main body 232*v* that is on the first side Dwr and two bearing portions are disposed at an interval in the straight movement direction Ds for the intersection portion 232*i* on the second side Dwl.

Centering Mechanism

A pair of the centering mechanisms 100*v* is provided at the claw main body 232*v*. The centering mechanism 100*v* includes a shaft portion 104, a lower surface retaining portion 102*v*, and a side surface retaining portion 103*v*.

The shaft portion 104 is a member having a columnar shape. The shaft portion 104 is inserted through the bearing holes 234*a* of two shaft supporting portions 234 adjacent to each other in the straight movement direction Ds, and is rotatably supported by the bearing holes 234*a*.

Since the shaft portion 104 is rotatably supported by the bearing holes 234*a*, the shaft portion 104 rotates around a rotation axis O extending in the straight movement direction Ds. The rotation axis O is an imaginary axis that extends through, in the straight movement direction Ds, the centers of the bearing holes 234*a* adjacent to each other in the straight movement direction Ds.

The lower surface retaining portion 102*v* is a plate-like member provided at a portion of an outer peripheral surface of the shaft portion 104 that is not inserted into the bearing holes 234*a*. A pair of the lower surface retaining portions 102*v* is integrally provided to the shaft portions 104 such that the lower surface retaining portions 102*v* become closer to each other in the vehicle width direction Dw.

Each lower surface retaining portion 102*v* includes a first contact surface 102*c* and a second contact surface 102*d* that faces a side opposite to the first contact surface 102*c*, the first contact surface 102*c* facing the retaining surface 231*av* side of the claw main body 232*v* in a state where the claw portion 231*v* is inserted into the fork pocket 73, the pallet supporting surface 231*bv* is in contact with the upper surface 73*a* of the inner surfaces 74 of the fork pocket 73, and the first contact surface 102*c* is inclined with respect to the horizontal plane.

The side surface retaining portion 103*v* is a plate-like member provided at a portion of the outer peripheral surface of the shaft portion 104 that is not inserted into the bearing holes 234*a*. The side surface retaining portion 103*v* is integrally provided to the shaft portion 104.

Each side surface retaining portion 103*v* includes a claw contact surface 103*c* that comes into contact with the claw side surface 231*cv* in a state where the claw portion 231*v* is inserted into the fork pocket 73 and the pallet supporting surface 231*bv* is in contact with the upper surface 73*a* of the inner surfaces 74 of the fork pocket 73 and a facing surface 103*d* that faces a side opposite to the claw contact surface 103*c* and that faces the side surface 73*c* of the inner surfaces 74 of the fork pocket 73.

At this time, an edge surface of the side surface retaining portion 103*v* that faces the upper side Dvu is positioned closer to the lower side Dvd than the pallet supporting surface 231*bv* of the claw main body 232*v*. Accordingly, the side surface retaining portion 103*v* does not interfere when the pallet supporting surface 231*bv* comes into contact with the upper surface 73*a*.

Here, an aspect of the centering mechanism 100*v* when the claw portion 231*v* moves downward to the lower surface 73*b* of the inner surfaces 74 of the fork pocket 73 will be described. When the claw portion 231*v* moves downward to the lower surface 73*b*, first, an edge of the second contact surface 102*d* of the lower surface retaining portion 102*v* that is closest to the lower side Dvd comes into contact with the lower surface 73*b*. When the claw portion 231*v* further moves downward, the lower surface retaining portion 102*v* rotates around the rotation axis O and the side surface retaining portion 103*v* also rotates around the rotation axis O.

Because of the rotation, the second contact surface 102*d* of the lower surface retaining portion 102*v* comes into contact with the lower surface 73*b* and faces the lower surface 73*b* and an edge of the facing surface 103*d* of the side surface retaining portion 103v comes into contact with the side surface 73c of the inner surfaces 74 of the fork pocket 73 and presses the side surface 73c in the vehicle width direction Dw.

That is, when the claw portion 231v moves downward, the side surface retaining portion 103v of the centering mechanism 100v presses the side surface 73c and the pallet 70 is displaced in the vehicle width direction Dw. In other words, the centering mechanisms 100v provided at the pair of claw main bodies 232v position the claw portions 231v within the fork pockets 73.

Effect

The configuration of the cargo handling system 1 according to the above-described embodiment can also provide the effects described in the fourth embodiment.

Sixth Embodiment

The forklift 10 according to a sixth embodiment of the present disclosure will be described below with reference to FIG. 19. The forklift 10 described in the sixth embodiment further includes centering mechanisms 100vi that the forklift 10 of the first embodiment does not include.

The configurations of the centering mechanisms 100vi are partially different from the configurations of the centering mechanisms 100 of the fourth embodiment. In addition, the configurations of claw portions 231vi of the forks 23 are partially different from the configurations of the claw portions 231 of the first embodiment. Components similar to those in the first embodiment are given the same reference numerals, and a detailed description thereof will be omitted.

Fork

The claw portions 231vi include claw main bodies 232vi and countersink portions 235. The claw main bodies 232vi in the present embodiment include retaining surfaces 231avi that face the lower side Dvd and that extend in the horizontal directions, pallet supporting surfaces 231bvi that face the upper side Dvu and that extend in the horizontal directions, and claw side surfaces 231cvi that connect the retaining surfaces 231avi and the pallet supporting surfaces 231bvi to each other in the vertical direction Dv and that face the vehicle width direction Dw.

Each countersink portion 235 is a hole penetrating the claw main body 232vi in the vertical direction Dv. That is, the countersink portion 235 is open at both the pallet supporting surface 231bvi and the retaining surface 231avi of the claw main body 232vi. The countersink portion 235 is composed of a countersunk portion 235a and a hole portion 235b.

The countersunk portion 235a is open at the pallet supporting surface 231bvi and the diameter of the countersunk portion 235a decreases toward the lower side Dvd from the opening thereof. The hole portion 235b is connected to the countersunk portion 235a from the lower side Dvd. The hole portion 235b is open at the retaining surface 231avi.

Centering Mechanism

The centering mechanism 100vi includes a countersink insertion portion 105, a lower surface retaining portion 102vi, side surface retaining portions 103vi, linking portions 108, first rotation shafts 109, second rotation shafts 110, and third rotation shafts 111.

The countersink insertion portion 105 is a member inserted through the countersink portion 235. The countersink insertion portion 105 includes a head portion 106 that can be accommodated into the countersink portion 235 and a supporting post 107 that is integrally connected to the head portion 106 from the lower side Dvd and that extends in the vertical direction Dv.

The head portion 106 is formed in a shape of a truncated cone. The head portion 106 includes an upper end surface 106a facing the upper side Dvu. The head portion 106 is accommodated in the countersink portion 235 when the claw portion 231vi is inserted into the fork pocket 73 and the pallet supporting surface 231bvi is in contact with the upper surface 73a of the inner surfaces 74 of the fork pocket 73. The upper end surface 106a is flush with the pallet supporting surface 231bvi when the head portion 106 is accommodated in the countersink portion 235.

The supporting post 107 has a columnar shape. The supporting post 107 is inserted through the hole portion 235b. The supporting post 107 protrudes to be closer to the lower side Dvd than the claw main body 232vi when the claw portion 231vi is inserted into the fork pocket 73 and the pallet supporting surface 231bvi is in contact with the upper surface 73a of the inner surfaces 74 of the fork pocket 73.

The lower surface retaining portion 102vi is a flat plate-shaped member extending in the horizontal directions. The lower surface retaining portion 102vi is integrally connected to the supporting post 107 from the lower side Dvd and is supported by the supporting post 107 from the upper side Dvu.

The lower surface retaining portion 102vi includes a first facing surface 102e that faces the upper side Dvu and that faces the retaining surface 231avi and a second facing surface 102f that faces a side opposite to the first facing surface 102e and that faces the lower surface 73b of the inner surfaces 74 of the fork pocket 73. The supporting post 107 is fixed to the center of the first facing surface 102e.

The side surface retaining portion 103vi is a flat plate-shaped member. A pair of the side surface retaining portions 103vi is connected to, from the vehicle width direction Dw, both ends of the lower surface retaining portion 102vi in the vehicle width direction Dw via the first rotation shafts 109. Here, each of the first rotation shafts 109 has a columnar shape extending in the straight movement direction Ds and the first rotation shafts 109 are rotatably provided at both ends of the lower surface retaining portion 102vi in the vehicle width direction Dw.

The first rotation shafts 109 are rotatable around first rotation axes O1 extending in the straight movement direction Ds. The side surface retaining portions 103vi are integrally connected to the first rotation shafts 109. The side surface retaining portions 103vi are disposed between the claw main body 232vi and the side surfaces 73c in a state of being connected to the first rotation shafts 109.

Therefore, the side surface retaining portions 103vi can rotate around the first rotation axes O1 with respect to the lower surface retaining portion 102vi as the first rotation shafts 109 rotate, the first rotation axes O1 extending through the centers of the first rotation shafts 109. Note that, the first rotation axes O1 are imaginary axes that extend through the centers of the first rotation shafts 109 in the straight movement direction Ds.

Each side surface retaining portion 103vi includes a claw facing surface 103e that faces the claw portion 231vi side in a state where the claw portion 231vi is inserted into the fork pocket 73 and the pallet supporting surface 231bvi is in contact with the upper surface 73a of the inner surfaces 74 of the fork pocket 73 and a pocket facing surface 103f that faces a side opposite to the claw facing surface 103e and that faces the side surface 73c of the inner surfaces 74 of the fork pocket 73.

At this time, an edge surface of the side surface retaining portion 103vi that faces the upper side Dvu is positioned closer to the lower side Dvd than the pallet supporting surface 231bvi of the claw main body 232vi. Accordingly, the side surface retaining portion 103vi does not interfere when the pallet supporting surface 231bvi comes into contact with the upper surface 73a.

The linking portions 108 are flat plate-shaped members. The linking portions 108 are connected to the side surface retaining portions 103vi via the second rotation shafts 110. Here, each of the second rotation shafts 110 has a columnar shape extending in the straight movement direction Ds and the second rotation shafts 110 are rotatably provided at the side surface retaining portions 103vi.

The second rotation shafts 110 are rotatable around second rotation axes O2 extending in the straight movement direction Ds. The linking portions 108 are integrally connected to the second rotation shafts 110. The linking portions 108 are disposed between the claw portion 231vi and the side surface retaining portions 103vi in a state of being connected to the second rotation shafts 110.

Therefore, the linking portions 108 can rotate around the second rotation axes O2 with respect to the side surface retaining portions 103vi as the second rotation shafts 110 rotate, the second rotation axes O2 extending through the centers of the second rotation shafts 110. Note that, the second rotation axes O2 are imaginary axes that extend through the centers of the second rotation shafts 110 in the straight movement direction Ds.

In addition, the linking portions 108 are connected to the claw main body 232vi via the third rotation shafts 111. Here, each of the third rotation shafts 111 has a columnar shape extending in the straight movement direction Ds and the third rotation shafts 111 are rotatably provided at the intersection portions 232i where the retaining surface 231avi and the claw side surfaces 231cvi of the claw main body 232vi intersect each other.

The third rotation shafts 111 are rotatable around third rotation axes O3 extending in the straight movement direction Ds. The linking portions 108 are integrally connected to the third rotation shafts 111. Therefore, the linking portions 108 can rotate around the third rotation axes O3 with respect to the claw main body 232vi as the third rotation shafts 111 rotate, the third rotation axes O3 extending through the centers of the third rotation shafts 111. Note that, the third rotation axes O3 are imaginary axes that extend through the centers of the third rotation shafts 111 in the straight movement direction Ds.

Here, an aspect of the centering mechanism 100vi when the claw portion 231vi moves downward to the lower surface 73b of the inner surfaces 74 of the fork pocket 73 will be described. When the claw portion 231vi moves downward to the lower surface 73b, the second facing surface 102f of the lower surface retaining portion 102vi comes into contact with the lower surface 73b.

When the claw portion 231vi further moves downward, the head portion 106 and the supporting post 107 of the countersink insertion portion 105 protrudes to the upper side Dvu from the pallet supporting surface 231bvi of the claw main body 232vi in the order of the head portion 106 and the supporting post 107.

At the same time, the side surface retaining portions 103vi connected to the lower surface retaining portion 102vi are pressed by the linking portions 108 connected to the claw main body 232vi and thus the side surface retaining portions 103vi and the linking portions 108 rotate around the rotation axes (the first rotation axes O1, the second rotation axes O2, and the third rotation axes O3).

Because of the rotation, edges of the pocket facing surfaces 103f of the side surface retaining portions 103vi come into contact with the side surfaces 73c of the inner surfaces 74 of the fork pocket 73 and press the side surfaces 73c in the vehicle width direction Dw.

That is, when the claw portion 231vi moves downward, the side surface retaining portions 103vi of the centering mechanism 100vi press the side surfaces 73c and the pallet 70 is displaced in the vehicle width direction Dw. In other words, the centering mechanisms 100vi provided at the pair of claw main bodies 232vi position the claw portions 231vi within the fork pockets 73.

Effect

The configuration of the cargo handling system 1 according to the above-described embodiment can also provide the effects described in the fourth embodiment.

Seventh Embodiment

The forklift 10 according to a seventh embodiment of the present disclosure will be described below with reference to FIGS. 20 and 21. The forklift 10 described in the seventh embodiment includes synchronization mechanisms 300 and pallet guides 400.

Synchronization Mechanism

The synchronization mechanism 300 is provided for each of the pair of straddle legs 13 and operates in synchronization with a downward movement operation of the pair of forks 23 supporting the pallet 70.

Figure 20:
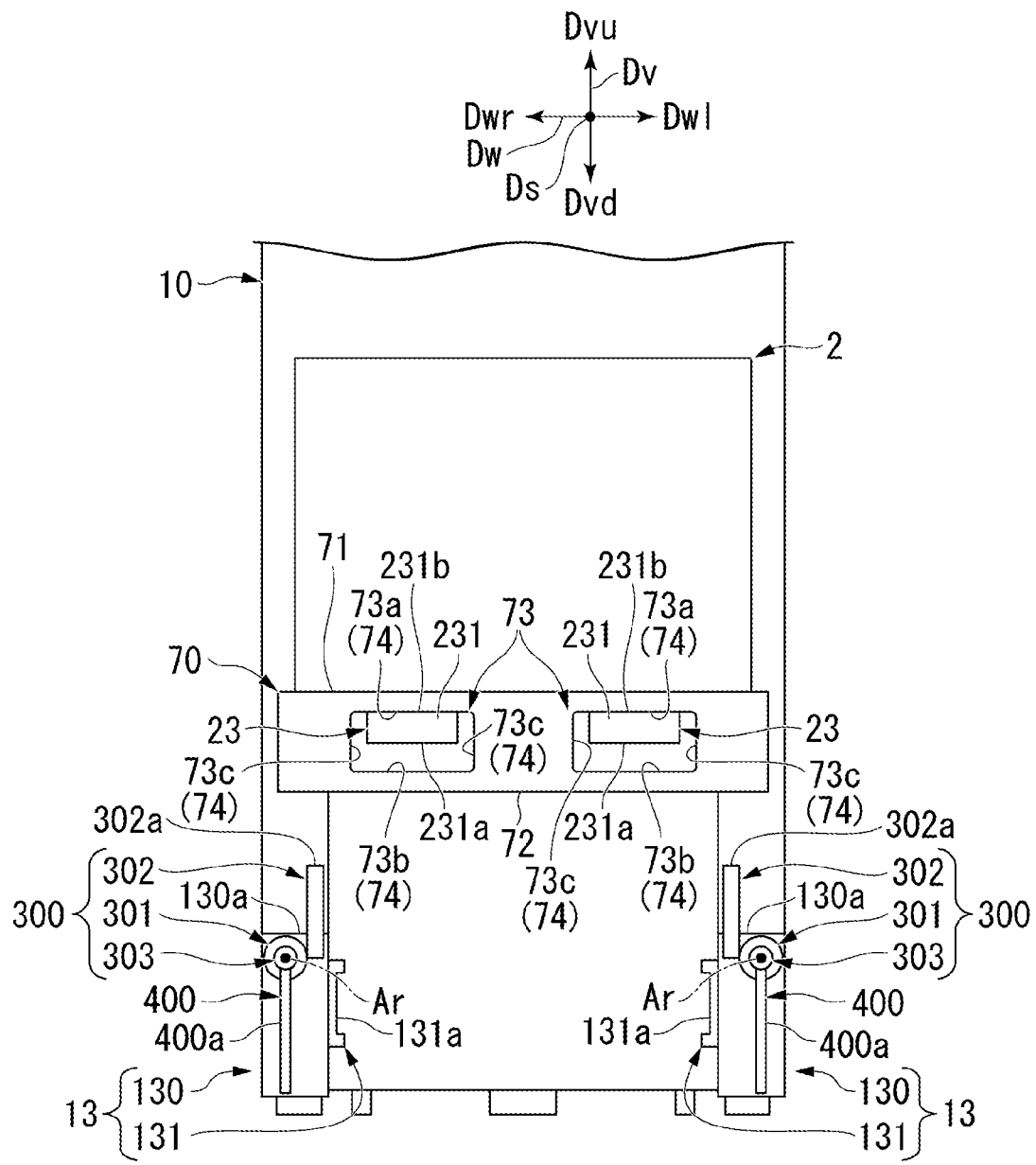
FIG. 20 is a view showing the configurations of synchronization mechanisms and pallet guides according to a seventh embodiment of the present disclosure.
Figure 21:
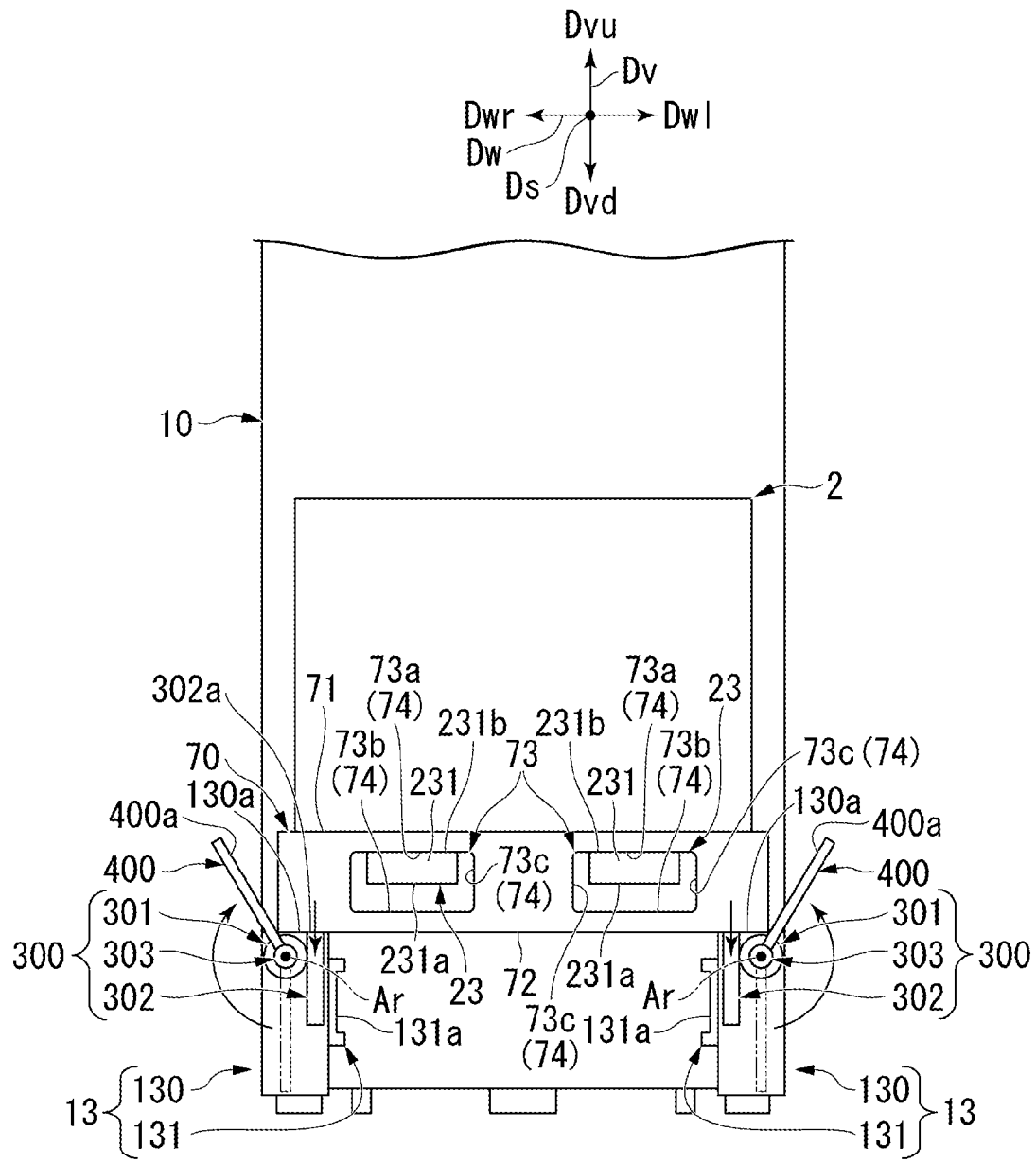
FIG. 21 is a view showing the operations of the synchronization mechanisms and the pallet guides according to the seventh embodiment of the present disclosure.

As shown in FIG. 20, each synchronization mechanism 300 in the present embodiment includes a pinion 301, a rack 302, and a rotation shaft 303.

The pinion 301 is a gear that is accommodated in the main body portion 130 of the straddle leg 13 and that is rotatably held by the main body portion 130. Specifically, the pinion 301 is held to be rotatable around an axis Ar extending in the straight movement direction Ds.

The rack 302 extends in the vertical direction in a state of meshing with the pinion 301. The rack 302 meshes with, from the second side Dwl, the pinion 301 accommodated in the main body portion 130 disposed on the first side Dwr. Meanwhile, the rack 302 meshes with, from the first side Dwr, the pinion 301 accommodated in the main body portion 130 disposed on the second side Dwl. A portion of the rack 302 protrudes to be closer to the upper side Dvu than the receiving surface 130a of the main body portion 130. An edge 302a of the rack 302 that is on the upper side Dvu faces the upper side Dvu.

The rotation shaft 303 is a columnar member that extends while being centered on the axis Ar. The rotation shaft 303 is integrated with the pinion 301 and extends in the straight movement direction Ds from the pinion 301. The rotation shaft 303 in the present embodiment extends to the front side Dsf from the pinion 301, for example. The rotation shaft 303 is accommodated in the main body portion 130.

Pallet Guide

The pallet guides 400 in the present embodiment are plate members that are held by the synchronization mechanisms 300 to be rotatable around axes Ar. The pallet guides 400 are provided on the rotation shafts 303 and are accommodated in the main body portions 130. The pallet guides 400 extend to the lower side Dvd from side surfaces of the rotation shafts 303 as seen from the front side Dsf. Hereinafter, positions where the pallet guides 400 are accommodated in the main body portions 130 will be referred to as "retraction positions" of the pallet guides 400. The pallet guides 400 include pallet guide surfaces 400a. The pallet guide surfaces 400a face the vehicle width direction Dw when the pallet guides 400 are positioned at the retraction positions. Specifically, when the pallet guides 400 are positioned at the retraction positions, the pallet guide surface 400a of the pallet guide 400 disposed on the first side Dwr faces the first side Dwr and the pallet guide surface 400a of the pallet guide 400 disposed on the second side Dwl faces the second side Dwl.

Here, the operation of the synchronization mechanisms 300 will be described. As shown in FIG. 21, when the pair of forks 23 supporting the pallet 70 moves downward (the lift-down operation), the non-placement surface 72 of the pallet 70 is moved to the lower side Dvd and is brought into contact with the edges 302a of the racks 302. When the pair of forks 23 further moves downward, the non-placement surface 72 of the pallet 70 presses the edges 302a of the racks 302 to the lower side Dvd to press down the racks 302 to the lower side Dvd. As the racks 302 move to the lower side Dvd, the pinions 301 meshing with the racks 302 rotate around the axes Ar and the rotation shafts 303 integrated with the pinions 301 rotate around the axes Ar. Accordingly, the pallet guides 400 rotate around the axes Ar together with the rotation shafts 303. When the pallet guides 400 are rotated by the synchronization mechanisms 300, the pallet guides 400 are moved to positions where the pallet guides 400 sandwich the pallet 70 in the vehicle width direction Dw at points closer to the upper side Dvu than the receiving surfaces 130a of the main body portions 130. Hereinafter, the positions where the pallet guides 400 sandwich the pallet 70 in the vehicle width direction Dw at points closer to the upper side Dvu than the receiving surfaces 130a of the main body portions 130 will be referred to as "guide positions" of the pallet guides 400.

When the pallet guides 400 are positioned at the guide positions, the pallet guide surfaces 400a of the pallet guides 400 come into contact with the pallet 70 in the vehicle width direction Dw and press the pallet 70 in the vehicle width direction Dw in a state of being inclined with respect to the receiving surfaces 130a of the main body portions 130. Specifically, the pallet guide surface 400a of the pallet guide 400 disposed on the first side Dwr presses the pallet 70 to the second side Dwl. Meanwhile, the pallet guide surface 400a of the pallet guide 400 disposed on the second side Dwl presses the pallet 70 to the first side Dwr. That is, the position of the pallet 70 in the vehicle width direction Dw is adjusted by the pallet guide surfaces 400a of the pallet guides 400 while the pallet 70 is moving to the lower side Dvd. After the position of the pallet 70 in the vehicle width direction Dw is adjusted by the pallet guides 400, the non-placement surface 72 of the pallet 70 comes into contact with the receiving surfaces 130a of the main body portions 130. Therefore, the edges 302a of the racks 302 enter a state of being flush with the receiving surfaces 130a and the synchronization mechanisms 300 stop to operate in synchronization with the downward movement operation. At this time, the pallet guide surfaces 400a of the pallet guides 400 are held by the rotation shafts 303 in a state of being inclined with respect to the receiving surfaces 130a.

Effect

In the above-described configuration, the synchronization mechanisms 300 operate in synchronization with the downward movement operation of the forks 23 supporting the pallet 70, and the pallet guides 400 guide the pallet 70 as the synchronization mechanisms 300 operate in synchronization with the downward movement operation, so that the position of the pallet 70 in the vehicle width direction Dw is adjusted. That is, when the pallet 70 is moved downward, the pallet 70 is brought to a central position by the pallet guide surfaces 400a of the pallet guides 400. Accordingly, for example, even in a case where the pallet 70 supported by the pair of forks 23 is moved downward in a state of being offset in the vehicle width direction Dw, the pallet 70 is brought to the central position by the pallet guides 400 while the pallet 70 is being moved to the receiving surfaces 130a from the upper side Dvu. As a result, the center of gravity of the pallet 70 with the cargo 2 placed thereon is disposed closer to the central position. Accordingly, the center of gravity of the entire forklift 10 can be made more stable.

Further, the synchronization mechanisms 300 cause the pallet guides 400 to be positioned at the guide positions when the pallet 70 is to be placed on the receiving surfaces 130a and otherwise cause the pallet guides 400 to be positioned at the retraction positions. That is, when the forklift 10 does not support the pallet 70, the pallet guides 400 are accommodated in the straddle legs 13. Accordingly, it is possible to suppress an increase in dimension of the entire forklift 10 in the vehicle width direction Dw when the forklift 10 does not support the pallet 70. Therefore, it is possible to restrain the forklift from interfering with a wall (a rack) or the like disposed in the logistics facility Lf.

In addition, the synchronization mechanisms 300 cause the pallet guides 400 to rotate by means of the weight of the pallet 70 with the cargo 2 placed thereon. Therefore, a frictional force that is generated between the upper surfaces 73a of the inner surfaces 74 and the pallet supporting surfaces 231b of the claw portions 231 of the forks 23 inside the fork pockets 73 of the pallet 70 is reduced. As a result, the pallet 70 can be brought to the central position more smoothly in comparison with a case where the weight of the pallet 70 is not used for the synchronization mechanism 300 to operate in synchronization with the downward movement operation.

Eighth Embodiment

The forklift 10 according to an eighth embodiment of the present disclosure will be described below with reference to FIGS. 22 and 23. The forklift 10 described in the eighth embodiment includes the synchronization mechanisms 300 and the pallet guides 400.

Synchronization Mechanism

Figure 22:
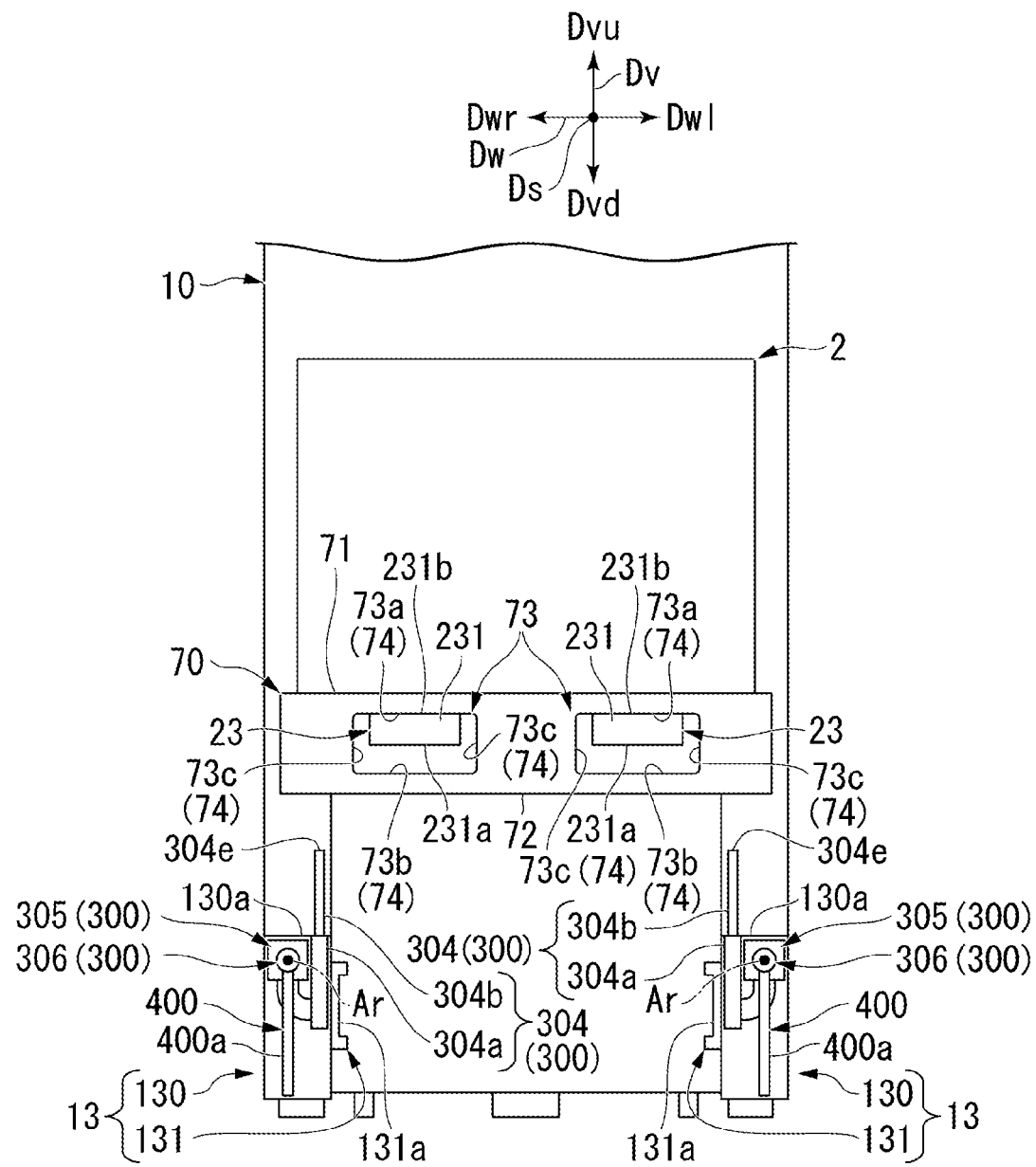
FIG. 22 is a view showing the configurations of synchronization mechanisms and pallet guides according to an eighth embodiment of the present disclosure.
Figure 23:
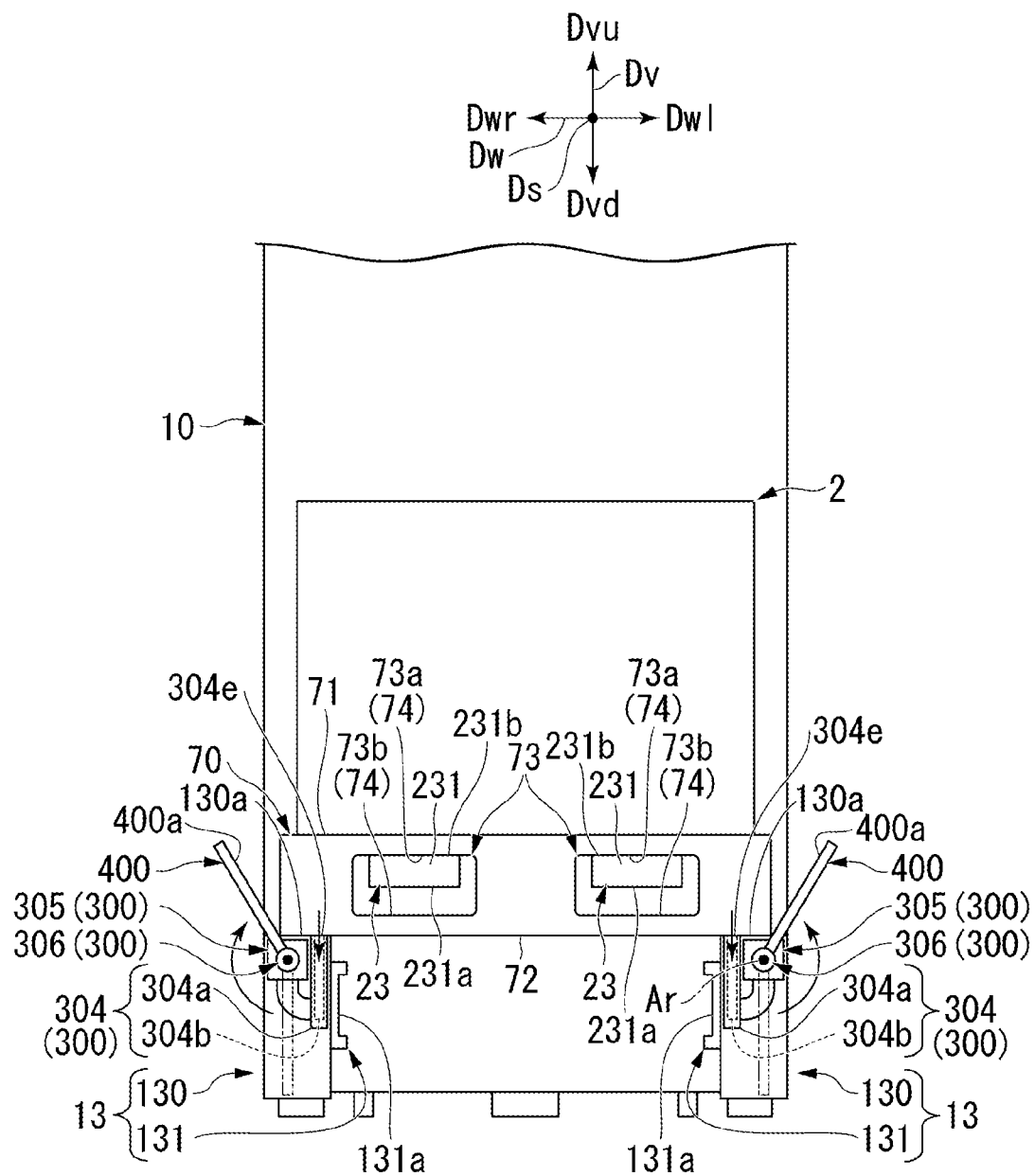
FIG. 23 is a view showing the operations of the synchronization mechanisms and the pallet guides according to the eighth embodiment of the present disclosure.

As shown in FIG. 22, each synchronization mechanism 300 in the present embodiment includes a piston unit 304, a hydraulic motor 305, and an output shaft 306.

The piston units 304 are provided to the main body portions 130 of the straddle legs 13. The piston units 304 include cylinders 304a and rods 304b. The cylinders 304a are accommodated in the main body portions 130 in a state of extending in the vertical direction Dv and are fixed to the main body portions 130. The cylinders 304a are provided to the rods 304b. The rods 304b protrude to the upper side Dvu from the insides of the cylinders 304a by means of the hydraulic pressure of hydraulic oil supplied into the cylinders 304a from the outside. Each of the rods 304b has a post-like shape extending in the vertical direction Dv. The outer diameter of the rods 304b is smaller than the inner diameter of the cylinders 304a. The rods 304b and the cylinders 304a are in a relationship of fitting compactly within each other. Edge surfaces 304e of the rods 304b that are on the upper side Dvu face the upper side Dvu.

The hydraulic motors 305 are provided in the main body portions 130 of the straddle legs 13. The hydraulic motors 305 are accommodated in the main body portions 130. The hydraulic motors 305 are connected to the cylinders 304a of the piston units 304 by hydraulic hoses or the like, and can send and receive the hydraulic oil to and from the piston units 304 through the hydraulic hoses. The hydraulic motors 305 in the present embodiment receive hydraulic oil pressed out from between the cylinders 304a and the rods 304b in the piston units 304 and cause the output shafts 306 to rotate by a rotation amount corresponding to the amount of hydraulic oil received therefrom. The output shafts 306 are rotatably provided at the hydraulic motors 305. The output shafts 306 are post-like members that extend while being centered on the axes Ar. The output shafts 306 extend from the hydraulic motors 305 in the straight movement direction Ds. The rotation shafts 303 in the present embodiment extend to the front side Dsf from the hydraulic motors 305, for example.

Pallet Guide

The pallet guides 400 are plate members that are held by the synchronization mechanisms 300 to be rotatable around axes Ar. The pallet guides 400 are provided on the output shafts 306 and are accommodated in the main body portions 130. The pallet guides 400 extend to the lower side Dvd from side surfaces of the output shafts 306 as seen from the front side Dsf. Hereinafter, positions where the pallet guides 400 are accommodated in the main body portions 130 will be referred to as "retraction positions" of the pallet guides 400. The pallet guides 400 include the pallet guide surfaces 400a. The pallet guide surfaces 400a face the vehicle width direction Dw when the pallet guides 400 are positioned at the retraction positions. Specifically, when the pallet guides 400 are positioned at the retraction positions, the pallet guide surface 400a of the pallet guide 400 disposed on the first side Dwr faces the first side Dwr and the pallet guide surface 400a of the pallet guide 400 disposed on the second side Dwl faces the second side Dwl.

Here, the operation of the synchronization mechanisms 300 will be described. As shown in FIG. 23, when the pair of forks 23 supporting the pallet 70 moves downward (the lift-down operation), the non-placement surface 72 of the pallet 70 is moved to the lower side Dvd and is brought into contact with the edge surfaces 304e of the rods 304b. When the pair of forks 23 further moves downward, the non-placement surface 72 of the pallet 70 presses the edge surfaces 304e of the rods 304b to the lower side Dvd to press down the rods 304b to the lower side Dvd. As the rods 304b move to the lower side Dvd, hydraulic oil in the cylinders 304a is sent to the hydraulic motors 305. Accordingly, the hydraulic motors 305 cause the output shafts 306 to rotate around the axes Ar and the pallet guides 400 rotate around the axes Ar together with the output shafts 306. When the pallet guides 400 are rotated by the synchronization mechanisms 300, the pallet guides 400 are moved to positions where the pallet guides 400 sandwich the pallet 70 in the vehicle width direction Dw at points closer to the upper side Dvu than the receiving surfaces 130a of the main body portions 130. Hereinafter, the position where the pallet guides 400 sandwich the pallet 70 in the vehicle width direction Dw will be referred to as "guide positions".

When the pallet guides 400 are positioned at the guide positions, the pallet guide surfaces 400a of the pallet guides 400 come into contact with the pallet 70 in the vehicle width direction Dw and press the pallet 70 in the vehicle width direction Dw in a state of being inclined with respect to the receiving surfaces 130a of the main body portions 130. Specifically, the pallet guide surface 400a of the pallet guide 400 disposed on the first side Dwr presses the pallet 70 to the second side Dwl. Meanwhile, the pallet guide surface 400a of the pallet guide 400 disposed on the second side Dwl presses the pallet 70 to the first side Dwr. That is, the position of the pallet 70 in the vehicle width direction Dw is adjusted by the pallet guide surfaces 400a of the pallet guides 400 while the pallet 70 is moving to the lower side Dvd. After the position of the pallet 70 in the vehicle width direction Dw is adjusted by the pallet guides 400, the non-placement surface 72 of the pallet 70 comes into contact with the receiving surfaces 130a of the main body portions 130. Therefore, the edge surfaces 304e of the rods 304b enter a state of being flush with the receiving surfaces 130a and the synchronization mechanisms 300 stop to operate in synchronization with the downward movement operation. At this time, the pallet guide surfaces 400a of the pallet guides 400 are held by the output shafts 306 in a state of being inclined with respect to the receiving surfaces 130a.

The above-described configuration provides the same effects as those described in the seventh embodiment.

Ninth Embodiment

The forklift 10 according to a ninth embodiment of the present disclosure will be described below with reference to FIGS. 24A, 24B and 25A, 25B. The forklift 10 described in the ninth embodiment includes the synchronization mechanisms 300 and the pallet guides 400.

Synchronization Mechanism

The synchronization mechanism 300 is provided for each of the pair of straddle legs 13 and operates in synchronization with a retreat operation of the cargo handling device 20.

Hereinafter, the synchronization mechanism 300 and the pallet guide 400 provided for one of the pair of straddle legs 13 that is disposed on the second side Dwl will be described. Description about the synchronization mechanism 300 and the pallet guide 400 provided for the other one of the pair of straddle legs 13 that is disposed on the first side Dwr will be omitted since the synchronization mechanism 300 and the pallet guide 400 provided for the straddle leg 13 disposed on the first side Dwr and the synchronization mechanism 300 and the pallet guide 400 provided for the straddle leg 13 disposed on the second side Dwl are disposed to be symmetrical in the vehicle width direction Dw.

Figure 24A:
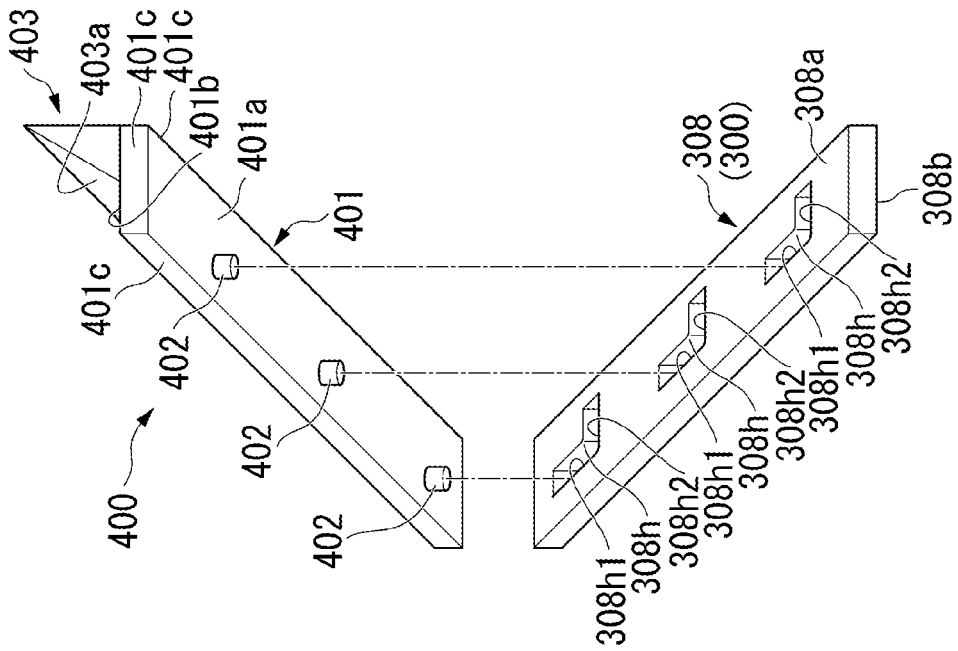
FIG. 24 is a view showing the configurations of synchronization mechanisms and pallet guides according to a ninth embodiment of the present disclosure.
Figure 24B:
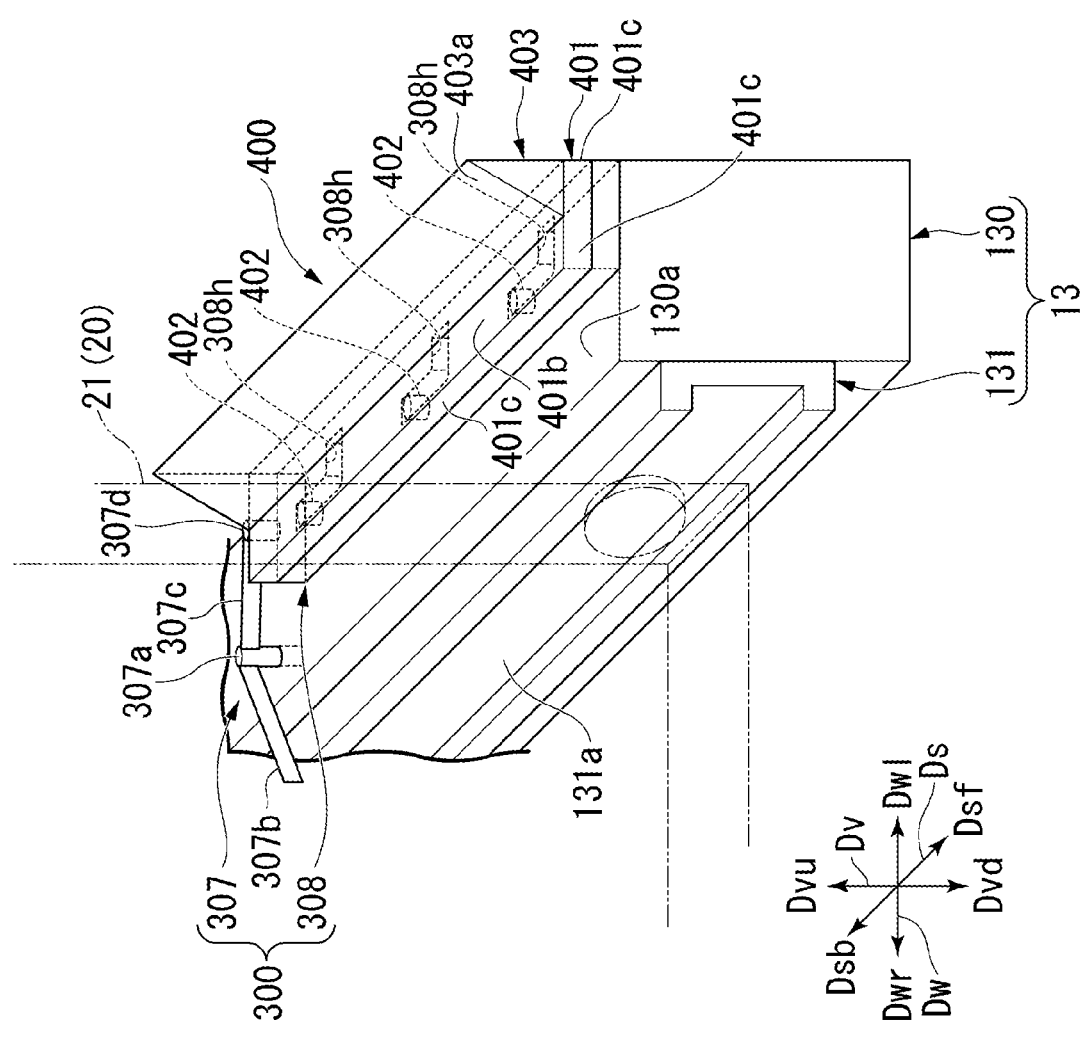

As shown in FIGS. 24A and 24B, the synchronization mechanism 300 in the present embodiment includes a lever portion 307 and a cam plate 308.

The lever portion 307 is provided to the main body portion 130 of the straddle leg 13. When the inner mast 21 of the cargo handling device 20 retreats, the lever portion 307 rotates by being pressed to the rear side Dsb by the inner mast 21. The lever portion 307 includes a lever base portion 307a, a first portion 307b, a second portion 307c, and a roller portion 307d.

The lever base portion 307a has a post-like shape extending in the vertical direction Dv and is provided on the main body portion 130. The lever base portion 307a is rotatably held by the main body portion 130. The lever base portion 307a protrudes to be closer to the upper side Dvu than the receiving surface 130a of the main body portion 130. The first portion 307b is a rod-shaped member integrally connected to the lever base portion 307a. The first portion 307b extends in the vehicle width direction Dw from a side surface of the lever base portion 307a and an end portion thereof is disposed to be closer to the first side Dwr than the straddle leg 13. The second portion 307c is a rod-shaped member integrally connected to the lever base portion 307a. The second portion 307c extends from a side surface of the lever base portion 307a toward a side opposite to a side to which the first portion 307b extends. The roller portion 307d is provided at an end portion of the second portion 307c. The roller portion 307d has a post-like shape extending in the vertical direction Dv. The roller portion 307d is rotatably held by the second portion 307c.

The cam plate 308 is a flat plate-like member and is fixed to the receiving surface 130a of the main body portion 130. The cam plate 308 includes a main surface 308a that faces the upper side Dvu and a rear surface 308b that faces a side (the lower side Dvd) opposite to the main surface 308a and that is fixed to the receiving surface 130a. In the cam plate 308, a plurality of plate guide holes 308h penetrating the cam plate 308 in a direction from the main surface 308a to the rear surface 308b are formed. In the case of the cam plate 308 of the present embodiment, three plate guide holes 308h are disposed at regular intervals in the straight movement direction Ds. More specifically, the inner surface of each of the plate guide holes 308h is composed of a first guide portion 308h1 that extends in the straight movement direction Ds and a second guide portion 308h2 that is connected to the first guide portion 308h1 and that extends in the vehicle width direction Dw. Specifically, the second guide portion 308h2 extends to the second side Dwl from an end portion of the first guide portion 308h1 that is on the front side Dsf. Therefore, the plate guide hole 308h composed of the first guide portion 308h1 and the second guide portion 308h2 has an L-shape as seen from the upper side Dvu. Also, a connection portion between the first guide portion 308h1 and the second guide portion 308h2 has a curved shape.

Pallet Guide

The pallet guide 400 in the present embodiment includes a plate portion 401, guide rollers 402, and a guide portion 403.

The plate portion 401 is a flat plate-like member and is disposed on the main surface 308a of the cam plate 308. The plate portion 401 in the present embodiment is disposed directly above the main body portion 130. Hereinafter, a position at which the pallet guide 400 is positioned when the plate portion 401 is disposed directly above the main body portion 130 will be referred to as a "retraction position". The plate portion 401 includes a contact surface 401a that faces the lower side Dvd and comes into contact with the main surface 308a of the cam plate 308 in a state of facing the main surface 308a in the vertical direction Dv, a pallet placement surface 401b that faces a side (the upper side Dvu) opposite to the contact surface 401a, and four plate portion side surfaces 401c that connect the contact surface 401a and the pallet placement surface 401b to each other in the vertical direction Dv. Here, a side surface of the roller portion 307d of the lever portion 307 comes into contact with one of the four plate portion side surfaces 401c of the plate portion 401 that faces the rear side Dsb.

The guide rollers 402 is provided to the plate portion 401. The guide rollers 402 protrude to the lower side Dvd from a facing surface of the plate portion 401 and is rotatably held by the plate portion 401. In the present embodiment, the same number of guide rollers 402 as the plurality of plate guide holes 308h formed in the cam plate 308 is provided to the plate portion 401. Each of the plurality of guide rollers 402 is disposed to one of the plate guide holes 308h. The plurality of guide rollers 402 are disposed at regular intervals in the straight movement direction Ds. Each of the guide rollers 402 is accommodated in the plate guide hole 308h when the plate portion 401 is disposed on the main surface 308a of the cam plate 308. The guide rollers 402 can rotate in a state of being in contact with the inner surfaces of the plate guide holes 308h.

The guide portion 403 is a member having a triangular prism-like shape and is integrally fixed onto the pallet placement surface 401b of the plate portion 401. The guide portion 403 in the present embodiment has a shape of a right angled triangle as seen in the straight movement direction Ds. A surface of the guide portion 403 that corresponds to a hypotenuse as seen in the straight movement direction Ds is inclined with respect to the pallet placement surface 401b of the plate portion 401. Hereinafter, the surface of the guide portion 403 will be referred to as a "pallet guide surface 403a". The pallet guide surface 403a is inclined with respect to the pallet placement surface 401b such that the pallet guide surface 403a faces the first side Dwr. One of two surfaces that are disposed on a side opposite to the pallet guide surface 403a of the guide portion 403 is fixed to the pallet placement surface 401b. The other of the two surfaces that are disposed on a side opposite to the pallet guide surface 403a of the guide portion 403 is flush with the plate portion side surface 401c facing the second side Dwl.

Here, the operation of the synchronization mechanisms 300 will be described. As shown in FIG. 25, when the cargo handling device 20 retreats (the reach-in operation), the inner mast 21 of the cargo handling device 20 moves to the rear side Dsb and comes into contact with the first portion 307b of the lever portion 307. When the inner mast 21 further retreats, the first portion 307b is pressed to the rear side Dsb. As a result, the second portion 307c rotates about the lever base portion 307a of the lever portion 307 and the roller portion 307d provided at the end portion of the second portion 307c presses the plate portion side surface 401c to the front side Dsf while rotating. Accordingly, the guide rollers 402 provided at the plate portion 401 move along a direction in which the plate guide holes 308h extend, so that the plate portion 401 is moved. That is, the entire pallet guide 400 moves along the plate guide holes 308h. Specifically, the entire pallet guide 400 moves to the front side Dsf with the guide rollers 402 rotating in the first guide portions 308h1 and the entire pallet guide 400 moves to the second side Dwl with the guide rollers 402 rotating in the second guide portions 308h2. Hereinafter, positions at which the pallet guides 400 are positioned when the pair of the pallet guides 400 are moved from the retraction positions to be separated from each other in the vehicle width direction Dw will be referred to as "guide positions".

Note that, the synchronization mechanism 300 may include a spring mechanism (not shown) that is provided on the cam plate 308 and that applies an urging force to the guide rollers 402 to return the pallet guide 400 to the original position when the pallet guide 400 is moved (displaced), for example. Accordingly, the pallet guide 400 is returned to the original position in a case where the inner mast 21 moves to the front side Dsf and the inner mast 21 is not in contact with the lever portion 307.

Effect

In the above-described configuration, the synchronization mechanism 300 operates in synchronization with the retreat operation of the cargo handling device 20, so that the pair of the pallet guides 400 are moved to the guide positions separated from each other in the vehicle width direction Dw. Accordingly, the pallet guide surfaces 403a of the pallet guides 400 can adjust the position of the pallet 70 in the vehicle width direction Dw. That is, when the pallet 70 is moved downward, the pallet 70 is brought to a central position by the pallet guides 400. Therefore, for example, in a case where the pallet 70 supported by the pair of forks 23 is moved downward in a state where the cargo handling device 20 has retreated and the pallet 70 is offset in the vehicle width direction Dw, the pallet 70 is brought to the central position by the pallet guides 400 while the pallet 70 is being moved to the receiving surfaces 130a from the upper side Dvu. As a result, the center of gravity of the pallet 70 with the cargo 2 placed thereon is disposed closer to the central position. Accordingly, the center of gravity of the entire forklift 10 can be made more stable.

Other Embodiments

As described above, the embodiments of the present disclosure has been described in detail with reference to the drawings. However, the specific configuration is not limited to the configurations in the embodiments and addition, omission, substitution, and other modification can be made without departing from the scope of the present disclosure.

Figure 26:
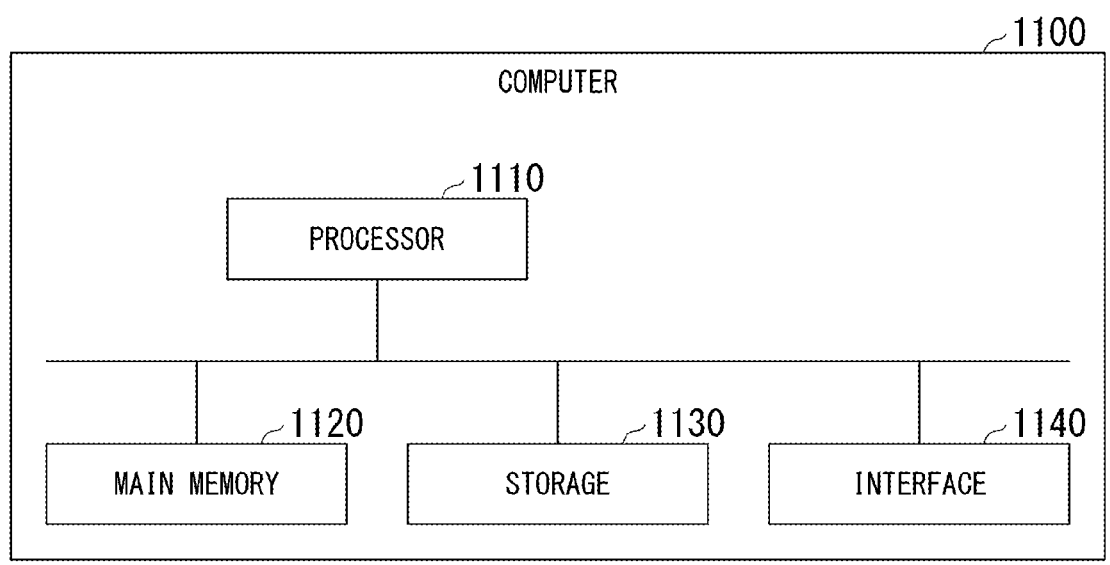
FIG. 26 is a hardware configuration diagram showing the configuration of a computer according to an embodiment of the present disclosure.

Note that FIG. 26 is a hardware configuration diagram showing the configuration of a computer 1100 according to the present embodiment.

The computer 1100 includes a processor 1110, a main memory 1120, a storage 1130, and an interface 1140.

The control device 50 described above is implemented in the computer 1100. In addition, an operation of each processing unit described above is stored in the storage 1130 in the form of a program. The processor 1110 reads a program from the storage 1130, deploys the program on the main memory 1120, and executes the above-described processing according to the program. In addition, the processor 1110 secures, in the main memory 1120, a storage area corresponding to each storage unit 56 described above according to the program.

The program may be for realization of part of the functions that the computer 1100 is caused to exhibit. For example, the program may function in combination with another program stored in the storage 1130 in advance or in combination with another program installed in another device.

In addition, the computer 1100 may include a custom large scale integrated circuit (LSI) such as a programmable logic device (PLD) in addition to or instead of the above-described configuration. Examples of the PLD include a programmable array logic (PAL), a generic array logic (GAL), a complex programmable logic device (CPLD), and a field programmable gate array (FPGA). In this case, part or all of the functions realized by the processor 1110 may be realized by the integrated circuit.

Examples of the storage 1130 include a magnetic disk, a magneto-optical disk, a semiconductor memory, and the like. The storage 1130 may be an internal medium directly connected to a bus of the computer 1100 and may be an external medium connected to the computer 1100 via the interface 1140 or a communication line.

In addition, in a case where such a program is transmitted to the computer 1100 via a communication line, the computer 1100 receiving the transmission may deploy the program on the main memory 1120 and execute the above-described processing. In the above-described embodiment, the storage 1130 is a non-transitory tangible storage medium.

In addition, the program may be for realization of part of the functions described above. Furthermore, the program may be a so-called difference file (a difference program) that realizes the above-described functions in combination with another program stored in the storage 1130 in advance.

In addition, as shown in FIGS. 27A and 27B, the side surfaces 73c of the inner surfaces 74 of the fork pocket 73 of the pallet 70 include a pair of first side surfaces 73d that is connected to the upper surface 73a, that extends in a direction perpendicular to the horizontal plane, and that faces the vehicle width direction Dw when the pallet 70 is supported by the claw portions 231 of the forks 23 and a pair of second side surfaces 73e that is connected to the first side surfaces 73d from the lower side Dvd and that is connected to the lower surface 73b in a state of being inclined with respect to the horizontal plane.

At this time, the pair of the first side surfaces 73d face each other in the vehicle width direction Dw. The pair of second side surfaces 73e is inclined with respect to the horizontal plane such that the second side surfaces 73e become closer to each other. The dimension of the lower surface 73b of the inner surfaces 74 in the vehicle width direction Dw is smaller than the dimension of the retaining surface 231a of the claw portion 231.

According to the above-described configuration, when the claw portion 231 moves downward to the lower surface 73b of the inner surfaces 74 of the fork pocket 73, the intersection portions 232i, which are portions where the claw portion side surfaces 231c and the retaining surface 231a intersect each other, come into contact with the second side surfaces 73e. Accordingly, the intersection portions 232i come into contact with the second side surfaces 73e and press the second side surfaces 73e in the vehicle width direction Dw.

That is, when the claw portion 231 moves downward, the intersection portions 232i of the claw portion 231 press the second side surfaces 73e, so that the pallet 70 is displaced in the vehicle width direction Dw. That is, the pallet 70 is positioned by the pair of claw portions 231. Therefore, this configuration provides the same effects as those described in the fourth embodiment.

Figure 28:
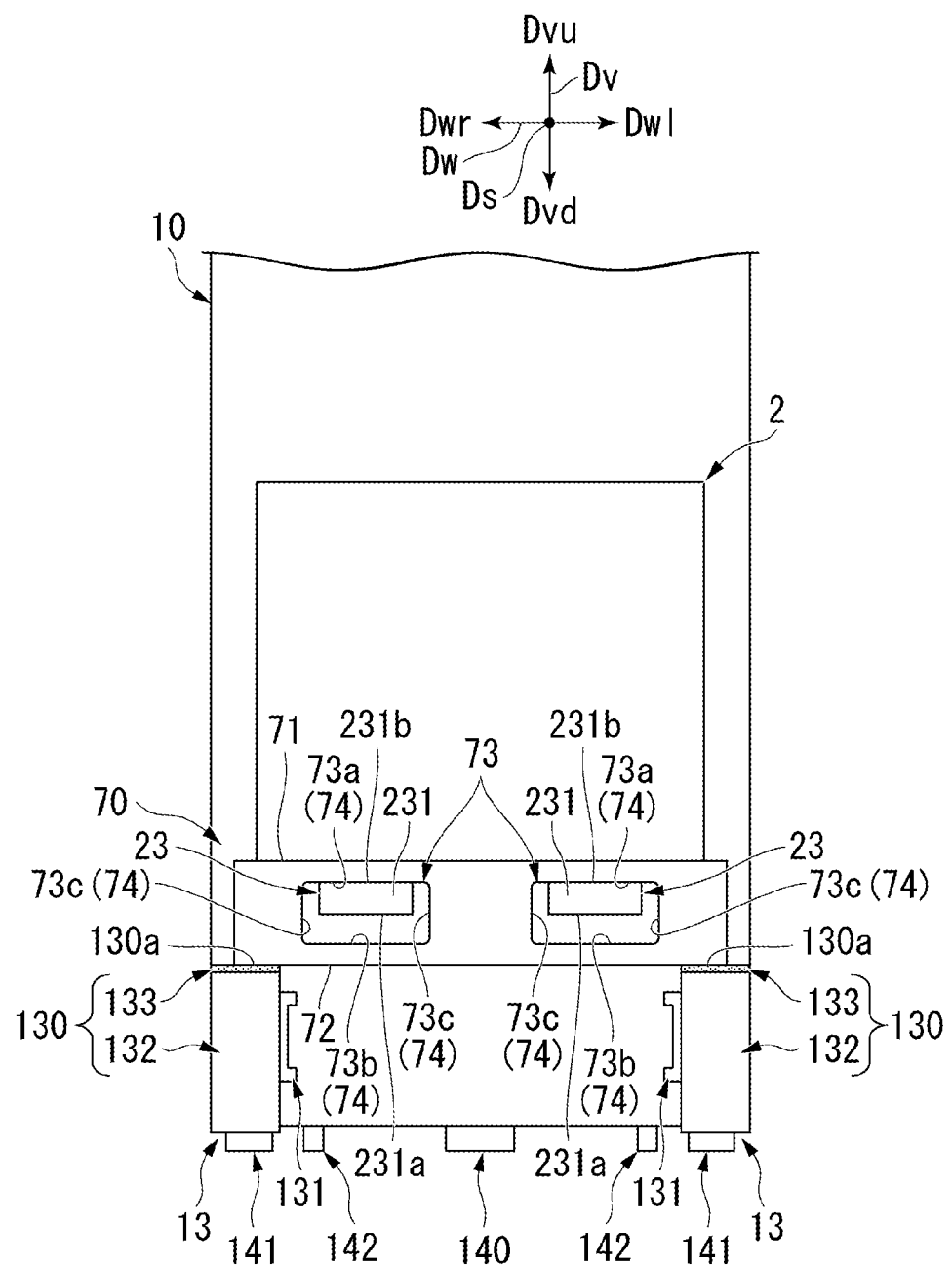
FIG. 28 is a view showing the configurations of straddle legs according to another embodiment of the present disclosure.

In addition, as shown in FIG. 28, the main body portions 130 of the straddle legs 13 may be configured to include supporting portions 132 and first vibration proof portions 133 that are fixed to the supporting portions 132 from the upper side Dvu and that include the receiving surfaces 130a. The first vibration proof portions 133 are vibration proof members formed of a material such as rubber, silicon, or urethane, for example.

According to the above-described configuration, transmission of vibration from the straddle legs 13 to the pallet 70 that occurs when the forklift 10 travels on the road surface R with the pallet 70 fixed to the receiving surfaces 130a can be suppressed.

Therefore, it is possible to restrain the pallet 70 from being shifted with respect to the receiving surfaces 130a because of the vibration. As a result, the center of gravity of the pallet 70 placed on the receiving surfaces 130a and the center of gravity of the cargo 2 placed on the pallet 70 can be stabilized.

Figure 29:
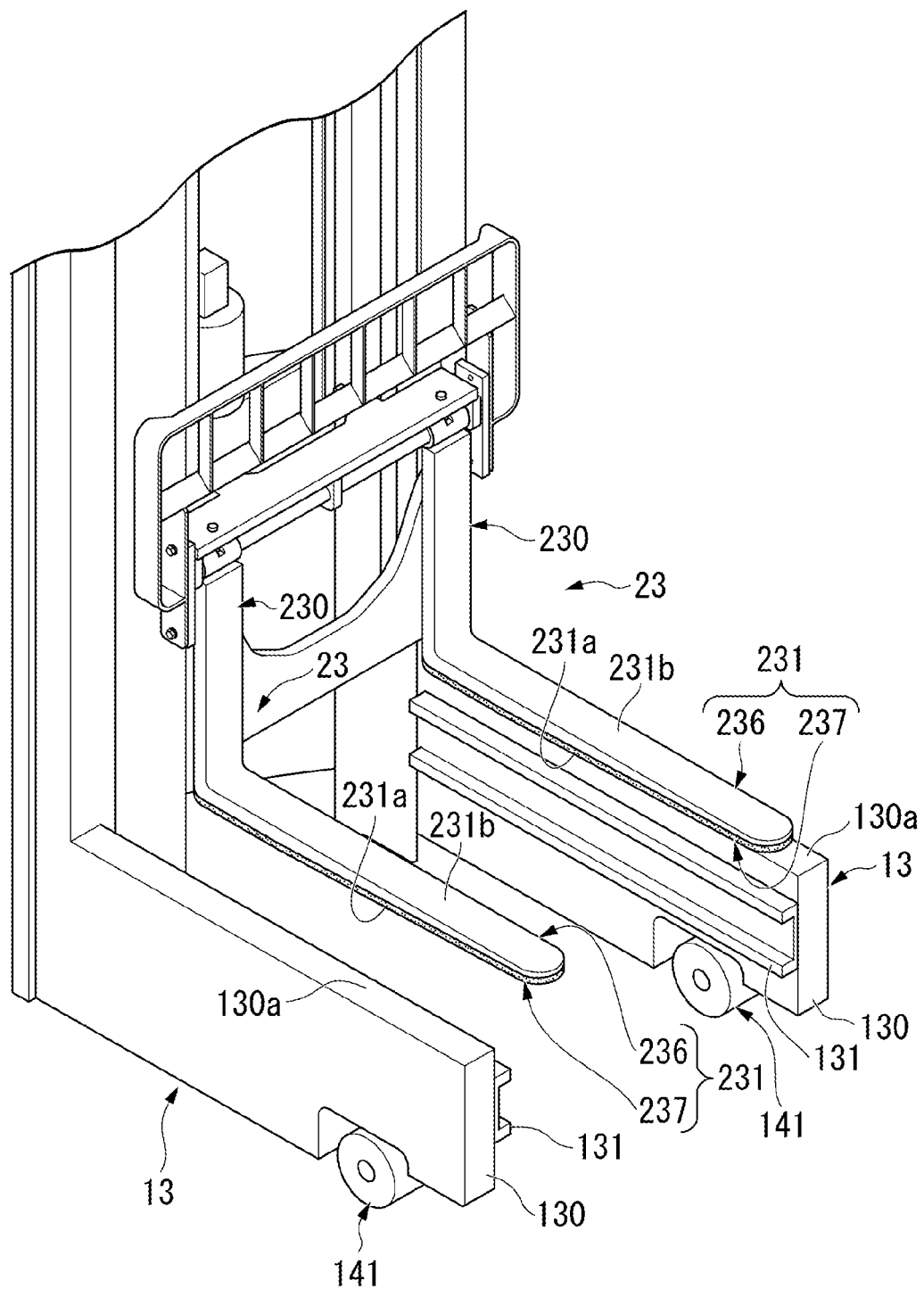
FIG. 29 is a diagram showing the configurations of claw portions of forks according to another embodiment of the present disclosure.

In addition, as shown in FIG. 29, the claw portions 231 of the pair of forks 23 may be configured to include base portions 236 and second vibration proof portions 237 that are fixed to the base portions 236 from the lower side Dvd and that include the retaining surfaces 231a. The second vibration proof portions 237 are vibration proof members formed of a material such as rubber, silicon, or urethane, for example.

According to the above-described configuration, transmission of vibration from the claw portions 231 of the forks 23 to the pallet 70 that occurs when the forklift 10 travels on the road surface R with the pallet 70 fixed to the receiving surfaces 130a can be suppressed.

Therefore, it is possible to restrain the pallet 70 from being shifted with respect to the retaining surfaces 231a of the claw portions 231 because of the vibration. As a result, the center of gravity of the pallet 70 placed on the receiving surfaces 130a and the center of gravity of the cargo 2 placed on the pallet 70 can be stabilized.

In addition, in the embodiments, a position at which the cargo handling device 20 is positioned in a state where the cargo handling device 20 is positioned closest to the upper side Dvu while being on the vehicle 11 is referred to as the "ascent position Pu". However, the ascent position Pu may be set to an appropriate position in accordance with the positions (the heights) of the fork pockets 73 of the pallet 70.

In addition, the configurations of the cargo handling system 1 described the above-described embodiments are not limited to configurations independent of each other, and the cargo handling system 1 may be configured by appropriately combining the components described in the embodiments.

APPENDIX

A forklift, a cargo handling system, a loading method, and a forklift control device described in the embodiments can be understood as follows, for example.

(1) The forklift 10 according to a first aspect includes the vehicle 11 that is travelable on the road surface R and the cargo handling device 20 that is provided on the vehicle 11. The cargo handling device 20 includes a mast that extends in the vertical direction Dv at a front portion of the vehicle 11, the lift bracket 22 that is provided on the mast to be movable upward and downward, and the pair of forks 23 that includes the claw portions 231, 231iv, 231v, and 231vi extending to a front side from the lift bracket 22, the forks 23 being separated from each other in the vehicle width direction Dw, the vehicle 11 includes the vehicle main body 12, and the pair of straddle legs 13 that is provided such that the straddle legs 13 extend to the front side from a lower portion of the vehicle main body 12 and the cargo handling device 20 is interposed between the straddle legs 13 in the vehicle width direction Dw and that supports the mast such that the cargo handling device 20 is movable forward and backward between the advance position Pf and the retreat position Pb, and front ends of the claw portions 231, 231iv, 231v, and 231vi are positioned behind front ends of the straddle legs 13 when the cargo handling device 20 is at the retreat position Pb.

Accordingly, the center of gravity of the entire forklift 10 is positioned closer to the rear side Dsb in comparison with a configuration in which the front ends of the claw portions 231, 231iv, 231v, and 231vi are positioned closer to the front side Dsf than the front ends of the straddle legs 13 when the cargo handling device 20 is at the retreat position Pb.

(2) The cargo handling system 1 according to a second aspect includes the forklift 10 of (1) and the pallet 70 that includes the placement surface 71 on which the cargo 2 is placed from the upper side Dvu, the non-placement surface 72 that faces a side opposite to the placement surface 71, and the fork pocket 73 that is disposed between the placement surface 71 and the non-placement surface 72 and into which the pair of forks 23 is insertable. The claw portions 231, 231iv, 231v, and 231vi include the retaining surfaces 231a, 231aiv, 231av, and 231avi that face the lower side Dvd and that face the inner surface 74 of the fork pocket 73 when the pair of forks 23 is inserted into the fork pocket 73, the straddle leg 13 includes the receiving surface 130a that faces the upper side Dvu, and the receiving surface 130a faces the non-placement surface 72 at a position closest to the non-placement surface 72 when the pair of forks 23 supports the pallet 70 and the cargo handling device 20 is at the retreat position Pb.

Accordingly, the forks 23 can move the pallet 70 downward so that the pallet 70 is placed on the receiving surfaces 130a of the straddle legs 13. That is, the center of gravity of the entire forklift 10 can be positioned closer to the lower side Dvd. In addition, when the forks 23 further move downward, the forks 23 can retain the pallet 70 on the receiving surfaces 130a from the upper side Dvu.

(3) The cargo handling system 1 according to a third aspect is the cargo handling system 1 of (2) in which the forklift 10 may further include the guide portion 80 provided on the straddle leg 13, the guide portion 80 may include the guide surface 80a that extends in directions intersecting the receiving surface 130a while being positioned closer to the upper side Dvu than the receiving surface 130a, and the guide surface 80a of the guide portion 80 provided on one of the pair of straddle legs 13 and the guide surface 80a of the guide portion 80 provided on the other of the pair of straddle legs 13 may be inclined to face each other in the vehicle width direction Dw.

Accordingly, even in a case where the pallet 70 is offset from the receiving surfaces 130a in the vehicle width direction Dw, the guide surfaces 80a can cause the pallet 70 to be placed on the receiving surfaces 130a while correcting the positions thereof offset from the receiving surfaces 130a.

(4) A cargo handling system 1 according to a fourth aspect is the cargo handling system 1 of (2), in which the forklift 10 may further include the stopper portion 90 provided on the straddle leg 13, the stopper portion 90 may include the restriction surface 90a that extends in directions perpendicular to the receiving surface 130a while being positioned closer to the upper side Dvu than the receiving surface 130a, and when the pallet 70 is placed on the receiving surface 130a, the restriction surface 90a may come into contact with the pallet 70 so that the pallet 70 is restricted from being displaced to the front side and in the vehicle width direction Dw.

Accordingly, the pallet 70 placed on the receiving surfaces 130a comes into contact with the restriction surfaces 90a of the stopper portions 90 and thus the pallet 70 can be restrained from being displaced outward beyond the stopper portions 90.

(5) The cargo handling system 1 according to a fifth aspect is the cargo handling system 1 according to any one of (2) to (4), in which the inner surface 74 of the fork pocket 73 may be composed of the upper surface 73a that faces the lower side Dvd, the lower surface 73b that faces the upper side Dvu and that faces the upper surface 73a, and the side surfaces 73c connecting the upper surface 73a and the lower surface 73b to each other, and the forklift 10 may further include the centering mechanisms 100, 100v, and 100vi that are provided at the claw portions 231, 231iv, 231v, and 231vi and that press the side surfaces 73c to position the claw portions 231, 231iv, 231v, and 231vi within the fork pocket 73 when the claw portions 231, 231iv, 231v, and 231vi are pressed toward the lower surface 73b inside the fork pocket 73.

Accordingly, the centering mechanisms 100, 100v, and 100vi can position the claw portions 231, 231iv, 231v, and 231vi within the fork pocket 73 when the claw portions 231, 231iv, 231v, and 231vi move downward in the fork pocket 73. That is, when the claw portions 231, 231iv, 231v, and 231vi move downward, the centering mechanisms 100, 100v, and 100vi can position the pallet 70 at a determined position with respect to the claw portions 231, 231iv, 231v, and 231vi.

(6) The cargo handling system 1 according to a sixth aspect is the cargo handling system 1 according to any one of (2) to (5), in which the forklift 10 may further include the synchronization mechanism 300 that is provided for each of the pair of straddle legs 13 and that operates in synchronization with a downward movement operation of the pair of forks 23 supporting the pallet 70, and the pallet guide 400 that is rotatably held by the synchronization mechanism 300, and the synchronization mechanisms 300 may operate in synchronization with the downward movement operation to cause the pair of pallet guides 400 to rotate from a retraction position at which the pallet guides 400 are accommodated in the straddle legs 13 to a guide position at which the pair of pallet guides 400 sandwiches the pallet 70 in the vehicle width direction Dw at points closer to the upper side Dvu than the straddle legs 13.

Accordingly, even in a case where the pallet 70 supported by the pair of forks 23 is moved downward in a state of being offset in the vehicle width direction Dw, the pallet 70 is brought to the central position by the pallet guides 400 while the pallet 70 is being moved to the receiving surfaces 130a from the upper side Dvu.

(7) The cargo handling system 1 according to a seventh aspect is the cargo handling system 1 according to any one of (2) to (5), in which the forklift 10 may further include the synchronization mechanism 300 that is provided for each of the pair of straddle legs 13 and that operates in synchronization with a retreat operation of the cargo handling device 20, and the pallet guide 400 that is provided for each of the pair of straddle legs 13 and that is held by the synchronization mechanism 300 to be movable in the vehicle width direction Dw, and the synchronization mechanisms 300 may operate in synchronization with the retreat operation to cause the pair of pallet guides 400 to move from a retraction position at which the pallet guides 400 are positioned directly above the straddle legs 13 to a guide position at which the pair of the pallet guides 400 are separated from each other in the vehicle width direction Dw by a distance larger than a distance by which the pallet guides 400 are separated from each other at the retraction position.

Accordingly, even in a case where the cargo handling device 20 retreats and the pallet 70 supported by the pair of forks 23 is moved downward in a state of being offset in the vehicle width direction Dw, the pallet 70 is brought to the central position by the pallet guides 400 while the pallet 70 is being moved to the receiving surfaces 130a from the upper side Dvu.

(8) The forklift 10 according to an eighth aspect includes the vehicle 11 that is travelable on the road surface R and the cargo handling device 20 that is provided on the vehicle 11. The cargo handling device 20 includes a mast that extends in the vertical direction Dv at a front portion of the vehicle 11, the lift bracket 22 that is provided on the mast to be movable upward and downward, and the pair of forks 23 that includes the claw portions 231, 231iv, 231v, and 231vi extending to a front side from the lift bracket 22, the forks 23 being separated from each other in the vehicle width direction Dw, the vehicle 11 includes the vehicle main body 12, and the pair of straddle legs 13 that is provided such that the straddle legs 13 extend to the front side from a lower portion of the vehicle main body 12 and the cargo handling device 20 is interposed between the straddle legs 13 in the vehicle width direction Dw and that supports the mast such that the cargo handling device 20 is movable forward and backward between the advance position Pf and the retreat position Pb, the forklift 10 further includes the synchronization mechanism 300 that is provided for each of the pair of straddle legs 13 and that operates in synchronization with a downward movement operation of the pair of forks 23 supporting the pallet 70 and the pallet guide 400 that is rotatably held by the synchronization mechanism 300, and the synchronization mechanisms 300 operate in synchronization with the downward movement operation to cause the pair of pallet guides 400 to rotate from a retraction position at which the pallet guides 400 are accommodated in the straddle legs 13 to a guide position at which the pair of pallet guides 400 sandwiches the pallet 70 in the vehicle width direction Dw at points closer to the upper side Dvu than the straddle legs 13.

(9) The forklift 10 according to a ninth aspect includes the vehicle 11 that is travelable on the road surface R and the cargo handling device 20 that is provided on the vehicle 11. The cargo handling device 20 includes a mast that extends in the vertical direction Dv at a front portion of the vehicle 11, the lift bracket 22 that is provided on the mast to be movable upward and downward, and the pair of forks 23 that includes the claw portions 231, 231iv, 231v, and 231vi extending to a front side from the lift bracket 22, the forks 23 being separated from each other in the vehicle width direction Dw, the vehicle 11 includes the vehicle main body 12, and the pair of straddle legs 13 that is provided such that the straddle legs 13 extend to the front side from a lower portion of the vehicle main body 12 and the cargo handling device 20 is interposed between the straddle legs 13 in the vehicle width direction Dw and that supports the mast such that the cargo handling device 20 is movable forward and backward between the advance position Pf and the retreat position Pb, the forklift 10 further includes the synchronization mechanism 300 that is provided for each of the pair of straddle legs 13 and that operates in synchronization with a retreat operation of the cargo handling device 20 and the pallet guide 400 that is provided for each of the pair of straddle legs 13 and that is held by the synchronization mechanism 300 to be movable in the vehicle width direction Dw, and the synchronization mechanisms 300 operate in synchronization with the retreat operation to cause the pair of pallet guides 400 to move from a retraction position at which the pallet guides 400 are positioned directly above the straddle legs 13 to a guide position at which the pair of the pallet guides 400 are separated from each other in the vehicle width direction Dw by a distance larger than a distance by which the pallet guides 400 are separated from each other at the retraction position.

(10) A loading method according to a tenth aspect is a loading method of loading the pallet 70 on the forklift 10 in the cargo handling system 1 according to any one of (2) to (7), the method including a step of drawing the pallet 70 rearward when the pair of forks 23 is inserted into the fork pocket 73 and the pair of forks 23 lifts the pallet 70, a step of placing the pallet 70 on the receiving surface 130a by moving the pair of forks 23 to the lower side Dvd, and a step of moving the pair of forks 23 to further move to the lower side Dvd when the pallet 70 is placed on the receiving surface 130a so that the retaining surfaces 231a, 231aiv, 231av, and 231avi fix the pallet 70 on the receiving surface 130a.

(11) The control device 50 for the forklift 10 according to an eleventh aspect is the control device 50 of the forklift 10 which causes the pallet 70 to be loaded on the forklift 10 in the cargo handling system 1 according to any one of (2) to (7), the device including the reach-in instruction unit 54 that causes the pair of forks 23 to draw the pallet 70 rearward when the pair of forks 23 is inserted into the fork pocket 73 and the pair of forks 23 lifts the pallet 70 and the lift-down instruction unit 55 that causes the pair of forks 23 to move downward. The lift-down instruction unit 55 includes the first descent instruction unit 55*a* that causes the pair of forks 23 to move downward when the pallet 70 is drawn rearward, and the second descent instruction unit 55*b* that causes the pair of forks 23 to further move downward when the pallet 70 is placed on the receiving surface 130*a*.

While preferred embodiments of the invention have been described and illustrated above, it should be understood that these are exemplary of the invention and are not to be considered as limiting. Additions, omissions, substitutions, and other modifications can be made without departing from the spirit or scope of the invention. Accordingly, the invention is not to be considered as being limited by the foregoing description and is only limited by the scope of the appended claims.

EXPLANATION OF REFERENCES

1: cargo handling system
2: cargo
3: host device
4: forklift
5: vehicle
6: vehicle main body
7: straddle leg
8: traveling mechanism
9: hydraulic device
10: cargo handling device
11: inner mast
12: lift bracket
13: fork
14: backrest
15: lift cylinder
16: lift chain
17: first hydraulic hose
18: forward and backward movement device
19: reach cylinder
20: second hydraulic hose
21: self-position sensor
22: control device
23: travel instruction unit
24: self-position acquisition unit
25: steering unit
26: lift-up instruction unit
27: first ascent instruction unit
28: second ascent instruction unit
29: reach-out instruction unit
30: reach-in instruction unit
31: lift-down instruction unit
32: first descent instruction unit
33: second descent instruction unit
34: storage unit
35: battery
36: pallet
37: placement surface
38: non-placement surface
39: fork pocket
40: upper surface
41: lower surface
42: side surface
43: first side surface
44: second side surface
45: inner surface
46: guide portion
47: guide surface
48: stopper portion
49: restriction surface
50: centering mechanism
51: fork insertion portion
52: first surface
53: second surface
54: lower surface retaining portion
55: lower surface retaining surface
56: lower engagement surface
57: first contact surface
58: second contact surface
59: first facing surface
60: second facing surface
61: side surface retaining portion
62: side surface retaining surface
63: upper engagement surface
64: claw contact surface
65: facing surface
66: claw facing surface
67: pocket facing surface
68: shaft portion
69: countersink insertion portion
70: head portion
71: upper end surface
72: supporting post
73: linking portion
74: first rotation shaft
75: second rotation shaft
76: third rotation shaft
77: outer mast
78: outer guide
79: connection portion
80: beam portion
81: counterweight
82: cover
83: main body portion
84: receiving surface
85: guide rail
86: guide groove
87: supporting portion
88: first vibration proof portion
89: first drive wheel
90: first drive wheel main body
91: second drive wheel
92: second drive wheel main body
93: caster wheel
94: caster wheel main body
95: oil tank
96: hydraulic pump
97: hydraulic control valve
98: outlet
99: first outlet
100: second outlet
101: valve control unit
102: inner guide
103: inner side guide
104: outer side guide
105: chain support
106: first plate
107: second plate
108: connection post
109: chain wheel
110: pulley
111: fork fixation portion 112: fork rail
113: base end
114: claw portion
115: retaining surface
116: pallet supporting surface
117: claw portion side surface
118: claw side
119: claw main body
120: intersection portion
121: guide hole
122: upper opening portion
123: lower opening portion
124: in-hole surface
125: first guide surface
126: second guide surface
127: shaft supporting portion
128: bearing hole
129: countersink portion
130: countersunk portion
131: hole portion
132: base portion
133: second vibration proof portion
134: fixation portion
135: fence portion
136: first cylinder portion
137: first rod portion
138: synchronization mechanism
139: pinion
140: rack
141: edge
142: rotation shaft
143: piston unit
144: cylinder
145: rod
146: edge surface
147: hydraulic motor
148: output shaft
149: lever portion
150: lever base portion
151: first portion
152: second portion
153: roller portion
154: cam plate
155: main surface
156: rear surface
157: plate guide hole
158: first guide portion
159: second guide portion
160: second cylinder portion
161: second rod portion
162: pallet guide
163: pallet guide surface
164: plate portion
165: contact surface
166: pallet placement surface
167: plate portion side surface
168: guide roller
169: guide portion
170: computer
171: processor
172: main memory
173: storage
174: interface
175: axis
176: straight movement direction
177: rear side
178: front side
179: vertical direction
180: lower side
181: upper side
182: vehicle width direction
183: first side
184: second side
185: logistics facility
186: rotation axis
187: first rotation axis
188: second rotation axis
189: third rotation axis
190: retreat position
191: descent position
192: advance position
193: ascent position
194: road surface
195: first step
196: second step
197: third step
198: fourth step
199: fifth step
200: sixth step
201: target position

What is claimed is:

1. A cargo handling system comprising:
a forklift comprising:
a vehicle that is travelable on a road surface; and
a cargo handling device that is provided on the vehicle, wherein
the cargo handling device includes
a mast that extends in a vertical direction at a front portion of the vehicle,
a lift bracket that is provided on the mast to be movable upward and downward, and
a pair of forks that includes claw portions extending to a front side from the lift bracket, the forks being separated from each other in a vehicle width direction,
the vehicle includes
a vehicle main body, and
a pair of straddle legs that is provided such that the straddle legs extend to the front side from a lower portion of the vehicle main body and the cargo handling device is interposed between the straddle legs in the vehicle width direction and that supports the mast such that the cargo handling device is movable forward and backward between an advance position and a retreat position, and
front ends of the claw portions are positioned behind front ends of the straddle legs when the cargo handling device is at the retreat position; and
a pallet that includes a placement surface on which a cargo is placed from an upper side, a non-placement surface that faces a side opposite to the placement surface, and a fork pocket that is disposed between the placement surface and the non-placement surface and into which the pair of forks is insertable, wherein
the claw portion includes a retaining surface that faces a lower side and that faces an inner surface of the fork pocket when the pair of forks is inserted into the fork pocket,
the straddle leg includes a receiving surface that faces the upper side,
the receiving surface faces the non-placement surface at a position closest to the non-placement surface when the pair of forks supports the pallet and the cargo handling device is at the retreat position, the forklift further includes a guide portion fixed on the receiving surface of the straddle leg, the guide portion includes a guide surface that extends in directions intersecting the receiving surface while being positioned closer to the upper side than the receiving surface, and the guide surface of the guide portion provided on one of the pair of straddle legs and the guide surface of the guide portion provided on the other of the pair of straddle legs are inclined to face each other in the vehicle width direction.

2. A cargo handling system comprising:
a forklift comprising:
a vehicle that is travelable on a road surface; and
a cargo handling device that is provided on the vehicle, wherein
the cargo handling device includes
a mast that extends in a vertical direction at a front portion of the vehicle,
a lift bracket that is provided on the mast to be movable upward and downward, and
a pair of forks that includes claw portions extending to a front side from the lift bracket, the forks being separated from each other in a vehicle width direction,
the vehicle includes
a vehicle main body, and
a pair of straddle legs that is provided such that the straddle legs extend to the front side from a lower portion of the vehicle main body and the cargo handling device is interposed between the straddle legs in the vehicle width direction and that supports the mast such that the cargo handling device is movable forward and backward between an advance position and a retreat position, and
front ends of the claw portions are positioned behind front ends of the straddle legs when the cargo handling device is at the retreat position; and
a pallet that includes a placement surface on which a cargo is placed from an upper side, a non-placement surface that faces a side opposite to the placement surface, and a fork pocket that is disposed between the placement surface and the non-placement surface and into which the pair of forks is insertable, wherein
the claw portion includes a retaining surface that faces a lower side and that faces an inner surface of the fork pocket when the pair of forks is inserted into the fork pocket,
the straddle leg includes a receiving surface that faces the upper side,
the receiving surface faces the non-placement surface at a position closest to the non-placement surface when the pair of forks supports the pallet and the cargo handling device is at the retreat position,
the forklift further includes a stopper portion provided on the straddle leg,
the stopper portion includes a restriction surface that extends in directions perpendicular to the receiving surface while being positioned closer to the upper side than the receiving surface, and
when the pallet is placed on the receiving surface, the restriction surface comes into contact with the pallet so that the pallet is restricted from being displaced to the front side and in the vehicle width direction.

3. A cargo handling system comprising:
a forklift comprising:
a vehicle that is travelable on a road surface; and
a cargo handling device that is provided on the vehicle, wherein
the cargo handling device includes
a mast that extends in a vertical direction at a front portion of the vehicle,
a lift bracket that is provided on the mast to be movable upward and downward, and
a pair of forks that includes claw portions extending to a front side from the lift bracket, the forks being separated from each other in a vehicle width direction,
the vehicle includes
a vehicle main body, and
a pair of straddle legs that is provided such that the straddle legs extend to the front side from a lower portion of the vehicle main body and the cargo handling device is interposed between the straddle legs in the vehicle width direction and that supports the mast such that the cargo handling device is movable forward and backward between an advance position and a retreat position, and
front ends of the claw portions are positioned behind front ends of the straddle legs when the cargo handling device is at the retreat position; and
a pallet that includes a placement surface on which a cargo is placed from an upper side, a non-placement surface that faces a side opposite to the placement surface, and a fork pocket that is disposed between the placement surface and the non-placement surface and into which the pair of forks is insertable, wherein
the claw portion includes a retaining surface that faces a lower side and that faces an inner surface of the fork pocket when the pair of forks is inserted into the fork pocket,
the straddle leg includes a receiving surface that faces the upper side,
the receiving surface faces the non-placement surface at a position closest to the non-placement surface when the pair of forks supports the pallet and the cargo handling device is at the retreat position,
the inner surface of the fork pocket is composed of an upper surface that faces the lower side, a lower surface that faces the upper side and that faces the upper surface, and side surfaces connecting the upper surface and the lower surface to each other, and
the forklift further includes a centering mechanism that is provided at the claw portion and that presses the side surfaces to position the claw portion within the fork pocket when the claw portion is pressed toward the lower surface inside the fork pocket.

4. The cargo handling system according to claim 1, wherein
the forklift further includes
a synchronization mechanism that is provided for each of the pair of straddle legs and that operates in synchronization with a downward movement operation of the pair of forks supporting the pallet, and
a pallet guide that is rotatably held by the synchronization mechanism, and
the synchronization mechanisms operate in synchronization with the downward movement operation to cause a pair of the pallet guides to rotate from a retraction position at which the pallet guides are accommodated in the straddle legs to a guide position at which the pair of pallet guides sandwiches the pallet in the vehicle width direction at points closer to the upper side than the straddle legs.

5. The cargo handling system according to claim 1, wherein
the forklift further includes
a synchronization mechanism that is provided for each of the pair of straddle legs and that operates in synchronization with a retreat operation of the cargo handling device, and
a pallet guide that is provided for each of the pair of straddle legs and that is held by the synchronization mechanism to be movable in the vehicle width direction, and
the synchronization mechanisms operate in synchronization with the retreat operation to cause a pair of the pallet guides to move from a retraction position at which the pallet guides are positioned directly above the straddle legs to a guide position at which the pair of the pallet guides are separated from each other in the vehicle width direction by a distance larger than a distance by which the pallet guides are separated from each other at the retraction position.

* * * * *